United States Patent
Hyodo et al.

[11] Patent Number: 5,979,417
[45] Date of Patent: Nov. 9, 1999

[54] FUEL RESERVING DEVICE

[75] Inventors: Yoshihiko Hyodo, Gotenba; Takaaki Itoh, Mishima; Toru Kidokoro, Hatano; Takashi Ishikawa, Okazaki; Masahide Kobayashi, Aichi-ken, all of Japan

[73] Assignee: Toyota Jidosha Kabushiki Kaisha, Aichi-Ken, Japan

[21] Appl. No.: 09/069,501

[22] Filed: Apr. 29, 1998

[30] Foreign Application Priority Data

Apr. 30, 1997 [JP] Japan .................................. 9-112391
Mar. 26, 1998 [JP] Japan ................................ 10-079554

[51] Int. Cl.[6] .................................................... F02M 37/00
[52] U.S. Cl. .......................... 123/516; 123/518; 137/587
[58] Field of Search ................................... 123/516, 518; 137/587

[56] References Cited

U.S. PATENT DOCUMENTS

| | | |
|---|---|---|
| 3,617,034 | 11/1971 | Skinner . |
| 3,701,540 | 10/1972 | Pringle . |
| 3,949,720 | 4/1976 | Zipprich et al. . |
| 3,977,379 | 8/1976 | Weissenbach . |
| 4,579,139 | 4/1986 | Stouffer .................... 137/142 |
| 4,951,699 | 8/1990 | Lipman .................... 137/142 |
| 5,056,493 | 10/1991 | Holzer . |
| 5,596,971 | 1/1997 | Kidokoro ................ 123/516 |
| 5,722,374 | 3/1998 | Kidokoro et al. ........ 123/516 |
| 5,746,185 | 5/1998 | Kidokoro et al. ........ 123/516 |
| 5,746,186 | 5/1998 | Kidokoro ................ 123/516 |

FOREIGN PATENT DOCUMENTS

| | | |
|---|---|---|
| 60-157427 | 10/1985 | Japan . |
| 60-158922 | 10/1985 | Japan . |
| 60-158923 | 10/1985 | Japan . |
| 64-16426 | 1/1989 | Japan . |
| 7-132738 | 5/1995 | Japan . |
| 8-170568 | 7/1996 | Japan . |
| 8-197969 | 8/1996 | Japan . |
| 9-203359 | 8/1997 | Japan . |

Primary Examiner—Gerald A. Michalsky
Attorney, Agent, or Firm—Kenyon & Kenyon

[57] ABSTRACT

According to the present invention, there is provided a fuel reserving device for reserving fuel therein comprising a wall for dividing an interior of the device to a fuel chamber and an air chamber, the wall being deformable according to the amount of the fuel in the fuel chamber, a discharge passage which is open to a space formed above the surface of the fuel in the fuel chamber and a shut off valve for normally shutting the discharge passage off. Gas is discharged from the space via the discharge passage when the shut off valve is open. The shut off valve is opened and the gas is discharged from the space when the amount of the gas is larger than a predetermined amount. On the other hand, the shut off valve is closed and the discharging operation of the gas is stopped when the amount of the gas is smaller than the predetermined amount.

15 Claims, 35 Drawing Sheets

FUEL RESERVING DEVICE

BACKGROUND OF THE INVENTION

1. Field of the Invention

The invention relates to a fuel reserving device and, in particular, a fuel tank connected to an engine.

2. Description of the Related Art

A fuel reserving device or fuel tank should be in communication with the outside air such that the surface of the fuel can rise and fall in the fuel tank. In the fuel tank, fuel vapor may be generated in a space formed above the fuel surface. Therefore, the problem of the discharge of fuel vapor from the fuel tank to the outside air arises.

In a prior art, a fuel tank is in communication with the outside air via a charcoal canister for temporarily adsorbing fuel vapor thereon. The charcoal canister must be large if the amount of the fuel vapor generated in the fuel tank is large. To solve this problem, unexamined Japanese patent publication No. 64-16426 discloses a fuel tank comprising an inflatable airbag therein, the airbag being inflated or deflated according to the change of the level of the fuel surface to prevent a space being formed above the surface of the fuel in the fuel tank.

However, in the fuel tank disclosed in the above publication, the interior of the fuel tank is not in communication with the outside air. Therefore, if a space has been already formed above the fuel surface, the space cannot be eliminated when the airbag is inflated. Thus, fuel vapor may be generated in the space above the fuel surface.

Therefore, the object of the invention is to eliminate the space above the fuel surface, and the fuel vapor therein, from the fuel reserving device.

SUMMARY OF THE INVENTION

According to the invention, there is provided a fuel reserving device for reserving fuel therein comprising: a wall for dividing an interior of the device to a fuel chamber and an air chamber, the wall being deformable according to the amount of the fuel in the fuel chamber; a discharge passage which is open to a space formed above the surface of the fuel in the fuel chamber; a shut off valve for normally shutting off the discharge passage; gas discharging means for discharging gas from the space via the discharge passage when the shut off valve is open; and control means for controlling the gas discharging means and the shut off valve to open the shut off valve and operate the gas discharging means to discharge the gas from the space when the amount of the gas is larger than a predetermined amount, the control means closing the shut off valve and stopping the operation of the gas discharging means to stop the discharging operation of the gas when the amount of the gas is smaller than the predetermined amount.

Further, according to the invention, fuel surface level detecting means is provided for detecting the level of the surface of the fuel in the fuel chamber, and the control means judges that the amount of the gas is larger than the predetermined amount when the level of the surface of the fuel detected by the fuel surface level detecting means is lower than a predetermined level.

Further, according to the invention, fuel surface level raising means is provided for raising the level of the surface of the fuel, and the gas discharging means controls the fuel surface level raising means to raise the level of the surface of the fuel to discharge the gas from the space when the amount of the gas is larger than the predetermined amount.

Further, according to the invention, the fuel surface level raising means feeds fuel to the fuel chamber to raise the level of the surface of the fuel.

Further, according to the invention, the fuel surface level raising means deforms the wall to raise the level of the surface of the fuel.

Further, according to the invention, the fuel surface level raising means increases the pressure in the air chamber to deform the wall.

Further, according to the invention, the fuel surface level raising means increases the pressure in the air chamber to a pressure lower than that of the fuel fed to the fuel chamber when the feeding of the fuel to the fuel chamber is stopped.

Further, according to the invention, the fuel surface level raising means decreases the pressure in the air chamber when the feeding of the fuel to the fuel chamber is stopped.

Further, according to the invention, the fuel surface level raising means introduces a negative pressure into the space to deform the wall.

Further, according to the invention, the fuel surface level raising means comprises a fuel pump for pumping the fuel to generate a negative pressure by the pumped fuel, and introduces the negative pressure into the space via the discharging passage.

Further, according to the invention, the fuel surface level raising means returns a portion of the fuel pumped by the fuel pump into the fuel chamber to generate the negative pressure.

Further, according to the invention, the fuel pump is housed in a pump chamber connected to the fuel chamber, the fuel surface level raising means returns the portion of the fuel pumped by the fuel pump into the pump chamber to generate the negative pressure and introduces the negative pressure into a space formed above the surface of the fuel in the pump chamber.

Further, according to the invention, the discharge passage is connected to an air intake system of an engine, and the fuel surface level raising means introduces the negative pressure in the air intake system into the space formed above the surface of the fuel via the discharge passage.

Further, according to the invention, the discharge passage is connected to the air intake system via a canister for adsorbing the fuel vapor thereon, and the canister comprises a valve which opens to the atmosphere when the pressure in the canister is under a predetermined negative pressure to make the canister communicate with the atmosphere.

Further, according to the invention, the fuel surface level raising means raises the level of the surface of the fuel when the engine can receive the fuel vapor.

The present invention may be more fully understood from the description of the preferred embodiments of the invention set forth below, together with the accompanying drawings.

DESCRIPTION OF THE PREFERRED EMBODIMENTS

A fuel reserving device according to the first embodiment of the invention will be explained below. For example, the fuel reserving device is mounted on a vehicle to reserve fuel to be fed to an engine. However, the fuel reserving device can be used to just reserve fuel for a certain period.

Figure 1:
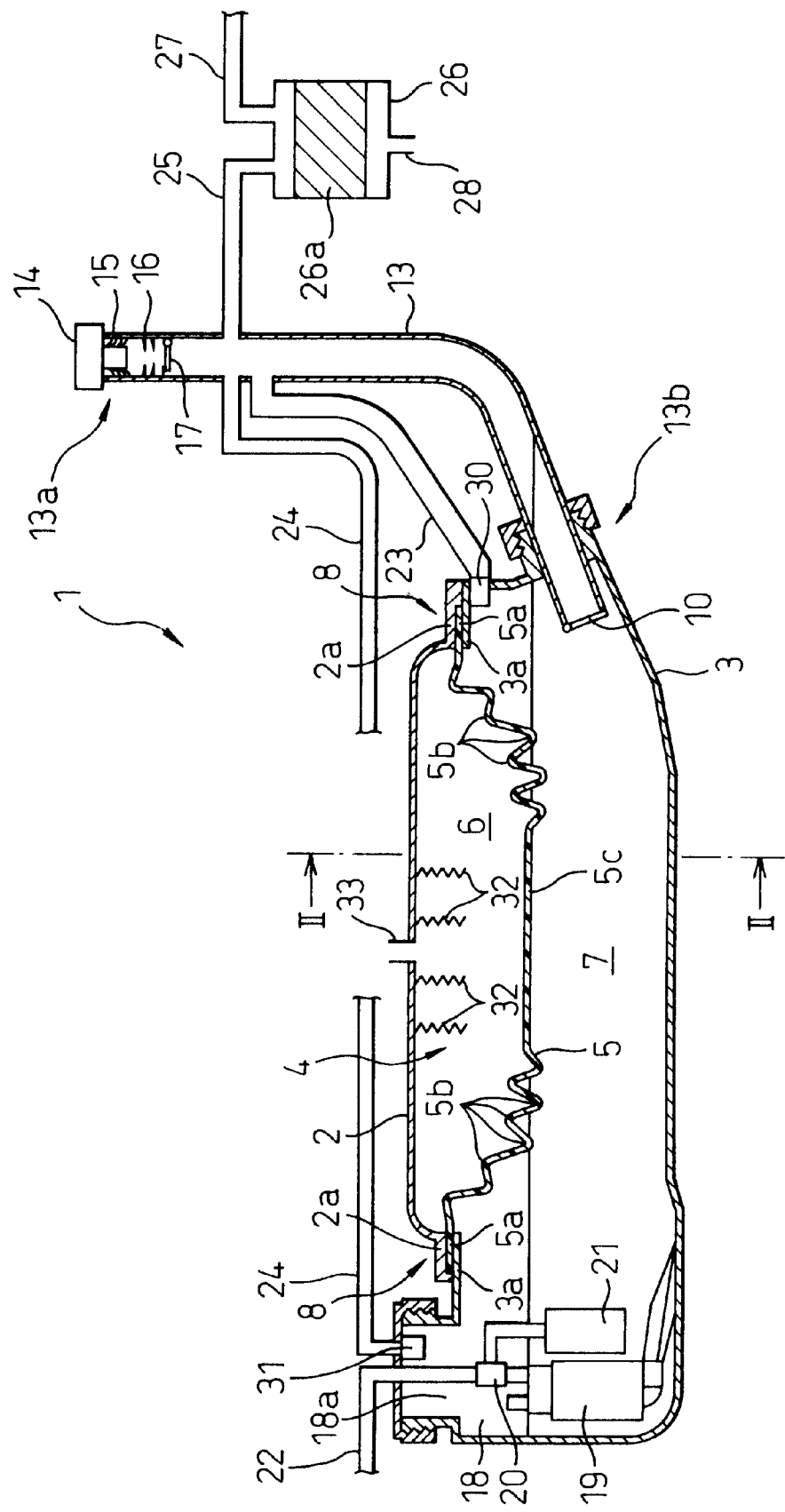
FIG. 1 is a sectional view of a fuel reserving device according to the first embodiment of the invention.

As shown in FIG. 1, a fuel tank 1 of the fuel reserving device comprises upper and lower portions 2 and 3 comprised of a material such as metal or a synthetic resin. The upper and lower portions 2 and 3 are sealingly connected to each other at the peripheral flange portions 2a and 3a thereof.

A separating wall or sheet 5 is positioned within an interior 4 defined by the upper and lower portions 2 and 3. The wall 5 separates the interior 4 into an air chamber 6 located above the wall 5 and a fuel chamber 7 located under the wall 5. The wall 5 is made of a material having flexibility and vapor-impermeability such as polyethylene or nylon. The wall 5 is attached to an anchor portion 8 at a peripheral portion 5a thereof. That is, the wall 5 is sealingly attached to an inner wall face of the fuel tank 1. The peripheral portion 5a of the wall 5 is clipped between the peripheral flange portions 2a and 3a of the upper and lower portions 2 and 3.

The wall 5 comprises annular folded portions 5b therein which are generally concentrically positioned and are equally spaced from each other. Therefore, the wall 5 has a wave shaped portion defined by the annular folded portions 5b. The wall 5 can be bent at the folded portions 5b. Therefore, a central portion 5c of the wall 5 can be moved up and down in the tank 1. Thus, the separating wall 5 is deformed at the folded portion 5b wherein the central portion 5c is moved up and down.

A fuel feeding pipe 13 is sealingly connected to the lower portion 3, and is open to the interior of the fuel chamber 7. A cap 14 for closing the pipe 13 is removably attached on an upper opening 13a of the pipe 13. A seal member 15 which comes into contact with an outer peripheral face of the cap 14 when the cap 14 is attached on the opening 13a, a seal member 16 which comes into contact with an outer peripheral face of a fuel filling nozzle when the nozzle is inserted into the pipe 13 to fill the fuel chamber 7 with fuel, and a fuel vapor shut off valve 17 which normally shuts off the pipe 13 by a spring force are provided in the pipe 13 adjacent to the opening 13a.

On the other hand, a check valve 10 is provided in a lower opening 13b of the fuel feeding pipe 13. The valve 10 is opened by the pressure of the fuel supplied from the fuel filling nozzle, and is closed by the pressure of the fuel in the fuel chamber 7.

A fuel pump chamber 18 is connected to the fuel chamber 7. The fuel pump chamber 18 is defined by the lower portion 3 and projects outward from the peripheral flange portion 2a of the upper portion 2.

A fuel pump 19, a pressure regulator 20 and a fuel filter 21 are positioned in the fuel pump chamber 18. The pressure of the fuel pumped by the pump 19 is regulated by the regulator 20, and thereafter, the fuel is fed to fuel injectors (not shown) via a fuel feeding pipe 22. It is not necessary to provide any fuel return passages which return the fuel to the fuel tank 1 from a fuel dispensing pipe for dispensing the fuel from the fuel feeding pipe 22 to each injector since the regulator 20 returns the fuel to the fuel pump chamber 18 connected to the fuel chamber 7. Therefore, the fuel, which is heated adjacent to a cylinder head of the engine and includes fuel vapor therein, is not be returned into the fuel chamber 7. Thus, the generation of the fuel vapor in the fuel chamber 7 is prevented. Further, the transmission of the noise of the pump 19 from the fuel tank 1 to the outside of the tank 1 is prevented since the pump 19 is positioned in the fuel tank 1.

The fuel chamber 7 is connected to the fuel feeding pipe 13 via a circulation pipe 23. The pipe 23 is connected to the lower portion 3, and is open to the interior of the fuel chamber 7 above the lower opening 13b of the fuel feeding pipe 13 and immediately under the anchor portion 8. The circulation pipe 23 relieves air from the fuel chamber 7 to the fuel feeding pipe 13 when the fuel is supplied into the fuel chamber 7 via the fuel feeding pipe 13. Therefore, the supply of the fuel into the fuel chamber 7 is easily carried out.

A first shut off valve 30 is attached to an opening of the circulation pipe 23 which is open to the interior of the fuel chamber 7. The valve 30 is closed by the fuel which reaches the valve 30. Therefore, when the valve 30 is closed, the pressure in the fuel feeding pipe 13 adjacent to the opening of the circulation pipe 23 which is open to the interior of the fuel feeding pipe 13 is decreased.

An upper space 18a in the fuel pump chamber 18 is in communication with the interior of the fuel feeding pipe 13 via a fuel vapor discharging pipe 24. The pipe 24 is connected to an upper wall portion defining the fuel pump chamber 18. The pipe 24 relieves air from the fuel chamber 7 to the fuel feeding pipe 13 when the fuel is supplied into the fuel chamber 7 via the fuel feeding pipe 13. Therefore, the supply of the fuel into the fuel chamber 7 is easily carried out.

A second shut off valve 31 is attached to an opening of the fuel vapor discharging pipe 24 which is open to the interior of the fuel pump chamber 18. The valve 31 is closed by the fuel which reaches the valve 31. Therefore, when the valve 31 is closed, the pressure in the fuel feeding pipe 13 adjacent to the opening of the fuel vapor discharging pipe 24, which is open to the interior of the fuel feeding pipe 13, is decreased. The opening of the fuel vapor discharging pipe 24 which is open to the interior of the fuel feeding pipe 13 is located above the opening of the circulation pipe 23 which is open to the interior of the fuel feeding pipe 13.

The fuel feeding pipe 13 is connected to a charcoal canister 26 via a first fuel vapor purging pipe 25. An opening of the pipe 25 which is open to the interior of the fuel feeding pipe 13 is located at the level equal to the opening of the fuel vapor discharging pipe 24 which is open to the interior of the fuel feeding pipe 13.

The charcoal canister 26 comprises an activated carbon 26a therein for adsorbing fuel vapor thereon. The canister 26 is open to the outside air via an atmosphere relief pipe 28. Further, the canister 26 is connected to an intake passage (not shown) of the engine via a second fuel vapor purging pipe 27.

Fuel vapor generated in the fuel chamber 7, the fuel feeding pipe 13 and fuel pump chamber 18 is introduced into the charcoal canister 26 via the circulation pipe 23, the fuel vapor discharging pipe 24 and the first fuel vapor purging pipe 25, and is adsorbed on the activated carbon 26a. Therefore, the discharging of the fuel vapor to the outside air is prevented. The fuel vapor adsorbed on the activated carbon 26a is purged into the intake passage via the second fuel vapor purging pipe 27 on the basis of an engine driving condition such as an engine load.

Figure 2:
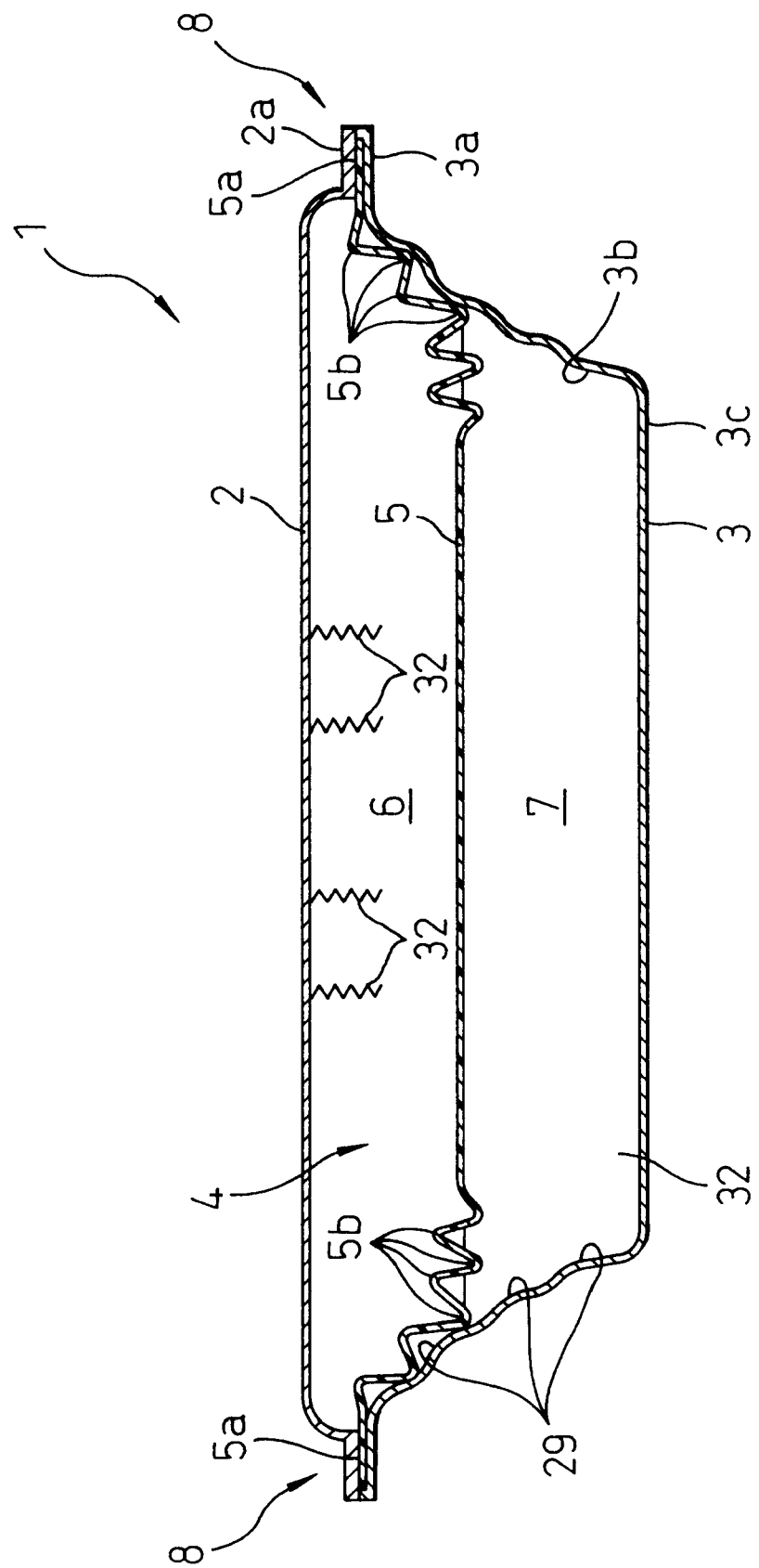
FIG. 2 is a sectional view of the fuel reserving device along the line II—II of the FIG. 1.

For example, the separating wall 5 is moved, by the movement of the fuel in the fuel chamber 7, when the vehicle with the fuel tank 1 is turned. Therefore, a large load such as a stress is generated in the wall 5. In the first embodiment, as shown in FIG. 2, an inner wall face of a side wall 3b of the lower portion 3 is inclined inwardly from the anchor portion 8 to a bottom wall 3c of the lower portion 3. The shape of the inner wall face of the side wall 3b corresponds to the shape of the wave shaped portion defined by the folded portions 5b when the central portion 5c is located at the lower area in the fuel chamber 7. Therefore, the horizontal and vertical movement of the wave shaped portion of the wall 5, and a movement of the wall 5 are prevented, independently of the position of the central portion 5c of the wall 5 in the fuel chamber 7.

Annular projections 29 are formed on the inner wall face of the side wall 3b of the lower portion 3. The projections 29 project inwardly from the side wall 3b so that the side wall 3b has steps thereon. The wave shape portion including the folded portions 5b comes smoothly into contact with the projections 29. Therefore, the horizontal and vertical movement of the wave shape portion of the wall 5, and a movement of the wall 5 are prevented.

The projections 29 are formed on the side wall 3b from the anchor portion 8 to the bottom wall 3c so that recesses are formed between the adjacent projections 29. The recesses hold the folded portions 5b so that the horizontal and vertical movement of the wave shape portion of the wall 5, and a movement of the wall 5 are further prevented.

As described above, the generation of the large stress in the wall 5 is prevented so that the damage of the wall 5 is avoided.

Further, the projections 29 decrease the air volume formed between the fuel surface and the wall 5 so that the amount of the fuel vapor generated in the fuel chamber 7 is decreased. Further, the projections 29 reinforce the lower portion 3 so that there is no need to provide any reinforcing member to reinforce the lower portion 3.

Springs 32 as biasing or resilient means are attached to an inner wall face of the upper portion 2 of the fuel tank 1. The springs 32 extend downwardly from the inner wall face of the upper portion 2. The springs 32 abut against the central portion 5c of the wall 5 when the central portion 5c is moved up. Therefore, the bumping of the wall 5 into the inner wall face of the upper portion 2 is prevented.

The air chamber 6 is in communication with the outside air via a pipe 33 which is open to the atmosphere. The pipe 33 is connected to the upper portion 2 of the fuel tank 1. The pipe 33 relieves air from the air chamber 6 to the outside air when the central portion 5c of the wall 5 is moved up. Therefore, the central portion 5c is easily moved up when the fuel is supplied into the fuel chamber 7. On the other hand, the pipe 33 introduces air from the outside air to the air chamber 6 when the central portion 5c of the wall 5 is moved down. Therefore, the central portion 5c is easily moved down when the fuel in the fuel chamber 7 is used during the driving of the engine.

An operation of eliminating the fuel vapor from the space above the fuel surface in the fuel chamber 7, i.e., the space between the fuel surface in the fuel chamber and the wall 5 (hereinafter, referring to as "fuel vapor eliminating operation") according to the first embodiment of the invention will be explained below.

In the first embodiment, when there is a space above the fuel surface in the fuel chamber 7, fuel is supplied to the fuel chamber 7. The level of the fuel surface is raised by the supply of the fuel into the fuel chamber 7. Therefore, the fuel vapor in the space above the fuel surface is discharged therefrom to the fuel feeding pipe 13 via the circulation and fuel vapor discharging pipes 23 and 24.

The fuel chamber 7 is sealed when the fuel surface reaches the first and second shut off valves 30 and 31, i.e., when the fuel vapor in the space above the fuel surface is completely eliminated therefrom. Then, the supply of the fuel into the fuel chamber 7 is stopped. Once the fuel chamber 7 is sealed, the sealing of the fuel chamber 7 is maintained so that no spaces can be formed above the fuel surface in the fuel chamber 7. Thus, the generation of the fuel vapor in the fuel chamber 7 is prevented. In the first embodiment, the supply of the fuel into the fuel chamber 7 corresponds to means for discharging gas from the space formed above the fuel surface or for raising the level of the fuel surface.

The fuel vapor eliminating operation according to the first embodiment will be explained below by referring to Figures.

FIG. 1 shows the fuel tank 1 including the fuel vapor therein. Before starting the supply of the fuel into the fuel chamber 7, the cap 14 is removed from the upper opening 13a of the fuel feeding pipe 13. When the cap 14 is removed, the fuel vapor shut off valve 17 is closed. Therefore, the discharging of the fuel vapor from the upper opening 13a to the outside air is prevented.

Next, a fuel filling nozzle (not shown) is inserted into the upper opening 13a of the fuel feeding pipe 13. The nozzle opens the fuel vapor shut off valve 17 against the biasing force, and then, the outer peripheral face of the nozzle comes into contact with the seal member 16. Therefore, when the nozzle is inserted into the fuel feeding pipe 13, the discharging of the fuel vapor from the upper opening 13a to the outside air is prevented.

Next, the fuel is supplied from the nozzle into the fuel chamber 7 via the fuel feeding pipe 13. The level of the fuel surface in the fuel chamber 7 is raised as the amount of the fuel in the fuel chamber 7 is increased. Therefore, the wall 5 is moved up.

When the level of the fuel surface is raised, the fuel vapor in the space above the fuel surface is discharged from the fuel chamber 7 to the fuel feeding pipe 13 via the circulation and fuel vapor discharging pipes 23 and 24. The wall 5 is kept in sealing contact with the fuel surface when the level of the fuel surface is raised. Therefore, the amount of the fuel vapor generated in the fuel chamber 7 when the fuel is supplied thereinto is kept small.

Figure 3:
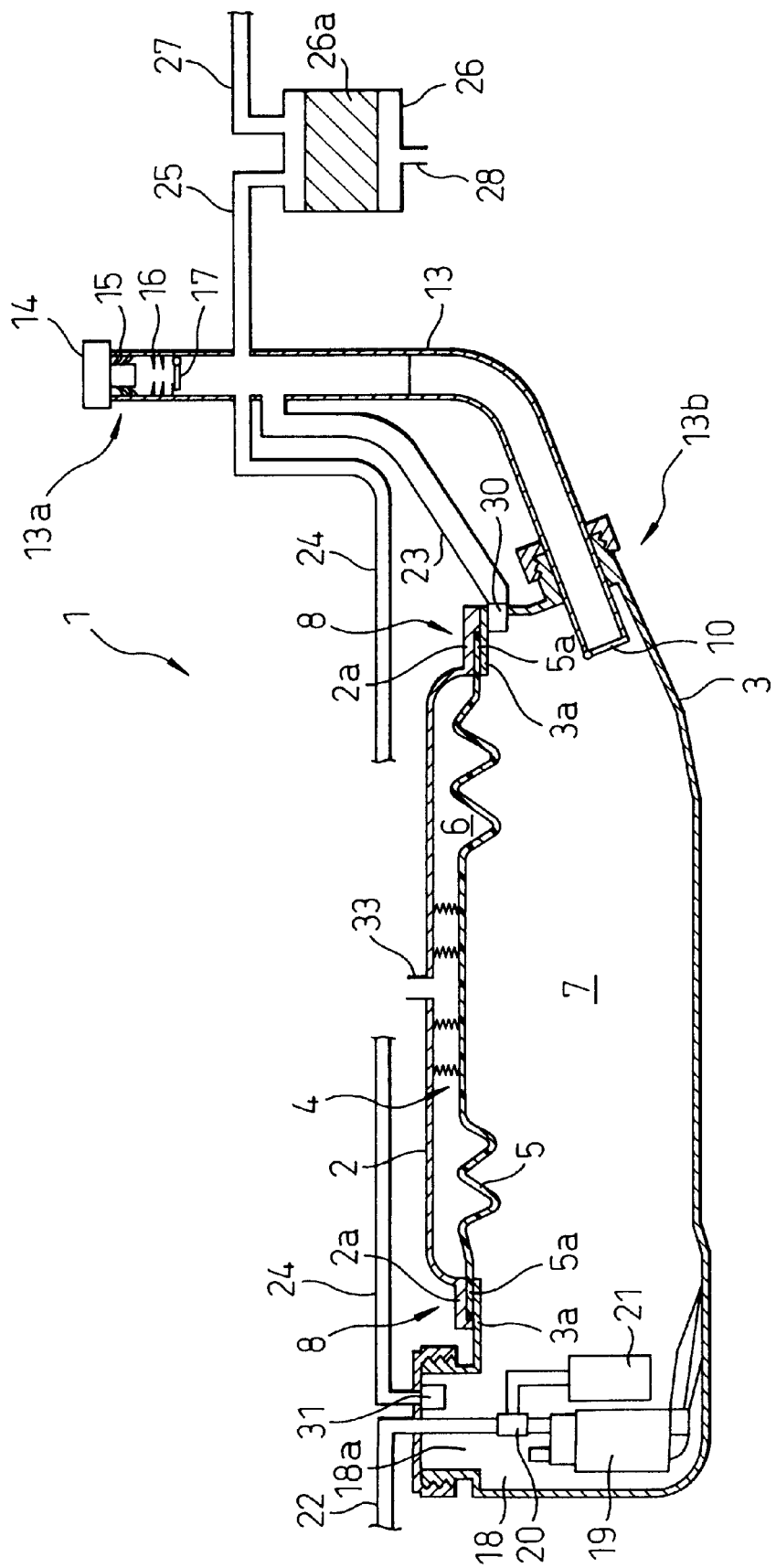
FIG. 3 is a sectional view of the fuel reserving device immediately after the supply of the fuel into the fuel chamber is stopped.

The first shut off valve 30 is closed by the fuel in the fuel chamber 7 to shut off the circulation pipe 23 when the fuel surface reaches the valve 30. Thereafter, the upward movement of the central portion 5c of the wall 5 is restricted by the springs 32. Thereafter, as shown in FIG. 3, the second shut off valve 31 is closed by the fuel in the fuel chamber 7 to shut off the fuel vapor discharging pipe 24 when the fuel surface reaches the valve 31. Therefore, the fuel vapor in the space above the fuel surface is completely eliminated from the fuel chamber 7 and the fuel tank 1.

The pressure in the fuel feeding pipe 13 is decreased to under a predetermined pressure when the first and second shut off valves 30 and 31 are closed. When a pressure sensor in the nozzle senses that the decreased pressure is lower than the predetermined pressure, the supply of the fuel into the fuel chamber 7 is stopped. Then, the pressure of the fuel in the fuel chamber 7 becomes higher than that of the fuel in the fuel feeding pipe 13. Therefore, the check valve 10 is closed by the fuel in the fuel chamber 7. Thus, the fuel chamber 7 is completely sealed while there is no fuel vapor in the fuel chamber 7.

Next, the nozzle is withdrawn from the upper opening 13a of the fuel feeding pipe 13 and, then, the fuel vapor shut off valve 17 is closed by the spring force. Finally, the cap 14 is attached to the upper opening 13a of the fuel feeding pipe 13.

An operation of the fuel tank 1 during the driving of the engine according to the first embodiment will be explained below.

Figure 4:
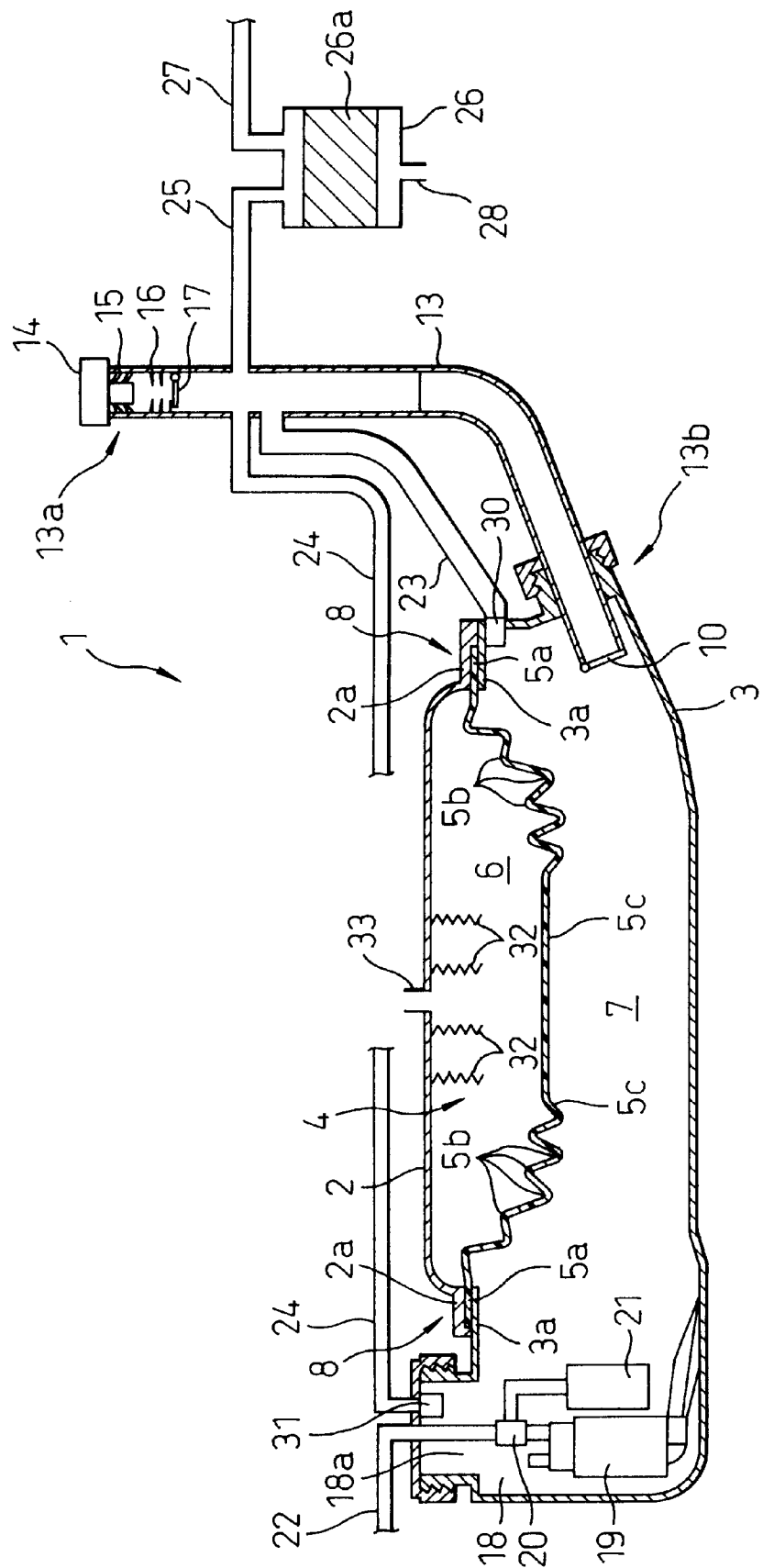
FIG. 4 is a sectional view of the fuel reserving device when the fuel in the fuel chamber is decreased.

During the driving of the engine, the amount of the fuel in the fuel chamber 7 is decreased. Therefore, the level of the fuel surface in the fuel chamber 7 is lowered and the central portion 5c of the wall 5 is moved down. As shown in FIG. 4, the wall 5 projects downwardly into the fuel chamber 7. When the wall 5 is moved down, since the fuel chamber 7 is sealed, no spaces can be formed above the fuel surface. Therefore, once the fuel vapor eliminating operation is carried out, the generation of the fuel vapor in the fuel chamber 7 is prevented. Thus, only a small, or no, charcoal canister most to be provided in the fuel reserving device.

In the first embodiment, the first and second shut off valves 30 and 31 may open when the fuel moves in the fuel chamber 7. Therefore, a space may be formed above the fuel surface in the fuel chamber 7, and fuel vapor may be generated therein even when the engine is driven. Therefore, according to the second embodiment, fuel vapor is eliminated by a method other than the supply of the fuel into the fuel chamber 7.

A fuel reserving device according to the second embodiment of the invention will be explained below.

Figure 5:
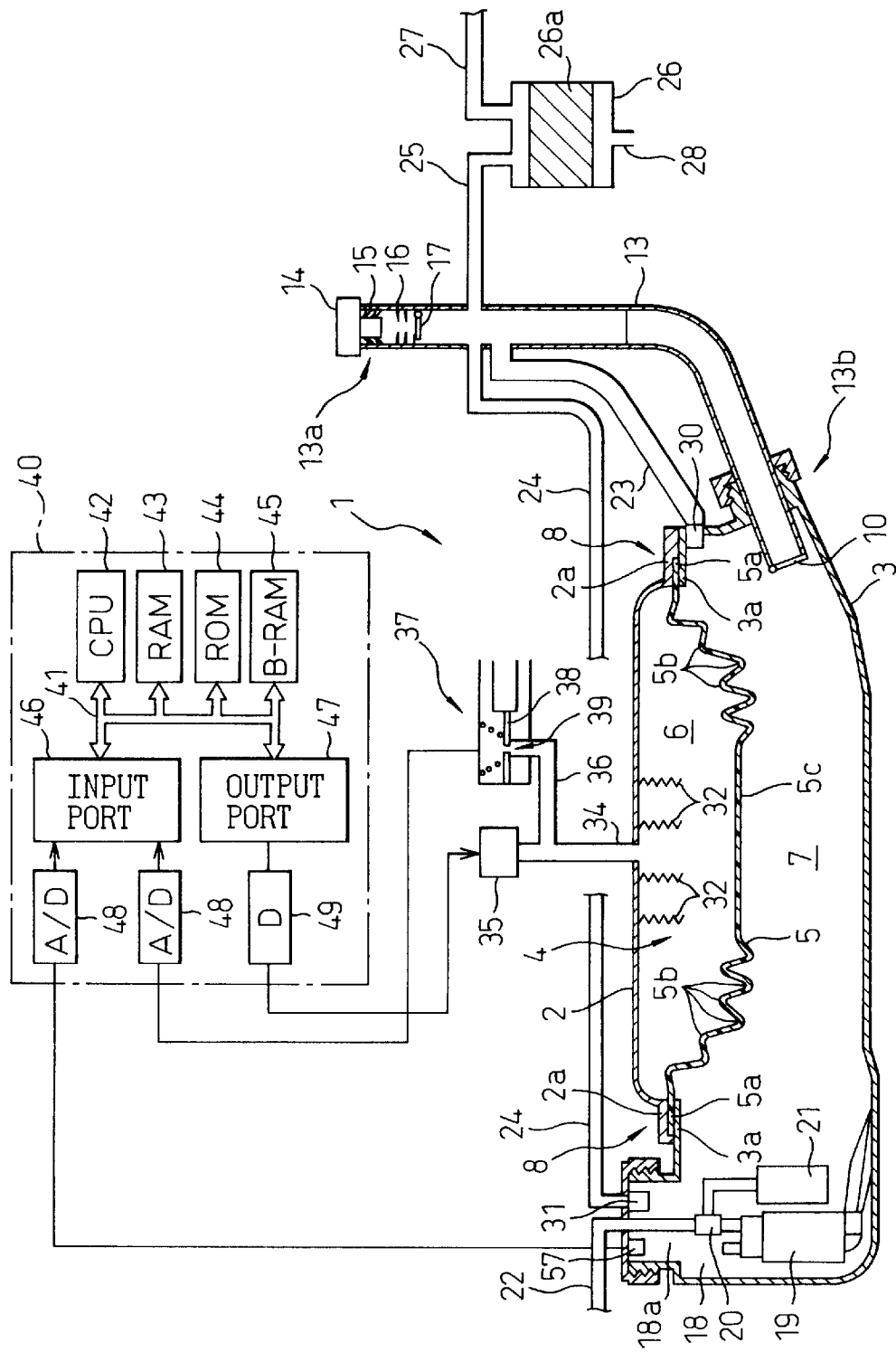
FIG. 5 is a sectional view of a fuel reserving device according to the second embodiment of the invention.

In the second embodiment, as shown in FIG. 5, an air pump 35 is connected to the air chamber 6 via a first connection pipe 34 instead of the atmosphere pipe 33 of the first embodiment. The pump 35 serves to increase the pressure in the air chamber 6.

The first connection pipe 34 is connected to a relief valve 37 via a second connection pipe 36. The valve 37 opens to decrease the pressure in the air chamber 6 when the pressure in the air chamber 6 becomes higher than a predetermined pressure. The predetermined pressure is lower than that which may damage the wall 5.

A small hole 39 is formed in a diaphragm 38 of the relief valve 37. The hole 39 puts the second connection pipe 36 in communication with the outside air, independently of the opening or closing of the relief valve 37. The diameter of the hole 39 is arranged to not prevent the air pump 35 from increasing the pressure in the air chamber 6.

A level switch 57 is mounted on the upper wall of the fuel pump chamber 18 at the highest position in the fuel tank 1. The switch 57 outputs a voltage when the fuel surface reaches the switch 57, i.e., when the fuel surface reaches the highest position in the fuel tank 1.

The fuel reserving device comprises an electronic control unit 40. The unit 40 is a digital computer and is provided with a CPU (microprocessor) 42, a RAM (random access memory) 43, a ROM (read only memory) 44, a B-RAM (backup-RAM) 45, an input port 46 and an output port 47, which are interconnected by a bidirectional bus 41.

A voltage generated in the level switch 57 when the fuel surface reaches the switch 57 is input into the input port 46 via a corresponding AD converter 48. A voltage representing the opening or closing of the relief valve 37 is input into the input port 46 via a corresponding AD converter 48. The output port 47 is connected to the air pump 35 via a drive circuit 49.

Components other than those described above are the same as those of the fuel reserving device according to the first embodiment. Therefore, an explanation thereof will not be given.

A fuel vapor eliminating operation according to the second embodiment will be explained below.

In the second embodiment, it is judged if the relief valve 37 is open. When the relief valve is closed, it is judged that the pressure in the air chamber 6 allows the fuel vapor eliminating operation.

Further, in the second embodiment, it is judged if the level switch 57 is on. When the level switch 57 is off, it is judged that the fuel vapor eliminating operation should be carried out.

When it is judged that the relief valve 37 is closed and the level switch 57 is off, the air pump 35 is activated to increase the pressure in the air chamber 6. Therefore, the central portion 5c of the wall 5 is moved down toward the bottom wall 3c of the lower portion 3. Thus, the level of the fuel surface forming a space thereabove is raised. When the level of the fuel surface is raised, the fuel vapor is discharged from the fuel chamber 7 to the fuel feeding pipe 13 via the circulation and fuel vapor discharging pipes 23 and 24.

When it is judged that the pressure in the air chamber 6 does not allow the fuel vapor eliminating operation, the air pump 35 is stopped.

In the second embodiment, the air pump 35 corresponds to means for discharging gas from the space formed above the fuel surface or for raising the level of the fuel surface, and the level switch 57 corresponds to means for detecting the fuel surface.

Figure 6:
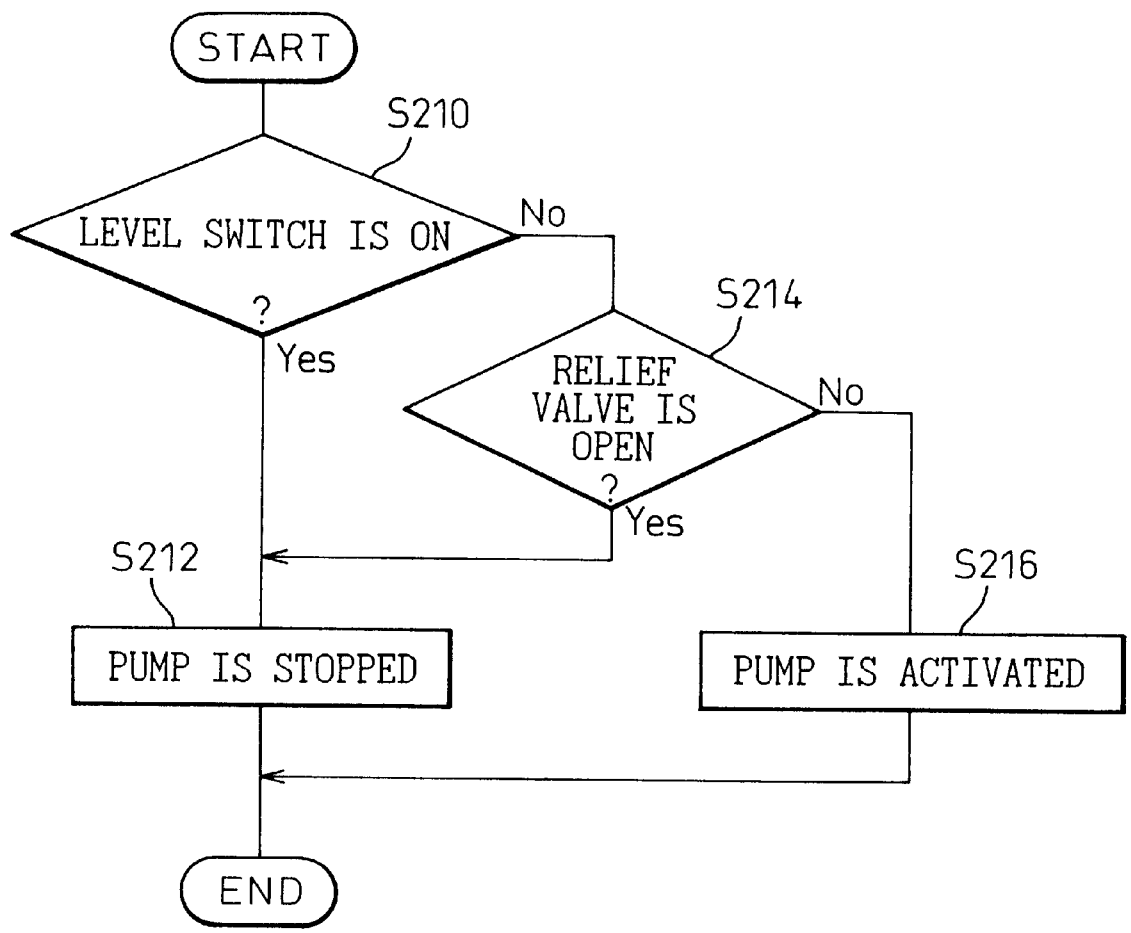
FIG. 6 is a flowchart of a fuel vapor eliminating operation according to the second embodiment of the invention.

The fuel vapor eliminating operation according to the second embodiment will be explained below by referring to a flowchart in FIG. 6.

At step 210, it is judged if the level switch 57 is on. When the switch 57 is on, it is judged that the fuel vapor eliminating operation cannot be carried out, the routine proceeds to step 212 where the air pump 35 is stopped, and the routine is ended. On the other hand, when the switch 57 is off, it is judged that the fuel vapor eliminating operation can be carried out, and the routine proceeds to step 214.

At step 214, it is judged if the relief valve 37 is open. When the valve 37 is open, it is judged that the fuel vapor eliminating operation cannot be carried out, the routine proceeds to step 212 where the air pump 35 is stopped, and the routine is ended. On the other hand, when the valve 37 is closed, it is judged that the fuel vapor eliminating operation should be carried out, the routine proceeds to step 216 where the air pump 35 is activated to increase the pressure in the air chamber 6 for eliminating the fuel vapor from the fuel chamber 7, and the routine is ended.

In the first embodiment, in order to completely eliminate the fuel vapor from the fuel tank, it is necessary to fill the fuel tank with fuel until the tank is full with the fuel. Therefore, if the supply of the fuel into the fuel chamber 7 is stopped before the tank is full with the fuel, the fuel vapor cannot be completely eliminated from the fuel chamber 7. In the third embodiment, even if the supply of the fuel into the fuel chamber is stopped before the fuel chamber is full with the fuel, the fuel vapor is completely eliminated from the fuel chamber.

A fuel reserving device according to the third embodiment of the invention will be explained below.

Figure 7:
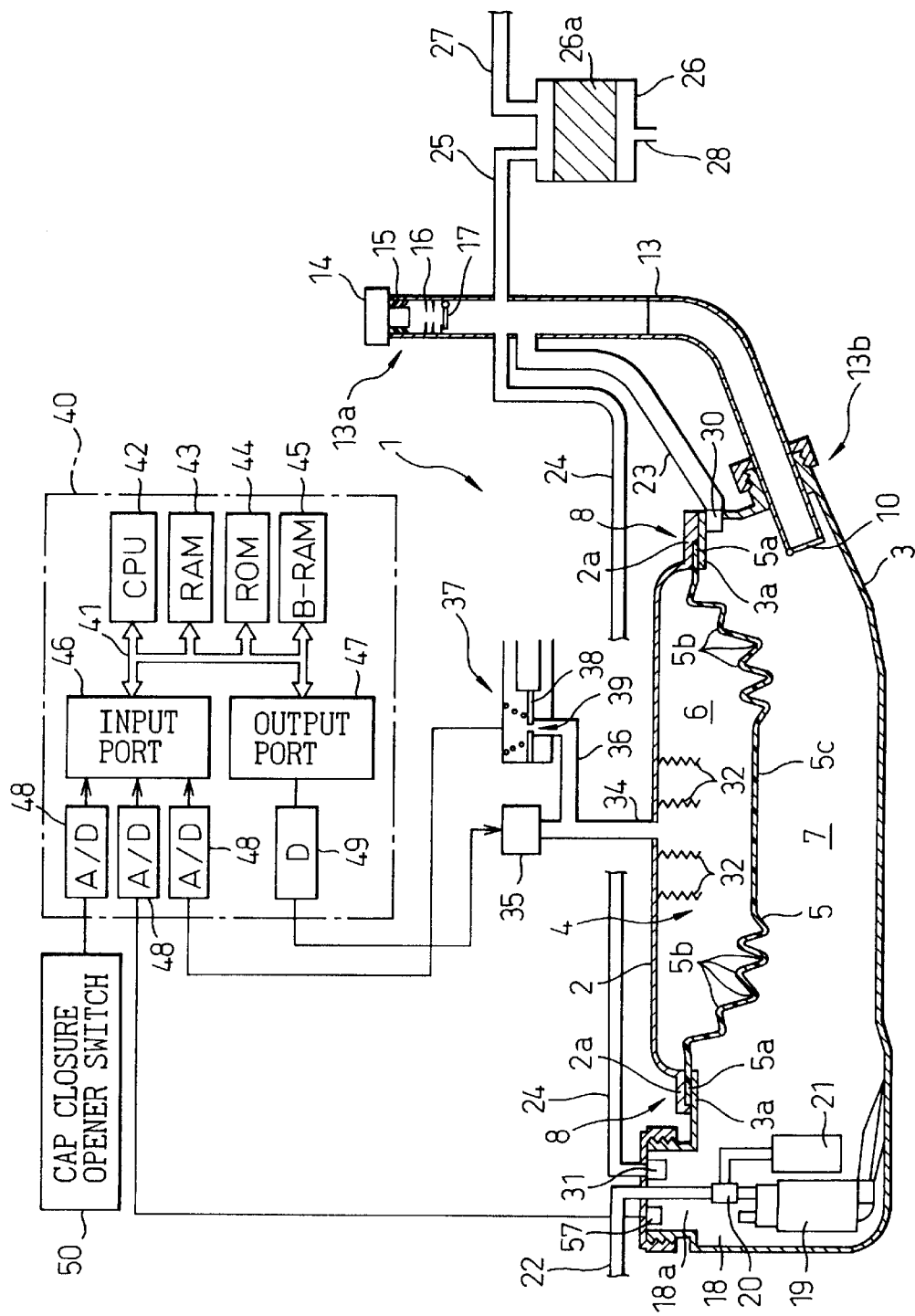
FIG. 7 is a sectional view of a fuel reserving device according to the third embodiment of the invention.

In the third embodiment, as shown in FIG. 7, the fuel tank 1 comprises a cap closure opener switch 50. The opener switch 50 is connected to a cap closure (not shown) for covering the cap 14. The opener switch 50 is activated to output a voltage when the cap closure is opened, and continues to output the voltage until the cap closure is closed. Therefore, it can be judged if the fuel is now supplied by detecting the voltage in the opener switch 50. The voltage generated in the opener switch 50 is input into the input port 46 via a corresponding AD converter 48.

Components other than those described above are the same as those of the fuel reserving device according to the second embodiment. Therefore, an explanation thereof will not be given.

A fuel vapor eliminating operation according to the third embodiment will be explained below.

In the third embodiment, it is judged if the relief valve 37 is open. When the relief valve is closed, it is judged that the pressure in the air chamber 6 allows the fuel vapor eliminating operation.

Further, it is judged if the cap closure opener switch 50 is on and the level switch 57 is off. When the opener switch 50 is on and the level switch 57 is off, it is judged that the fuel vapor eliminating operation should be carried out.

When the pressure in the air chamber 6 does not allow the fuel vapor eliminating operation, and no fuel vapor eliminating operation needs to be carried out, the opening of the cap closure is allowed to start the supply of the fuel into the fuel chamber 7.

On the other hand, when the pressure in the air chamber 6 allows the fuel vapor eliminating operation, and the fuel vapor eliminating operation should be carried out, the air pump 35 is activated to increase the pressure in the air chamber 6. Therefore, the central portion 5c of the wall 5 is moved down. Thus, the fuel vapor above the fuel surface is discharged from the tank 1 to the fuel feeding pipe 13 via the circulation and fuel vapor discharging pipes 23 and 24.

Thereafter, when the pressure in the air chamber 6 does not allow the fuel vapor eliminating operation, or no fuel vapor eliminating operation needs to be carried out, the air pump is stopped and the opening of the cap closure is allowed to start the supply of the fuel into the fuel chamber 7.

Therefore, the air pump 35 corresponds to means for discharging gas from the space formed above the fuel surface or for raising the level of the fuel surface, and the level switch 57 corresponds to means for detecting the level of the fuel surface.

According to the third embodiment, when the supply of the fuel into the fuel chamber 7 is started, the level of the fuel surface is raised to the higher level. Therefore, the amount of the fuel to be supplied to raise the level of the fuel surface to the highest level in the fuel chamber 7 is smaller than that in the first embodiment. Thus, according to the third embodiment, the fuel vapor can be completely eliminated from the fuel chamber 7 even if the supply of the fuel into the fuel chamber 7 is stopped before the fuel chamber is full with the fuel.

Note that the fuel feeding nozzle used to feed the fuel into the fuel chamber in the third embodiment stops feeding the fuel when the nozzle detects that the level of the fuel in the fuel feeding pipe 13 exceeds a predetermined level. The predetermined level is lower than the opening of the circulation pipe 23 which is open to the interior of the fuel feeding pipe 13.

Figure 8:
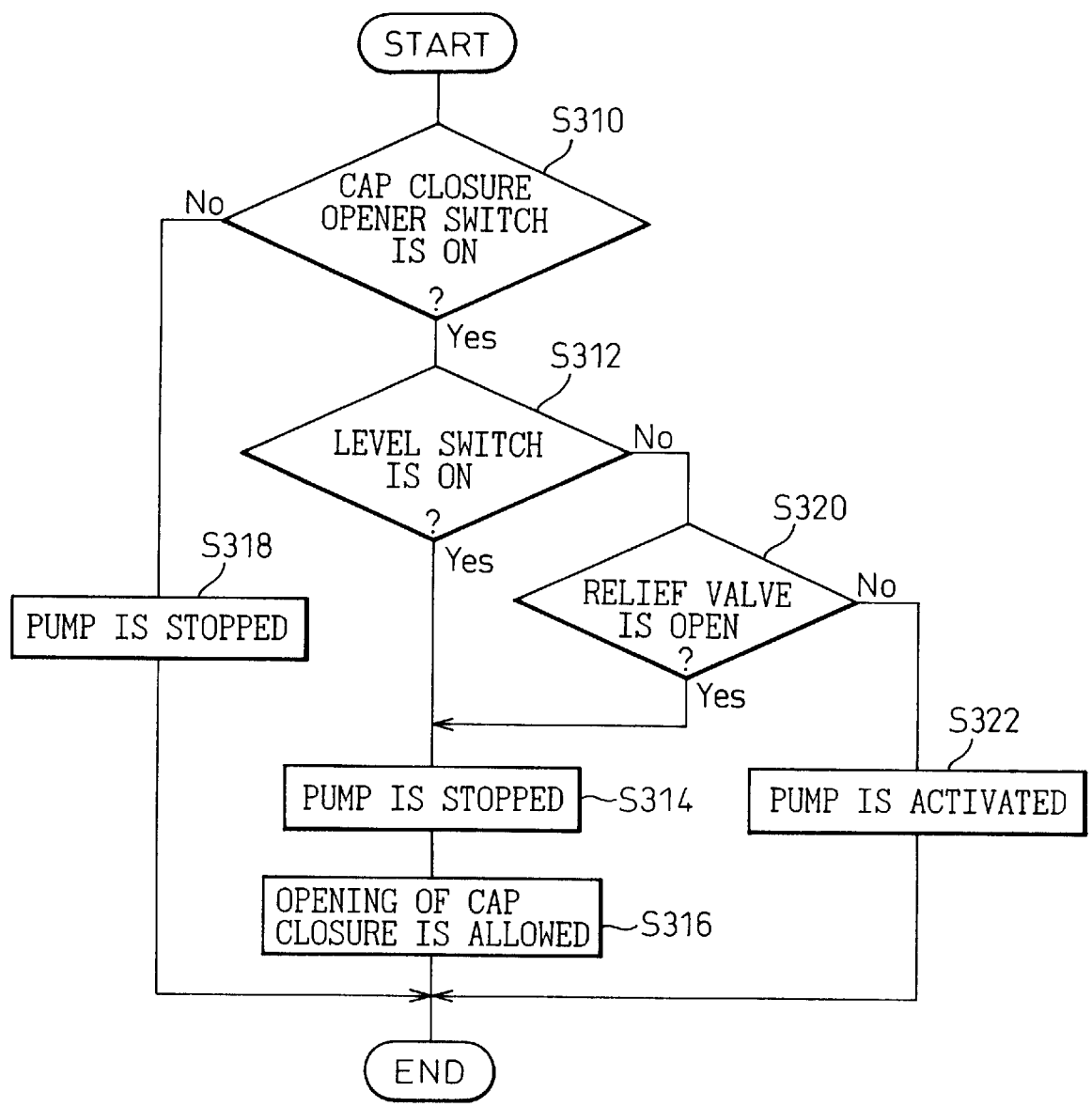
FIG. 8 is a flowchart of a fuel vapor eliminating operation according to the third embodiment of the invention.

The fuel vapor eliminating operation according to the third embodiment will be explained below by referring to a flowchart in FIG. 8.

At step 310, it is judged if the cap closure opener switch 50 is on. When the opener switch 50 is on, the routine proceeds to step 312. On the other hand, when the opener switch 50 is off, the routine proceeds to step 318 where the air pump 35 is stopped, and the routine is ended.

At step 312, it is judged if the level switch 57 is on. When the level switch 57 is on, it is judged that no fuel vapor eliminating operation needs to be carried out, the routine proceeds to step 314 where the air pump 35 is stopped, the routine proceeds to step 316 where the opening of the cap closure is allowed, and the routine is ended. On the other hand, when the level switch 57 is off, the routine proceeds to step 320.

At step 320, it is judged if the relief valve 37 is open. When the valve 37 is open, it is judged that the fuel vapor eliminating operation cannot be carried out, the routine proceeds to step 314 where the air pump 35 is stopped, the routine proceeds to step 316 where the opening of the cap closure is allowed, and the routine is ended. On the other hand, when the valve 37 is closed, it is judged that the fuel vapor eliminating operation can be carried out, the routine proceeds to step 322 where the air pump 35 is activated to increase the pressure in the air chamber 6, and the routine is ended.

In the second and third embodiments, the air pump 35 and the relief valve 37 are used to carry out the fuel vapor eliminating operation. Therefore, the structure of the fuel reserving device is complicated and the cost for manufacturing the fuel reserving device is increased. According to the fourth embodiment, the fuel vapor eliminating operation is carried out with a simpler structure.

A fuel reserving device according to the fourth embodiment will be explained below.

Figure 9:
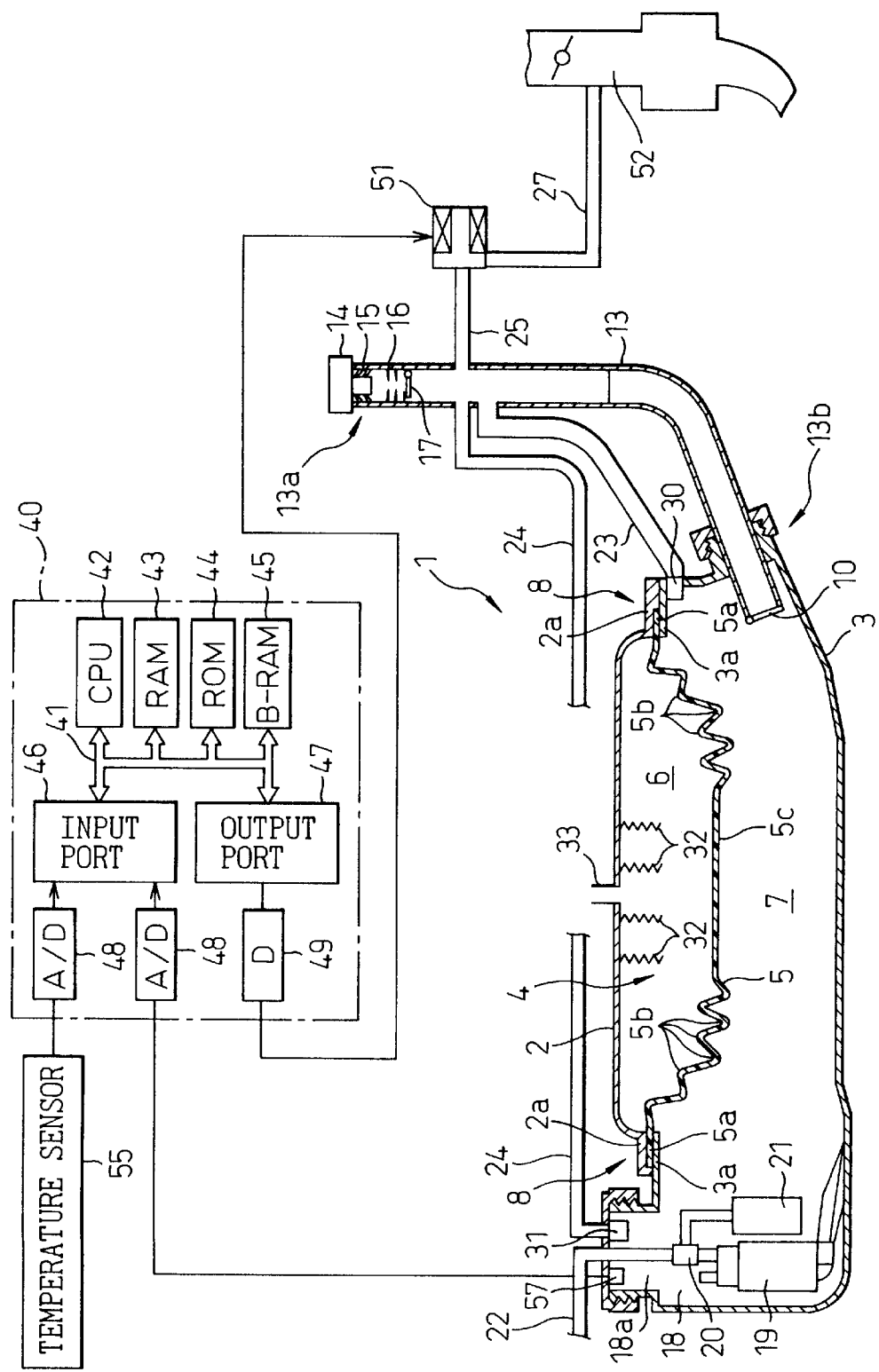
FIG. 9 is a sectional view of a fuel reserving device according to the fourth embodiment of the invention.

In the fourth embodiment, as shown in FIG. 9, the air pump 35, the relief valve 37 and the first and second connection pipes 34 and 36 of the second embodiment are deleted, and an atmosphere pipe 33 is connected to the upper portion 2 of the fuel tank 1.

The charcoal canister 26 of the second embodiment is deleted, and an electromagnetic valve 51 is connected to the first and second fuel vapor purging pipes 25 and 27. The fuel feeding pipe 13 is connected to the intake passage 52 via the first and second fuel vapor purging pipes 25 and 27 and the electromagnetic valve 51. The electromagnetic valve 51 shuts off the communication between the fuel feeding pipe 13 and the intake passage 52.

The fuel reserving device comprises a temperature sensor 55 for generating a voltage corresponding to the temperature of the cooling water for cooling the engine. The temperature sensor 55 is connected to the input port 46 via a corresponding AD converter 48. The output port 47 is connected to the electromagnetic valve 51 via the driving circuit 49.

Components other than those described above are the same as those of the fuel reserving device according to the second embodiment. Therefore, an explanation thereof will not be given.

A fuel vapor eliminating operation according to the fourth embodiment will be explained below.

In the fourth embodiment, it is judged if the temperature of the cooling water is higher than a predetermined temperature (for example, 70° C.). The predetermined temperature is higher than that of the cooling water when the cooling water cools the engine in the constant driving condition. When the temperature of the cooling water is higher than the predetermined temperature, the driving condition of the engine allows the fuel vapor eliminating operation.

Further, in the fourth embodiment, it is judged if the level switch 57 is on. When the switch 57 is off, it is judged that the fuel vapor eliminating operation should be carried out.

When the driving condition of the engine allows the fuel vapor eliminating operation, and the fuel vapor eliminating operation should be carried out, the electromagnetic valve 51 is opened to introduce the negative pressure in the intake passage 52 to the fuel chamber 7. The introduced negative pressure discharges the fuel vapor from the fuel chamber 7, moves the central portion 5c of the wall 5 down, and raises the level of the fuel surface.

When the driving condition of the engine does not allow the fuel vapor eliminating operation, or no fuel vapor eliminating operation needs to be carried out, the electromagnetic valve 51 is closed.

Therefore, according to the fourth embodiment, the simpler structure of the fuel reserving device without the air pump and the relief valve can eliminate the fuel vapor from the fuel chamber. In the fourth embodiment, the purging of the fuel vapor from the fuel chamber to the intake passage corresponds to means for discharging gas from the space formed above the fuel surface or for raising the level of the fuel surface, and the level switch 57 corresponds to means for detecting the level of the fuel surface.

Further, in the fourth embodiment, the fuel vapor eliminating operation may be controlled on the basis of the engine speed, or the engine load, or the amount of the air introduced into combustion chambers of the engine, or the condition of the combustion in the combustion chambers. For example, when the engine speed, or the engine load or the amount of the air introduced into the combustion chambers is lower than a predetermined value, or when combustion is in the stratified condition, the fuel vapor eliminating operation is stopped.

Figure 10:
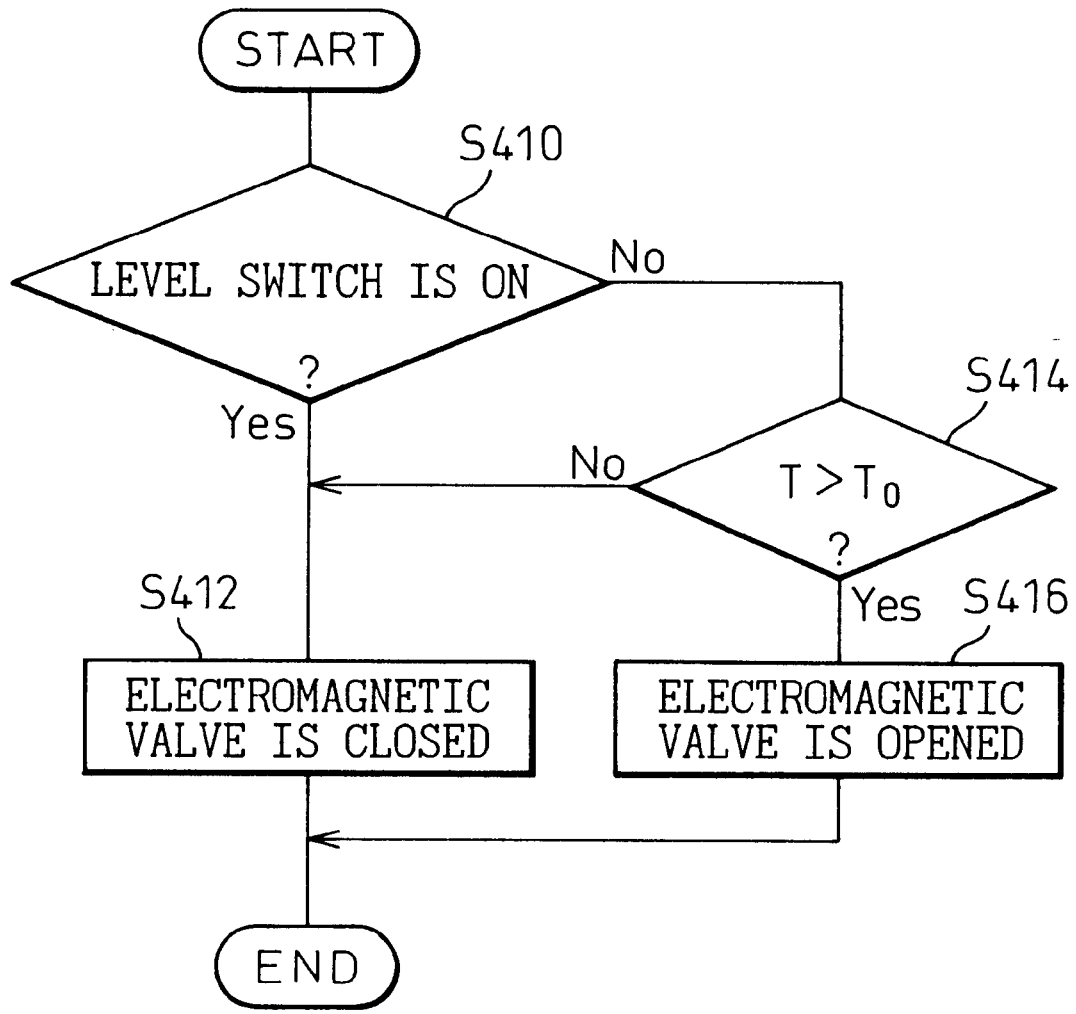
FIG. 10 is a flowchart of a fuel vapor eliminating operation according to the fourth embodiment of the invention.

The fuel vapor eliminating operation according to the fourth embodiment will be explained below by referring to a flowchart in FIG. 10.

At step 410, it is judged if the level switch 57 is on. When the switch 57 is on, it is judged that no fuel vapor eliminating operation needs to be carried out, the routine proceeds to step 412 where the electromagnetic valve 51 is closed, and the routine is ended. On the other hand, when the switch 57 is off, the routine proceeds to step 414.

At step 414, it is judged if the temperature T of the cooling water is higher than the predetermined temperature T0 (T>T0). When T>T0, it is judged that the driving condition of the engine allows the fuel vapor eliminating operation, the routine proceeds to step 416 where the electromagnetic valve 51 is opened, and the routine is ended. On the other hand, when T≦T0, the driving condition of the engine does not allow the fuel vapor eliminating operation, the routine proceeds to step 412 where the electromagnetic valve 51 is closed, and the routine is ended.

In the fourth embodiment, in the case that a charcoal canister should be provided to the fuel reserving device, the canister may be provided on the first fuel vapor purging pipe 25 between the fuel feeding pipe 13 and the electromagnetic valve 51. The canister may be in communication with the outside air to avoid an excess decrease in the pressure in the canister when the electromagnetic valve 51 is opened, and to avoid an excess increase in the pressure in the fuel chamber 7 when the electromagnetic valve 51 is closed. Therefore, in the case that the fuel reserving device according to the fourth embodiment comprises a charcoal canister, the negative pressure cannot be introduced into the fuel chamber 7 because of the communication of the canister with the outside air so that the fuel vapor in the fuel chamber 7 cannot be eliminated. According to the fifth embodiment, the negative pressure can be introduced into the fuel chamber 7 even if the fuel reserving device comprises a charcoal canister.

A fuel reserving device according to the fifth embodiment of the invention will be explained below.

Figure 11:
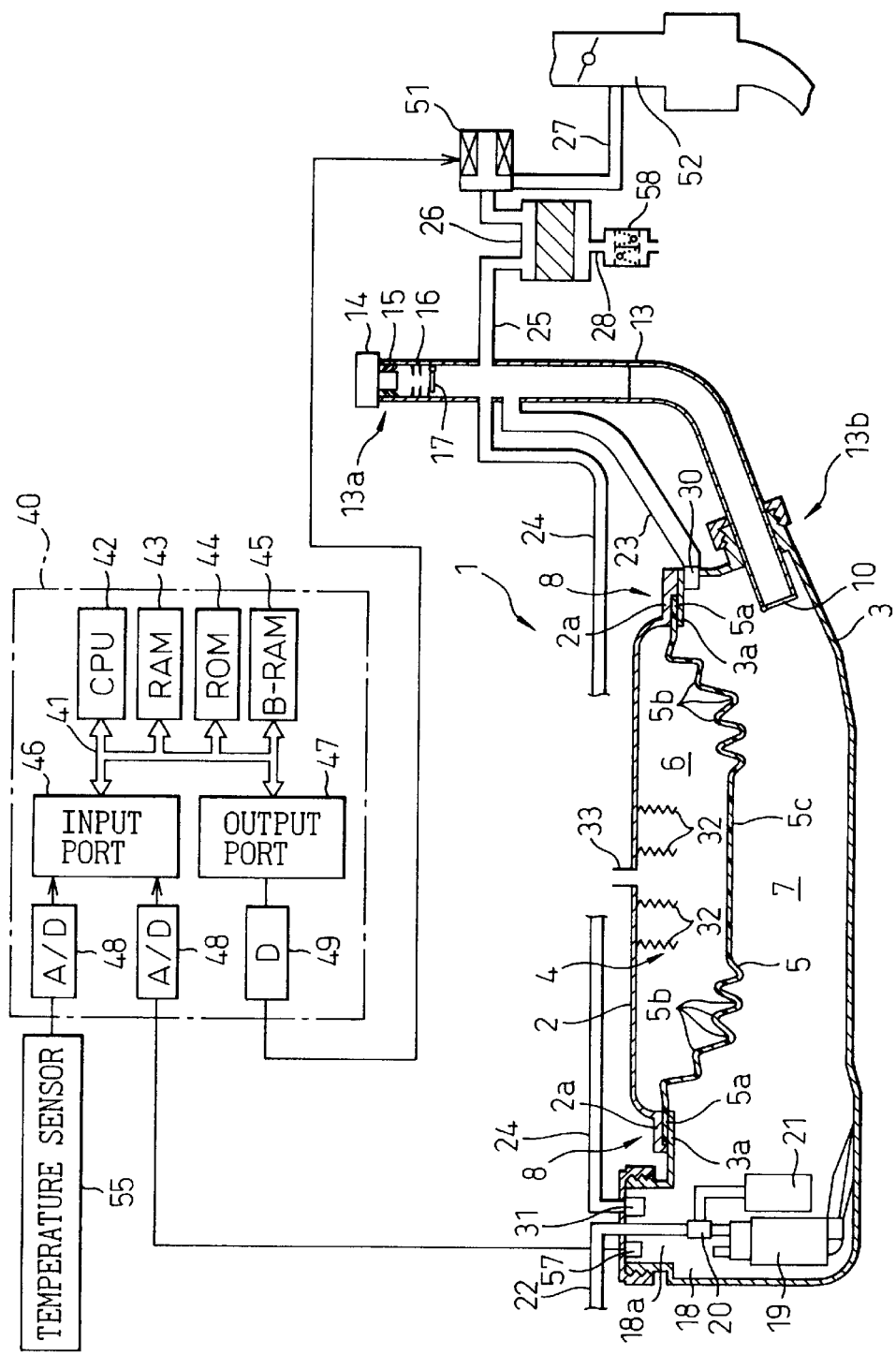
FIG. 11 is a sectional view of a fuel reserving device according to the fifth embodiment of the invention.

In the fifth embodiment, as shown in FIG. 11, a charcoal canister 26 is provided on the first fuel vapor purging pipe 25 between the fuel feeding pipe 13 and the electromagnetic valve 51. The canister 26 is in communication with the outside air via an atmosphere relief pipe 28.

A control valve 58 for shutting off the atmosphere relief pipe 28 is provided on the pipe 28. The valve 58 is constituted by positive and negative valves. Further, the valve 58 is opened at a predetermined positive pressure to decrease the pressure in the canister 26, and is closed at a predetermined negative pressure to increase the pressure in the canister 26. The predetermined positive pressure is lower than that which the fuel tank 1, the charcoal canister 26, the components related thereto, and the wall 5 can withstand, or the fuel vapor cannot discharge from the tank 1, the canister 26 or the components related thereto. The predetermined negative pressure is higher than that which the fuel tank 1, the charcoal canister 26, the components related thereto, and the wall 5 can withstand.

Components other than those described above are the same as those of the fuel reserving device according to the fourth embodiment. Therefore, an explanation thereof will not be given.

A fuel vapor eliminating operation according to the fifth embodiment will be explained below.

In fifth embodiment, it is judged if the temperature of the cooling water is higher than the predetermined temperature. When the temperature of the cooling water is higher than the predetermined temperature, it is judged that the temperature of the cooling water allows the fuel vapor eliminating operation. The predetermined temperature is higher than that of the cooling water when the cooling water cools the engine in the constant driving condition.

Further, in the fifth embodiment, it is judged if the level switch 57 is on. When the level switch 57 is off, it is judged that the fuel vapor eliminating operation should be carried out.

When it is judged that the temperature of the cooling water allows the fuel vapor eliminating operation, and the fuel vapor eliminating operation should be carried out, the electromagnetic valve 51 is opened to introduce the negative pressure in the intake passage 52 into the canister 26 via the second fuel vapor purging pipe 27. When the negative pressure is introduced into the canister 26, the pressure in the canister 26 is lower than the predetermined positive pressure and is higher than the predetermined negative pressure because of the action of the control valve 58. Of course, when the pressure in the canister 26 becomes lower than the predetermined negative pressure, the control valve 58 is opened, and the negative pressure lower than the predetermined negative pressure cannot be introduced into the fuel chamber 7, i.e., only the negative pressure higher than the predetermined negative pressure can be introduced into the fuel chamber 7. Therefore, the negative pressure in the intake passage 52 is introduced into the fuel chamber 7 via the first fuel vapor purging pipe 25, the circulation pipe 23 and the fuel vapor discharging pipe 24. Thus, according to the fifth embodiment, in the fuel tank with the charcoal canister, the negative pressure in the intake passage can be introduced into the fuel chamber 7 to eliminate the fuel vapor above the fuel surface.

In the fifth embodiment, the purging of the fuel vapor from the fuel chamber to the intake passage corresponds to means for discharging gas from the space formed above the fuel surface or for raising the level of the fuel surface, and the level switch 57 corresponds to means for detecting the level of the fuel surface.

When it is judged that the temperature of the cooling water does not allow the fuel vapor eliminating operation, or no fuel vapor eliminating operation needs to be carried out, the electromagnetic valve 51 is closed.

Figure 12:
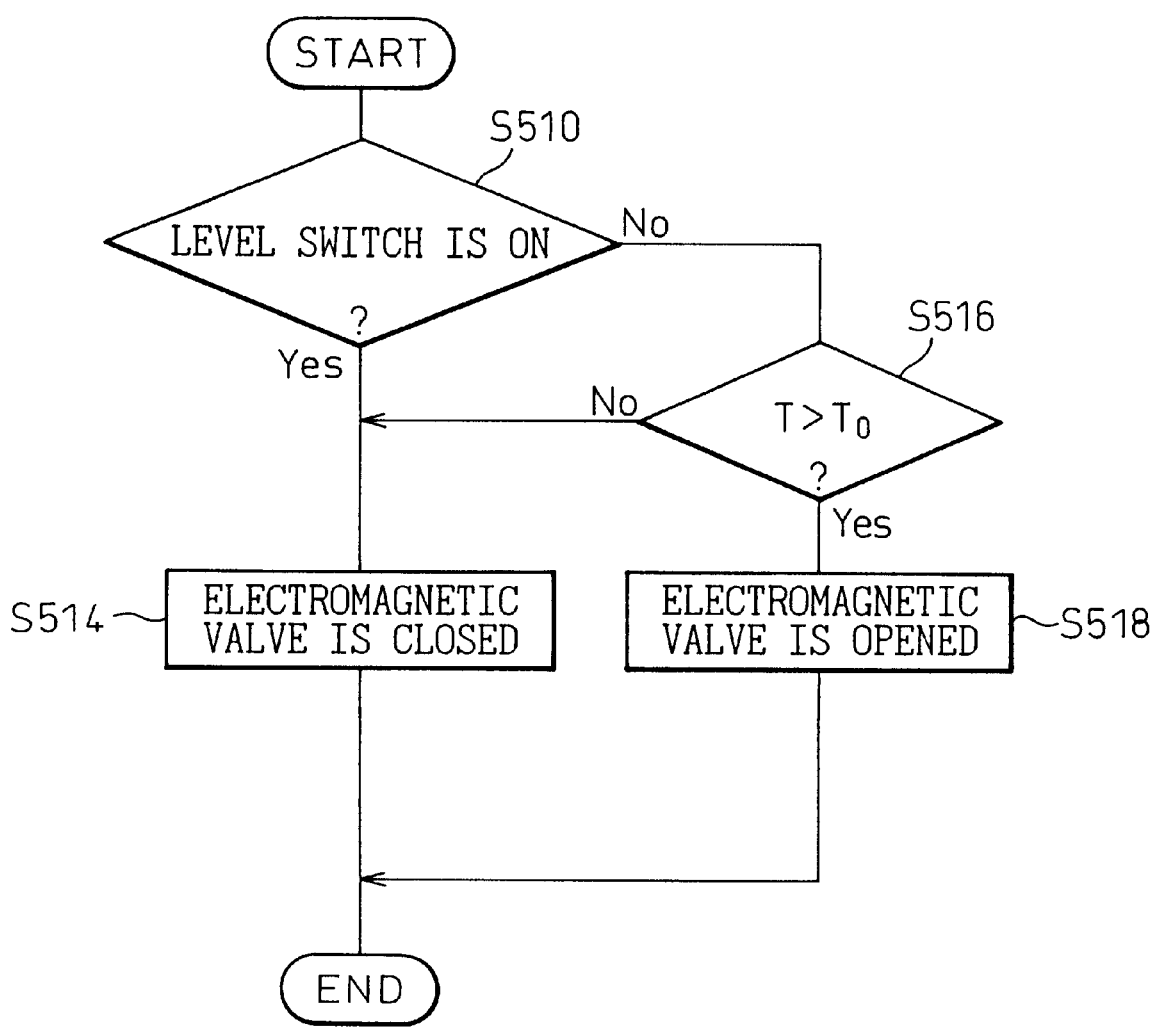
FIG. 12 is a flowchart of a fuel vapor eliminating operation according to the fifth embodiment of the invention.

The fuel vapor eliminating operation according to the fifth embodiment will be explained below by referring to a flowchart in FIG. 12.

At step 510, it is judged if the level switch 57 is on. When the level switch 57 is on, it is judged that no fuel vapor eliminating operation needs to be carried out, the routine proceeds to step 514 where the electromagnetic valve 51 is closed, and the routine is ended. On the other hand, when the level switch 57 is off, it is judged that the fuel vapor eliminating operation should be carried out, the routine proceeds to step 516.

At step 516, it is judged if the temperature T of the cooling water is higher than the predetermined temperature T0 (T>T0). When T>T0, the temperature of the cooling water does not allow the fuel vapor eliminating operation, the routine proceeds to step 514 where the electromagnetic valve 51 is closed, and the routine is ended. On the other hand, when T≦T0, the temperature of the cooling water allows the fuel vapor eliminating operation, the routine proceeds to step 518 where the electromagnetic valve 51 is opened to introduce the negative pressure into the fuel chamber 7, and the routine is ended.

In the third embodiment, the pressure in the air chamber 6 is kept at the pressure at which the relief valve 37 is opened when the air pump is activated. After the air pump 35 is stopped, the pressure in the air chamber 6 is relieved through the hole 39 of the relief valve 37 and is kept at the atmospheric pressure.

It takes a certain time until the pressure in the air chamber 6 is sufficiently relieved by means of the hole 39 since the hole 39 is small to not since the small to prevent a sudden decrease in pressure in the air chamber 6 and to not prevent an increase in the pressure in the air chamber 6 by the air pump 35. Therefore, the fuel cannot flow into the fuel chamber 7 through the fuel filling nozzle if the pressure in the air chamber 6 is too high. According to the sixth embodiment, the fuel can flow into the fuel chamber 7 through the fuel filling nozzle even after the pressure in the air chamber 6 is increased.

A fuel reserving device according to the sixth embodiment of the invention will be explained below.

Figure 13:
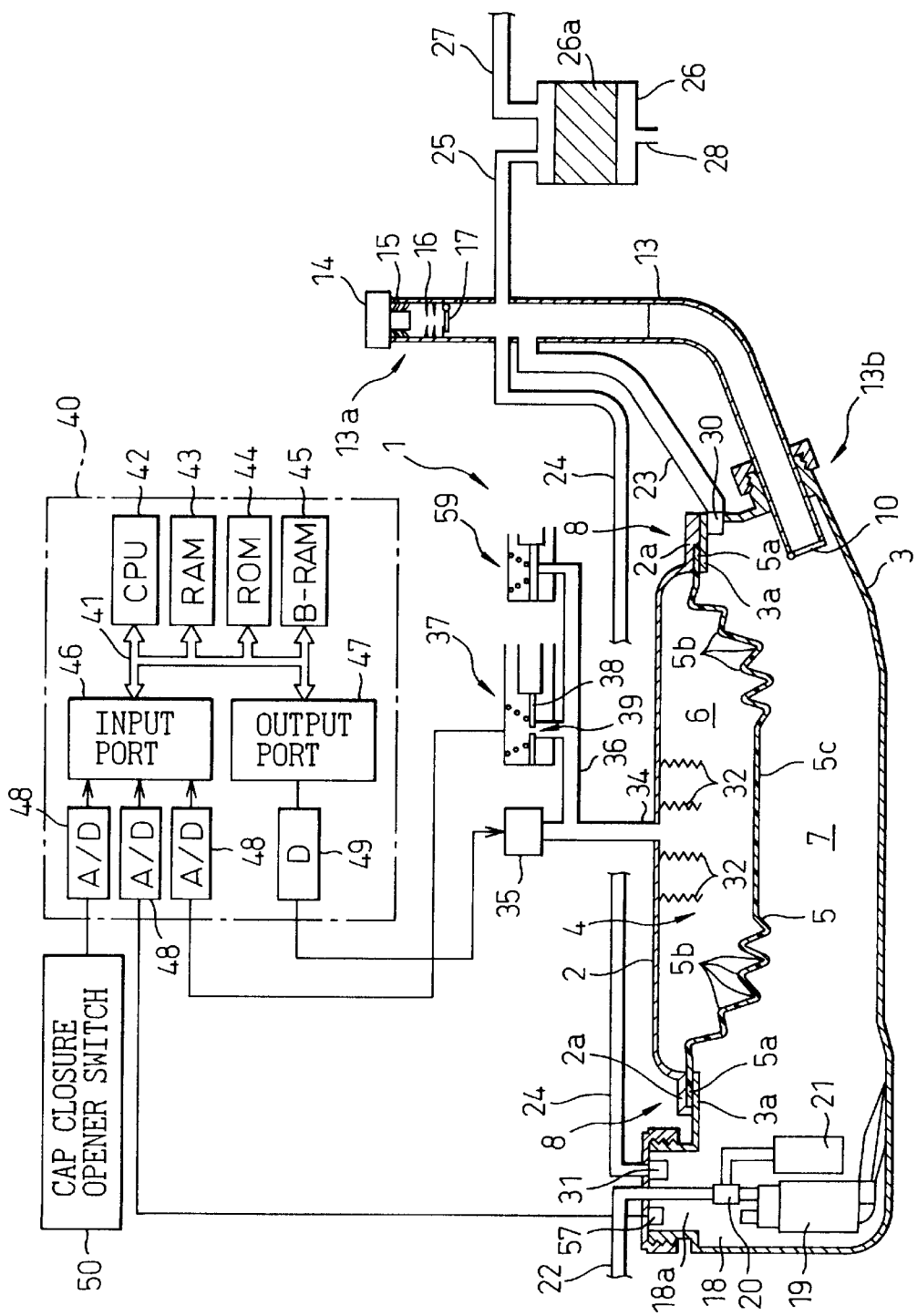
FIG. 13 is a sectional view of a fuel reserving device according to the sixth embodiment of the invention.

In the sixth embodiment, as shown in FIG. 13, a second relief valve 59 is connected to the second connection pipe 36. The second relief valve 59 is opened to relieve the pressure in the air chamber 6 when the pressure in the air chamber 6 is higher than a second predetermined pressure. The second predetermined pressure is lower than the pressure of the fuel when the fuel is supplied by the fuel filling nozzle. The amount of the air relieved from the second relief valve 59 is smaller than that pumped by the air pump 35, and is larger than that flowing through the hole 39 of the relief valve 37.

Components other than those described above are the same as those of the fuel reserving device according to the third embodiment. Therefore, an explanation thereof will not be given.

A fuel vapor eliminating operation according to the sixth embodiment will be explained below.

The fuel vapor elimination operation according to the sixth embodiment is carried out in the same manner as the third embodiment. Also, in the same manner as the third embodiment, the air pump 35 is stopped when the level switch 57 is on or the relief valve 37 is opened.

In the sixth embodiment, when the pressure in the air chamber 6 is higher than the second predetermined pressure after the air pump 35 is stopped, the second relief valve 59 is opened. Therefore, the pressure in the air chamber 6 becomes lower than the pressure of the fuel when the fuel is supplied by the fuel filling nozzle earlier than the third embodiment. Thus, the fuel can flow into the fuel chamber 7 through the fuel filling nozzle.

Further, according to the sixth embodiment, the increasing rate of the pressure in the air chamber is lower than that in the third embodiment when the pressure is in the range between the opening pressure of the second relief valve 59 and the opening pressure of the relief valve 37.

A flowchart of the sixth embodiment is the same as that of the third embodiment. Therefore, an explanation thereof will not be given.

In the sixth embodiment, the pressure in the air chamber 6 is increased by the air pump 35 with the pressure in the air chamber 6 being relieved by the second relief valve 59 when the pressure in the air chamber 6 is higher than the second predetermined pressure. Therefore, the rate of the increase in the pressure in the air chamber 6 in the sixth embodiment is lower than that in the third embodiment which comprises no second relief valve. Thus, in the sixth embodiment, a time from when the opener switch 50 is on to when the opening of the cap closure is allowed is longer than that in the third embodiment. According to the seventh embodiment, the fuel can flow into the fuel chamber 7 through the fuel filling nozzle even after the pressure in the air chamber 6 is increased, and the rate of the increase in the pressure in the air chamber becomes larger than that in the sixth embodiment.

A fuel reserving device according to the seventh embodiment of the invention will be explained below.

Figure 14:
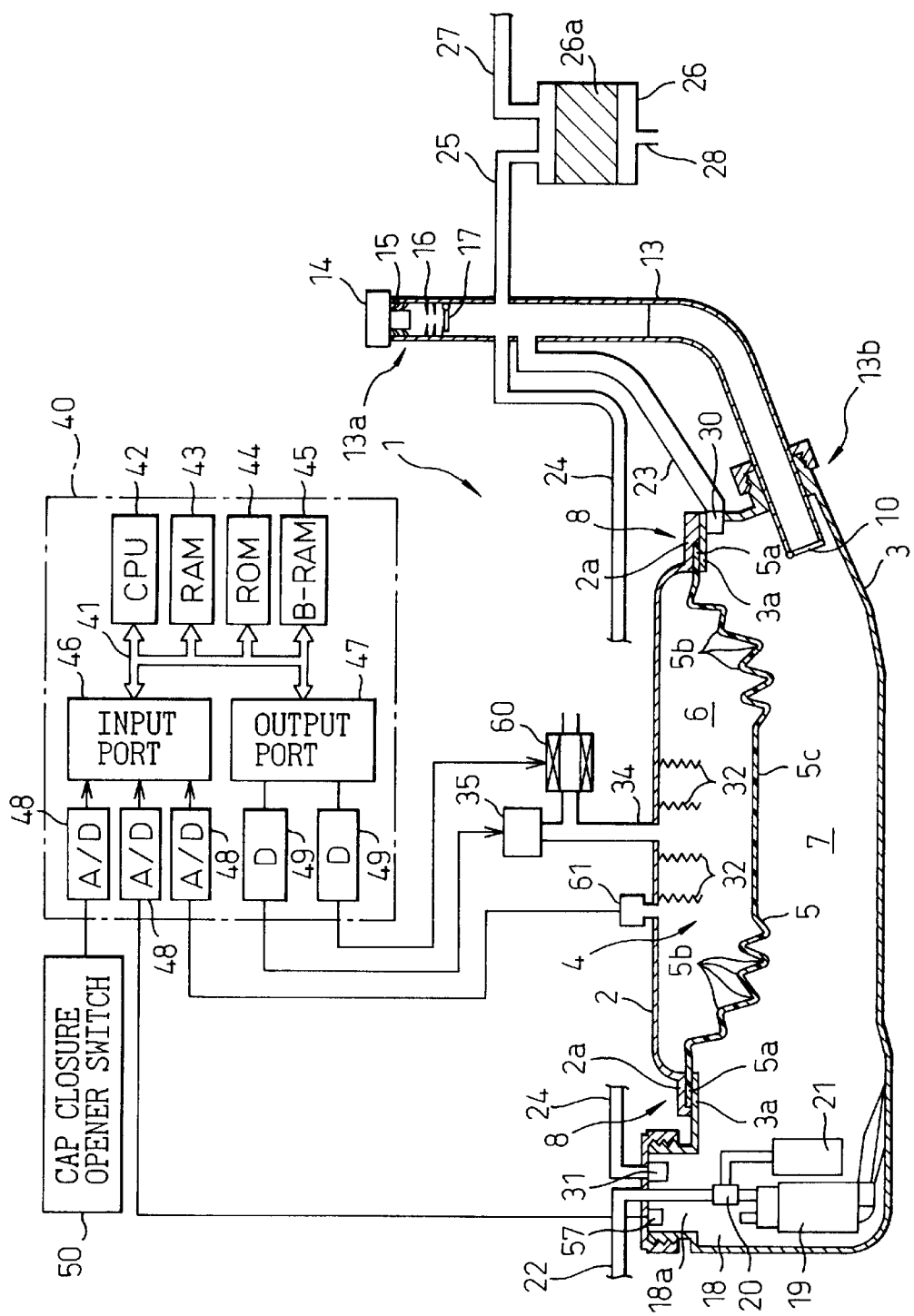
FIG. 14 is a sectional view of a fuel reserving device according to the seventh embodiment of the invention.

In the seventh embodiment, as shown in FIG. 14, an electromagnetic valve 60, instead of the relief and the second relief valves 37 and 59, is connected to the second connection pipe 36. The electromagnetic valve 60 is connected to the output port 47 via a corresponding drive circuit 49, and is controlled by the electronic control unit 40. The electromagnetic valve 60 shuts off the communication between the air chamber 6 and the outside air.

A pressure sensor 61 for sensing the pressure in the air chamber 6 is mounted on the upper portion 2 of the tank 1. The sensor 61 is connected to the input port 46 via a corresponding AD converter 48.

Components other than those described above are the same as those of the fuel reserving device according to the sixth embodiment. Therefore, an explanation thereof will not be given.

A fuel vapor eliminating operation according to the seventh embodiment will be explained below.

In the seventh embodiment, it is judged if the pressure in the air chamber 6 is lower than a maximum predetermined pressure. The maximum predetermined pressure is lower than that at which the wall 5 may be subject to a damage by the pressure in the air chamber 6. When the pressure in the air chamber 6 is lower than the maximum predetermined pressure, it is judged that the condition of the engine and the fuel tank 1 allows the fuel vapor eliminating operation.

Further, in seventh embodiment, it is judged if the cap closure opener switch 50 and the level switch 57 are on. When the cap closure opener switch 50 is on and the level switch 57 is off, it is judged that the fuel vapor eliminating operation should be carried out.

Further, in seventh embodiment, it is judged if the pressure in the air chamber 6 is lower than a second predetermined pressure. The second predetermined pressure is lower than the pressure of the fuel when the fuel is supplied by the fuel filling nozzle. When the pressure in the air chamber 6 is lower than the second predetermined pressure, it is judged that the pressure in the air chamber 6 allows the cap closure to open.

When the condition of the engine and the fuel tank 1 allows the fuel vapor eliminating operation, and the fuel vapor eliminating operation should be carried out, the electromagnetic valve 60 is closed and the air pump 35 is activated to increase the pressure in the air chamber 6. Therefore, the fuel vapor above the fuel surface is discharged from the fuel chamber 7 via the circulation and the fuel vapor discharging pipes 23 and 24. According to the seventh embodiment, the rate of the increase in the pressure in the air chamber 6 is larger than that in the sixth embodiment.

When no fuel vapor eliminating operation needs to be carried out, the air pump 35 is stopped, the electromagnetic valve 60 is opened to make the pressure in the air chamber 6 lower than the second predetermined pressure, and the opening of the cap closure is allowed.

When the condition of the engine and the fuel tank 1 does not allow the fuel vapor eliminating operation, the air pump 35 is stopped and the electromagnetic valve 60 is opened to make the pressure in the air chamber 6 lower than the maximum predetermined pressure.

In the seventh embodiment, the air pump 35 corresponds to means for discharging gas from the space formed above the fuel surface or for raising the level of the fuel surface, and the level switch 57 corresponds to means for detecting the level of the fuel surface.

Figure 15:
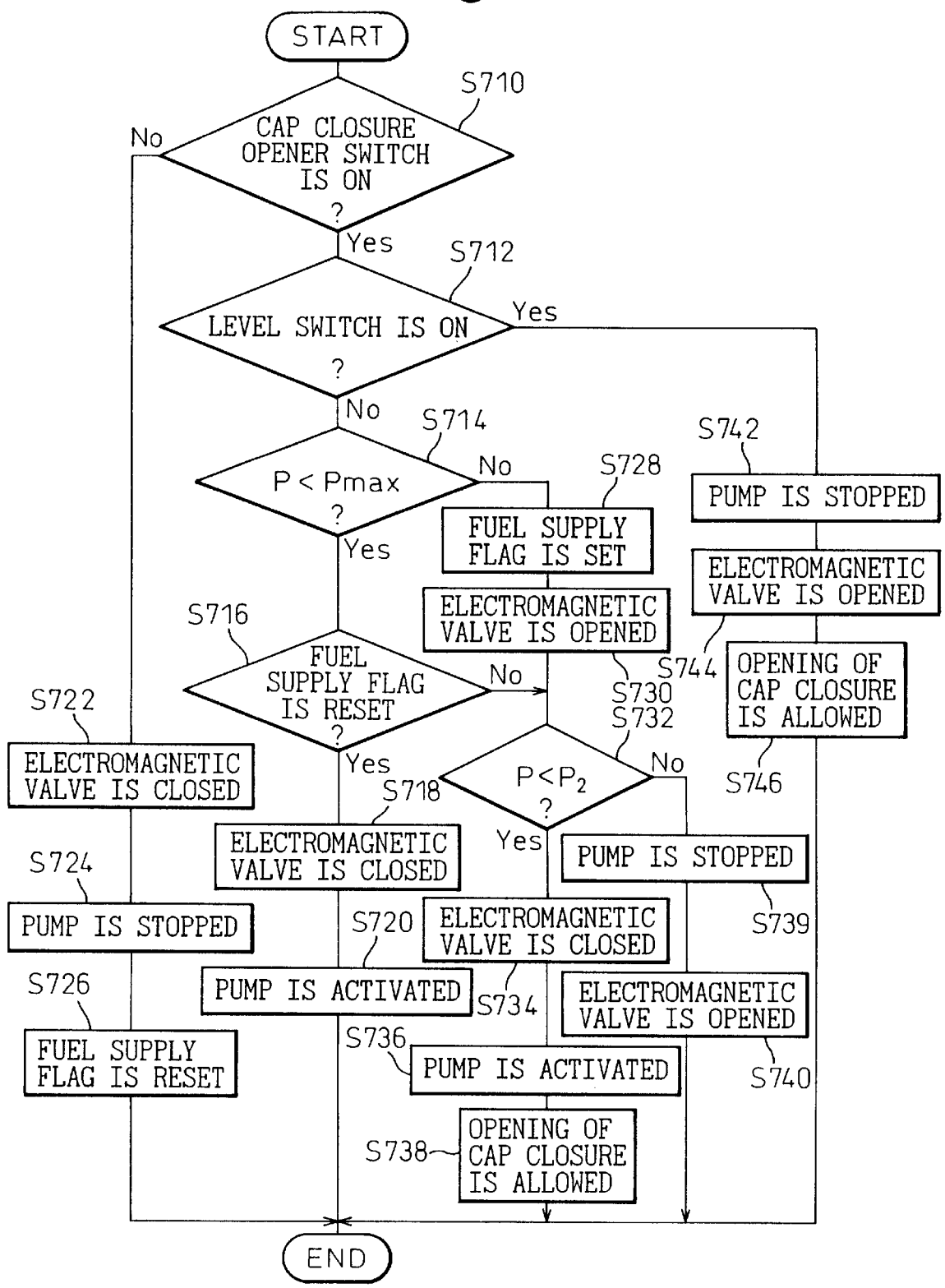
FIG. 15 is a flowchart of a fuel vapor eliminating operation according to the seventh embodiment of the invention.

The fuel vapor eliminating operation according to the seventh embodiment will be explained below by referring to a flowchart in FIG. 15.

At step 710, it is judged if the cap closure opener switch 50 is on. When the switch 50 is on, the routine proceeds to step 712. On the other hand, when the switch 50 is off, i.e., when the supply of the fuel into the fuel chamber 7 is completed, the routine proceeds to step 722 where the electromagnetic valve 60 is closed to keep the pressure in the air chamber 6 relatively high, the routine proceeds to step 724 where the air pump 35 is stopped, the routine proceeds to step 726 where a fuel supply flag is reset, and the routine is ended. The fuel supply flag is set when it is judged that the pressure in the air chamber 6 does not allow the fuel vapor eliminating operation, and is reset when the supply of the fuel into the fuel chamber is completed.

At step 712, it is judged if the level switch 57 is on. When the switch 57 is on, it is judged that no fuel vapor eliminating operation needs to be carried out, the routine proceeds to step 742 where the air pump 35 is stopped, the routine proceeds to step 744 where the electromagnetic valve 60 is opened to make the pressure in the air chamber 6 lower than the second predetermined pressure, the routine proceeds to step 746 where the opening of the cap closure is allowed, and the routine is ended.

On the other hand, at step 712, when the level switch 57 is off, it is judged that the fuel vapor eliminating operation should be carried out, and the routine proceeds to step 714.

At step 714, it is judged if the pressure P in the air chamber 6 is lower than the maximum predetermined pressure Pmax (P<Pmax). When P<Pmax, the routine proceeds to step 716. On the other hand, when P≧Pmax, it is judged that the pressure in the air chamber 6 does not allow the fuel vapor eliminating operation since the pressure in the air chamber 6 is already higher than the maximum predetermined pressure, the routine proceeds to step 728 where the fuel supply flag is set, the routine proceeds to step 730 where the electromagnetic valve 60 is opened to decrease the pressure in the air chamber 6, and the routine proceeds to step 732.

At step 716, it is judged if the fuel supply flag is reset. When the flag is reset, it is judged that the pressure in the air chamber 6 allows the fuel vapor eliminating operation, the routine proceeds to step 718 where the electromagnetic valve 60 is closed, the routine proceeds to step 720 where the air pump 35 is activated, and the routine is ended.

On the other hand, when the fuel supply flag is set, it is judged that the pressure in the air chamber 6 does not allow the fuel vapor eliminating operation, and the routine proceeds to step 732.

At step 732, it is judged if the pressure P in the air chamber 6 is lower than the second predetermined pressure P2 (P<P2). When P<P2, it is judged that the pressure in the air chamber 6 allows the supply of the fuel into the fuel chamber 7, the routine proceeds to step 734 where the electromagnetic valve 60 is closed, the routine proceeds to step 736 where the air pump 35 is activated to keep the pressure in the air chamber 6 relative high during the supply of the fuel into the fuel chamber 7, the routine proceeds to step 738 where the opening of the cap closure is allowed, and the routine is ended.

On the other hand, when P≧P2, it is judged that the pressure in the air chamber 6 does not allow the supply of the fuel into the fuel chamber 7, the routine proceeds to step 739 where the air pump 35 is stopped, the routine proceeds to step 740 where the electromagnetic valve 60 is opened, and the routine is ended.

In the second embodiment, the fuel may move in the fuel chamber when the rate of the increase in the pressure in the air chamber is large. Therefore, the first and second shut off valves may open so that the fuel may enter into the circulation and fuel vapor discharging pipes. According to the eighth embodiment, the inclination of the increase in the pressure in the air chamber is made smaller than that at which the fuel may largely move in the fuel chamber.

A fuel reserving device according to the eighth embodiment will be explained below.

Figure 16:
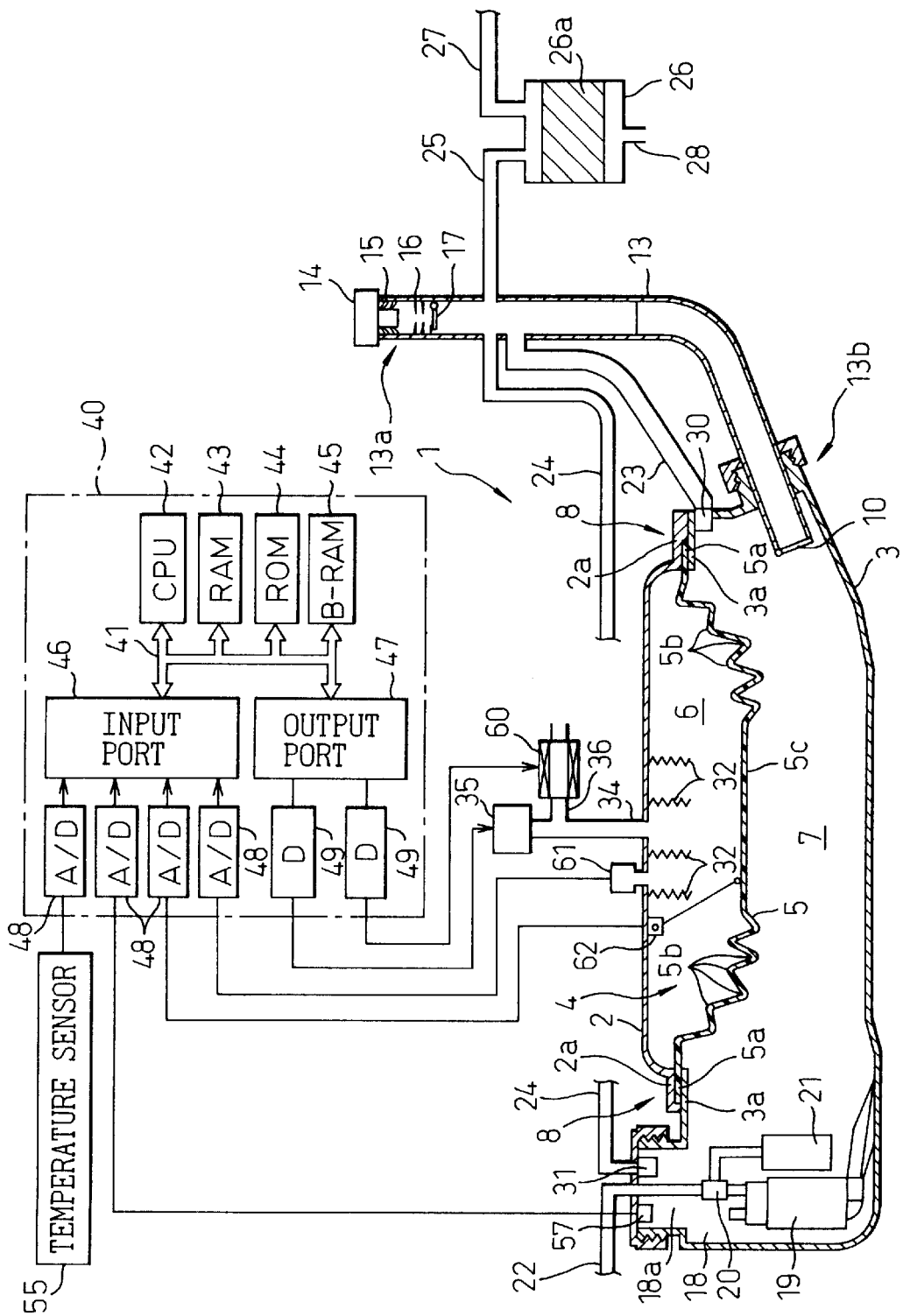
FIG. 16 is a sectional view of a fuel reserving device according to the eighth embodiment of the invention.

In the eighth embodiment, as shown in FIG. 16, an electromagnetic valve 60 instead of the relief valve 37 in the second embodiment is connected to the second connection pipe 36. The valve 60 is connected to the output port 47 via a corresponding drive circuit 49, and is controlled by the electronic control unit 40. The valve 60 shuts off the communication between the air chamber 6 and the outside air.

A pressure sensor 61 for sensing the pressure in the air chamber 6 is mounted on the upper portion 2 of the tank 1. The sensor 61 is connected to the input port 46 via a corresponding AD converter 48.

A fuel level gauge 62 for detecting the amount of the fuel in the fuel chamber 7 by detecting the position of the wall 5 is mounted on the upper portion 2 of the tank 1. The gauge 62 is connected to the input port 46 via a corresponding AD converter 48.

The fuel reserving device comprises a temperature sensor 55 for generating a voltage corresponding to the temperature of the cooling water for cooling the engine. The temperature sensor 55 is connected to the input port 46 via a corresponding AD convener 48.

Components other than those described above are the same as those of the fuel reserving device according to the second embodiment. Therefore, an explanation thereof will not be given.

A fuel vapor eliminating operation according to the eight embodiment will be explained below.

In the eighth embodiment, it is judged if the temperature of the cooling water is higher than a predetermined temperature and the amount of the fuel in the fuel chamber 7 is larger than a predetermined amount of the fuel. The predetermined temperature is higher than that of the cooling water when the cooling water cools the engine in the constant driving condition, and the predetermined amount of the fuel is larger than that sufficient to raise the level of the fuel surface to the highest level in the fuel chamber 7 when the separating wall 5 is moved down.

When the temperature of the cooling water is higher than a predetermined temperature and the amount of the fuel in the fuel chamber 7 is larger than a predetermined amount of the fuel, it is judged that the conditions of the engine and the fuel tank 1 allow the fuel vapor eliminating operation.

Further, in the eighth embodiment, it is judged if the level switch 57 is off.

When the level switch 57 is off, it is judged that the fuel vapor eliminating operation should be carried out.

When the conditions of the engine and the fuel tank 1 allow the fuel vapor eliminating operation and the fuel vapor eliminating operation should be carried out, the fuel vapor eliminating operation is carried out, i.e., the electromagnetic valve 60 is closed and the air pump 35 is activated to increase the pressure in the air chamber 6. Therefore, the central portion 5c of the wall 5 is moved down to eliminate the fuel vapor from the space above the fuel surface in the fuel chamber 7.

Further, in the eighth embodiment, while the fuel vapor eliminating operation is carried out, it is judged if the rate of the increase in the pressure in the air chamber 6 is larger than that at which the fuel may largely move in the fuel chamber 7 on the basis of the pressure in the air chamber 6 detected by the pressure sensor 61.

When the rate of the increase in the pressure in the air chamber 6 is higher than that at which the fuel may largely move in the fuel chamber 7, the air pump 35 is stopped. On the other hand, when the rate of the increase in the pressure in the air chamber 6 is lower than that at which the fuel may largely move in the fuel chamber 7, the air pump 35 is activated. Therefore, the rate of the increase in the pressure in the air chamber 6 is kept lower than that at which the fuel may largely move in the fuel chamber 7 so that movement of the fuel in the fuel chamber 7 is prevented.

When the conditions of the engine and the fuel tank does not allow the fuel vapor eliminating operation or no fuel vapor eliminating operation needs to be carried out, the fuel vapor eliminating operation is stopped, i.e., the air pump 35 is stopped and the electromagnetic valve 60 is opened.

In the eighth embodiment, the air pump 35 corresponds to means for discharging gas from the space formed above the fuel surface or for raising the level of the fuel surface, and the level switch 57 or the fuel level gauge 62 corresponds to means for detecting the level of the fuel surface.

Figure 17:
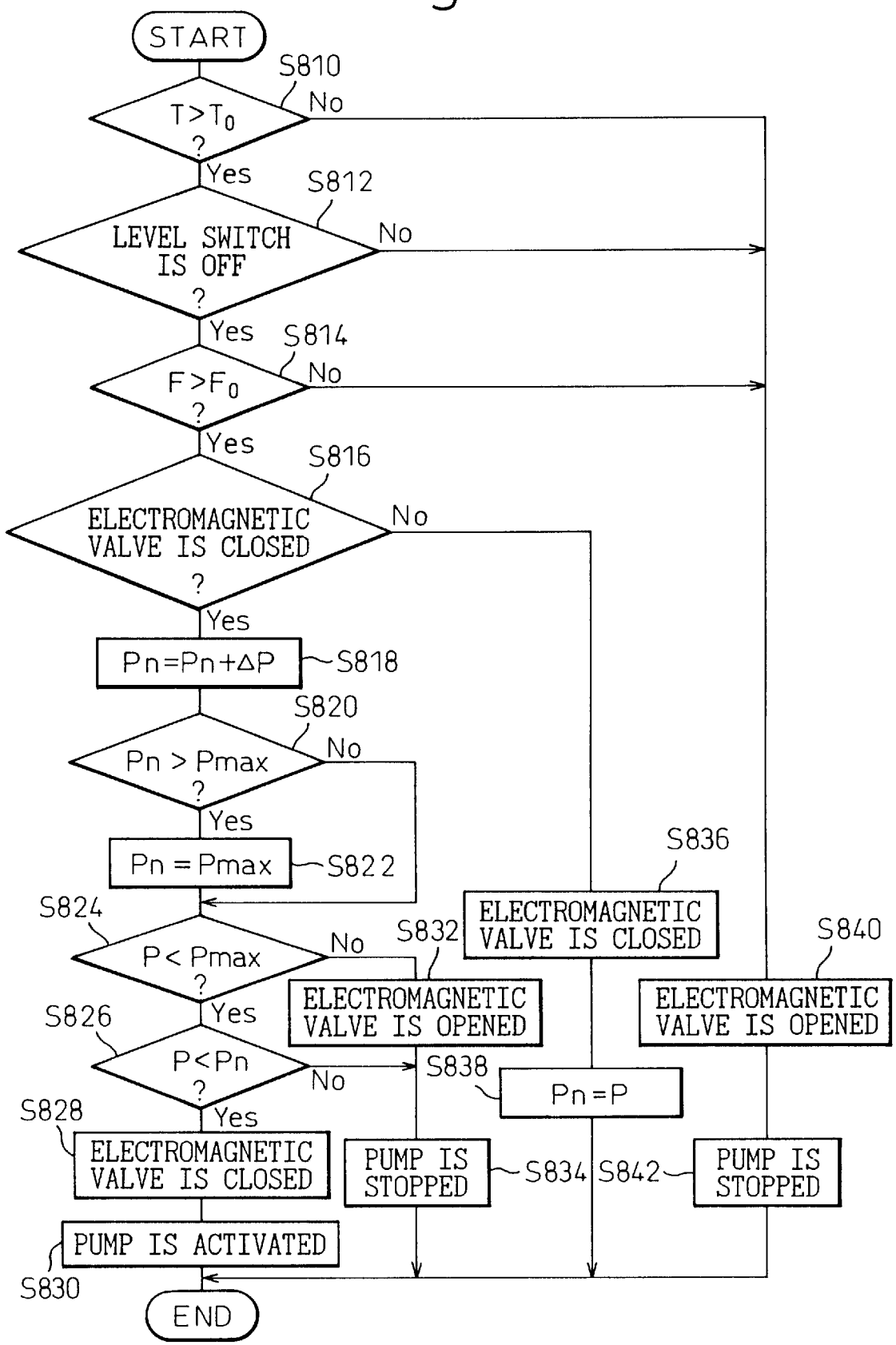
FIG. 17 is a flowchart of a fuel vapor eliminating operation according to the eighth embodiment of the invention.

The fuel vapor eliminating operation according the eighth embodiment will be explained below by referring to a flowchart in FIG. 17.

At step 810, it is judged if the temperature T of the cooling water is higher than a predetermined temperature T0 (T>T0). The predetermined temperature is that at which the purging of the fuel vapor discharged into the intake passage 52 is allowed. When T>T0, it is judged that the temperature of the cooling water allows the purging of the fuel vapor discharged into the intake passage 52, and the routine proceeds to step 812.

On the other hand, when T≦T0, the temperature of the cooling water does not allow the purging of the fuel vapor discharged into the intake passage 52, the routine proceeds to step 840 where the electromagnetic valve 60 is opened, the routine proceeds to step 842 where the pump 35 is stopped, and the routine is ended.

At step 812, it is judged if the level switch 57 is off. When the switch 57 is off, it is judged that the fuel vapor eliminating operation should be carried out, and the routine proceeds to step 814. On the other hand, when the switch 57 is on, it is judged that no fuel vapor eliminating operation needs to be carried out, the routine proceeds to step 840 where the electromagnetic valve 60 is opened, the routine proceeds to step 842 where the pump 35 is stopped, and the routine is ended.

At step 814, it is judged if the amount F of the fuel in the fuel chamber 7 is larger than a predetermined amount F0 of the fuel (F>F0). The predetermined amount of the fuel is larger than that sufficient to raise the level of the fuel surface to the highest level in the fuel chamber 7 when the separating wall 5 is moved down. At step 814, when F>F0, the routine proceeds to step 816.

On the other hand, at step 814, when F≦F0, the routine proceeds to step 840 where the electromagnetic valve 60 is opened, the routine proceeds to step 842 where the pump 35 is stopped, and the routine is ended.

At step 816, it is judged if the electromagnetic valve 60 is closed. When the valve 60 is closed, the routine proceeds to step 818 where this time target pressure Pn is calculated by adding a predetermined pressure ΔP to last time target pressure, and the routine proceeds to step 824.

On the other hand, at step 816, when the valve 60 is opened, the routine proceeds to step 836 where the valve 60 is closed, the routine proceeds to step 838 where the pressure in the air chamber 6 detected by the pressure sensor 61 is input into the target pressure Pn as an initial target pressure, and the routine is ended.

At step 820, it is judged if the target pressure Pn is higher than a maximum pressure Pmax (Pn>Pmax). The maximum pressure is lower than that at which the wall 5 may be subject to a damage by the pressure in the air chamber 6. At step 820, when Pn>Pmax, the routine proceeds to step 822 where the maximum pressure Pmax is input into the target pressure to limit the pressure in the air chamber 6 to the maximum pressure, and the routine proceeds to step 824.

On the other hand, at step 820, when Pn≦Pmax, the routine proceeds to step 824.

At step 824, it is judged if the pressure P in the air chamber 6 is lower than the maximum pressure Pmax (P<Pmax). When P<Pmax, it is judged that the pressure in the air chamber 6 allows the fuel vapor eliminating operation, the routine proceeds to step 826. On the other hand, when P≧Pmax, it is judged that the pressure in the air chamber 6 does not allow the fuel vapor eliminating operation, the routine proceeds to step 832 where the electromagnetic valve 60 is opened, the routine proceeds to step 834 where the air pump 35 is stopped, and the routine is ended.

At step 826, it is judged if the pressure P in the air chamber 6 is lower than the target pressure Pn (P<Pn). When P<Pn, it is judged that the rate of the increase in the pressure in the air chamber 6 is lower than that at which the fuel may largely move in the fuel chamber, the routine proceeds to step 828 where the electromagnetic valve 60 is closed, the routine proceeds to step 830 where the air pump 35 is activated, and the routine in ended.

On the other hand, at step 826, when P≧Pn, it is judged that the rate of the increase in the pressure in the air chamber 6 is higher than that at which the fuel may largely move in the fuel chamber 7, the routine proceeds to step 834 where the air pump 35 is stopped, and the routine is ended.

In the eighth embodiment, the fuel vapor discharged from the fuel chamber is introduced into the intake passage. Therefore, the air-fuel ratio of the air-fuel mixture is decreased by the fuel vapor introduced, i.e., the air-fuel ratio is not kept at a desired predetermined air-fuel ratio. According to the ninth embodiment, the air-fuel ratio is kept at a desired predetermined air-fuel ratio when the fuel vapor discharged is introduced into the intake passage.

A fuel reserving device according to the ninth embodiment of the invention will be explained below.

Figure 18:
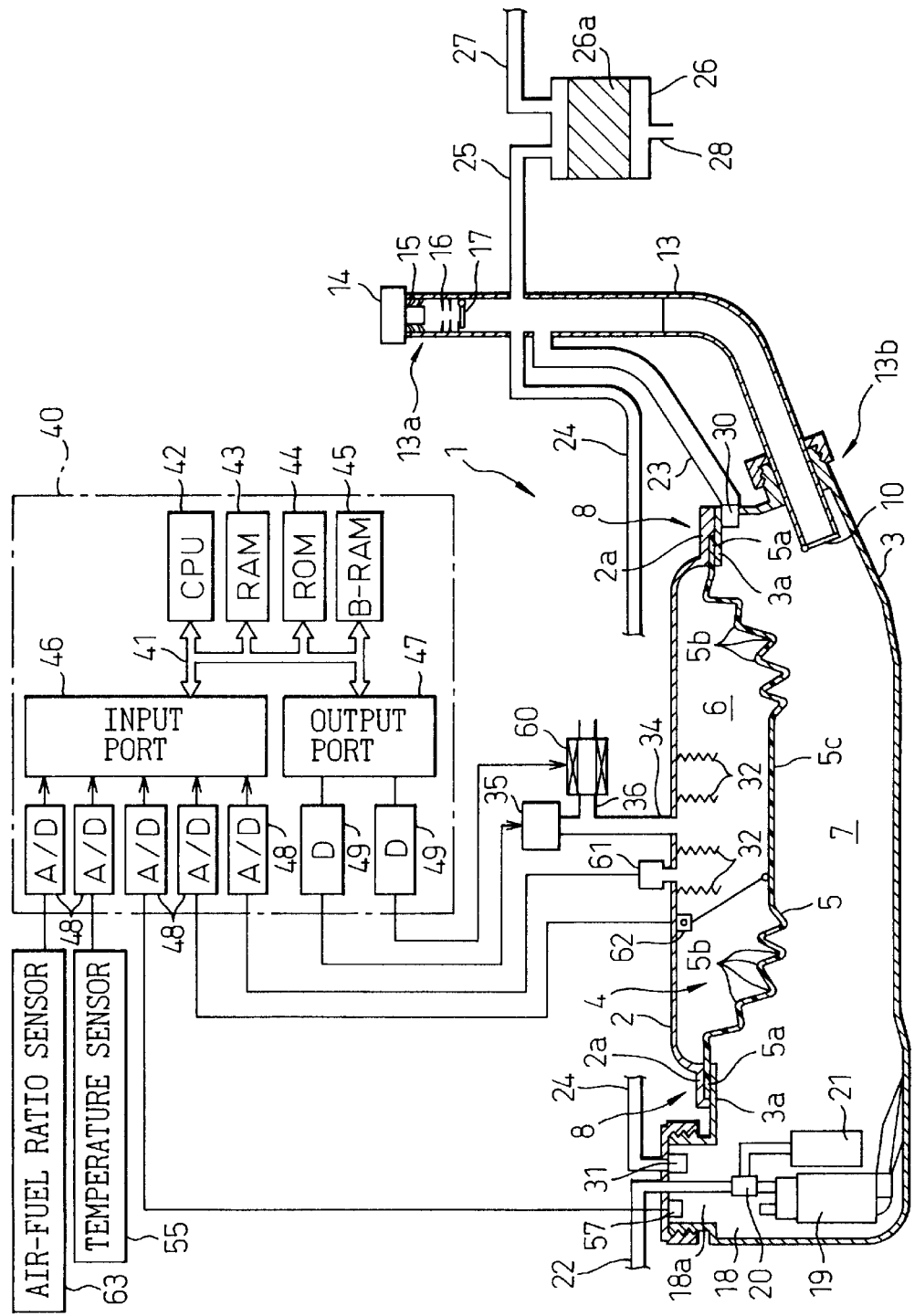
FIG. 18 is a sectional view of a fuel reserving device according to the ninth embodiment of the invention.

In the ninth embodiment, as shown in FIG. 18, the fuel reserving device comprises an air-fuel ratio sensor 63 for generating a voltage corresponding to an air-fuel ratio in the intake passage. The air-fuel ratio sensor 63 comprises an oxygen sensor or a linear sensor which generates a voltage corresponding to a concentration of the oxygen in the exhaust gas. The sensor 63 is connected to the input port 46 via a corresponding AD converter 48.

Components other than those described above are the same as those of the fuel reserving device according to the eighth embodiment. Therefore, an explanation thereof will not be given.

A fuel vapor eliminating operation according to the ninth embodiment will be explained below.

In the ninth embodiment, it is judged if the temperature of the cooling water is higher than a predetermined temperature, if the amount of the fuel in the fuel chamber 7 is larger than a predetermined amount of the fuel, and if the pressure in the air chamber 6 lower than a predetermined pressure. The predetermined temperature is higher than that of the cooling water when the cooling water cools the engine in a constant driving condition, the predetermined amount of the fuel is larger than that sufficient to raise the level of the fuel surface to the highest level in the fuel chamber 7 when the wall 5 is moved down, and the predetermined pressure is lower than that at which the wall may be subject to a damage by the pressure in the air chamber.

When the temperature of the cooling water is higher than a predetermined temperature, it the amount of the fuel in the fuel chamber 7 is larger than a predetermined amount of the fuel, and it the pressure in the air chamber 6 is lower than a predetermined pressure, it is judged that the conditions of the engine and the fuel tank 1 allow the purging of the fuel vapor.

Further, in the ninth embodiment, it is judged if the level switch 57 is off. When the switch 57 is off, it is judged that the fuel vapor eliminating operation should be carried out.

Further, in the ninth embodiment, it is judged if the air-fuel ratio detected by the air-fuel ratio sensor 63 is larger than a predetermined ratio. The predetermined ratio is at a desired air-fuel ratio. When the air-fuel ratio detected is larger than the predetermined ratio, it is judged that the air-fuel ratio allows the fuel vapor eliminating operation to continue.

When the conditions of the engine and the fuel tank 1 allow the purging of the fuel vapor, the fuel vapor eliminating operation should be carried out, and the air-fuel ratio allows to continue to carry out the fuel vapor eliminating operation, the fuel vapor eliminating operation is carried out, i.e., the electromagnetic valve 60 is closed, and the air pump 35 is activated to increase the pressure in the air chamber 6. Therefore, the central portion 5c of the wall 5 is moved down to eliminate the fuel vapor from the space above the fuel surface in the fuel chamber 7.

When the air-fuel ratio does not allow the fuel vapor eliminating operation to continue even if the conditions of the engine and the fuel tank 1 allow the purging of the fuel vapor and the fuel vapor eliminating operation should be carried out, the fuel vapor eliminating operation is stopped, i.e., the air pump 35 is stopped.

Therefore, according to the ninth embodiment, the amount of the fuel vapor introduced into the intake passage is controlled so that the air-fuel ratio is kept at the desired predetermined ratio.

Of course, when the conditions of the engine and the fuel tank 1 does not allow the purging of the fuel vapor or no fuel vapor eliminating operation needs to be carried out, the fuel vapor eliminating operation is stopped, i.e., the air pump 35 is stopped.

In the ninth embodiment, the purging of the fuel vapor into the intake passage corresponds to means for discharging gas from the space formed above the fuel surface or for raising the level of the fuel surface, and the level switch 57 or the fuel level gauge 62 corresponds to means for detecting the level of the fuel surface.

Figure 19:
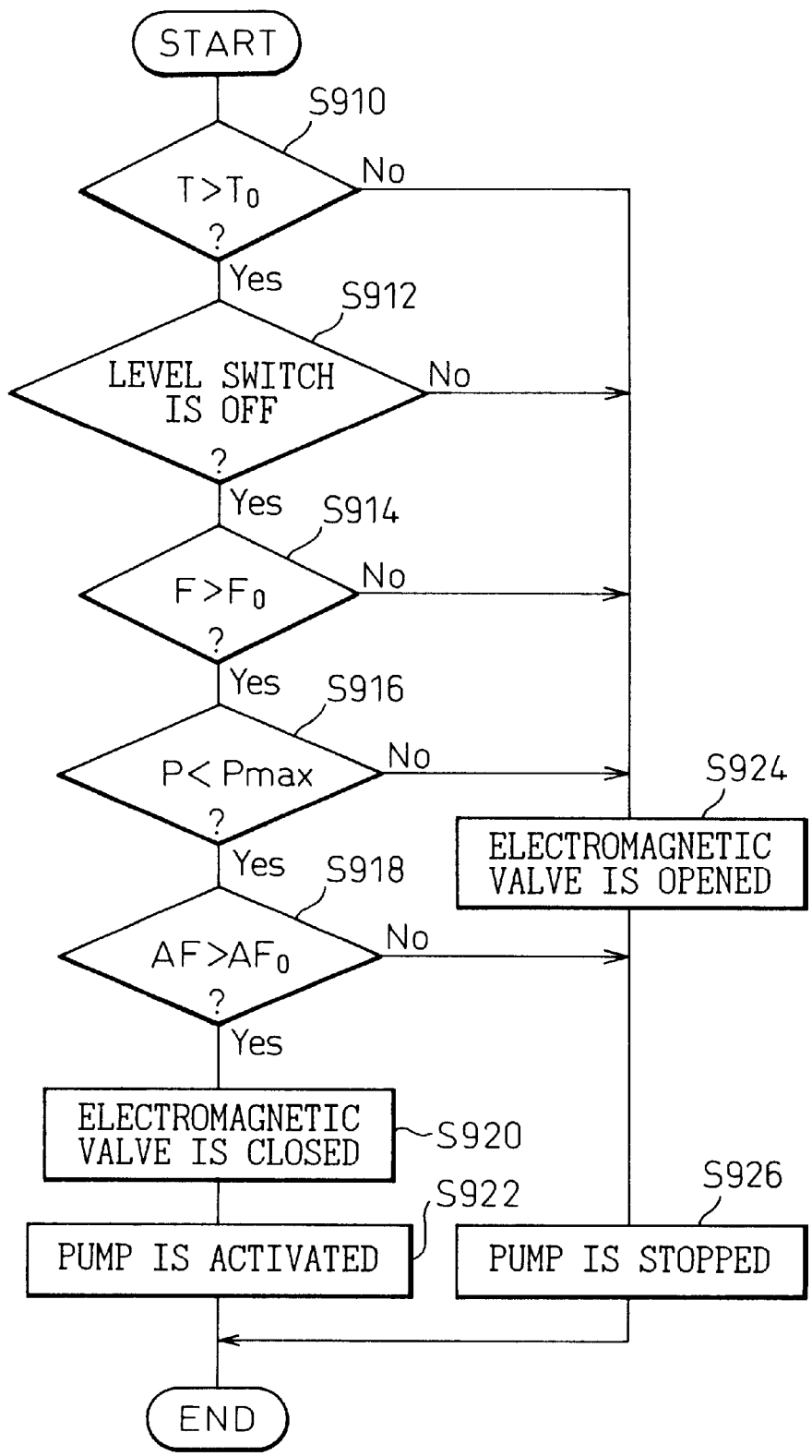
FIG. 19 is a flowchart of a fuel vapor eliminating operation according to the ninth embodiment of the invention.

The fuel vapor eliminating operation according to the ninth embodiment will be explained below by referring to a flowchart in FIG. 19. In the flowchart, steps 910, 912 and 914 correspond to steps 810, 812 and 814 in FIG. 17, respectively. Therefore, an explanation thereof will not be given.

At step 914, when F>F0, the routine proceeds to step 916. On the other hand, when F≦F0, the routine proceeds to step 924 where the electromagnetic valve 60 is opened, the routine proceeds to step 926 where the air pump 35 is stopped, and the routine is ended.

At step 916, it is judged if the pressure P in the air chamber 6 is lower than the maximum pressure Pmax (P<Pmax). When P<Pmax, it is judged that the pressure in the air chamber 6 allows the fuel vapor eliminating operation and the routine proceeds to step 918. On the other hand, when P≧Pmax, it is judged that the pressure in the air chamber 6 does not allow the fuel vapor eliminating operation, the routine proceeds to step 924 where the electromagnetic valve 60 is opened, the routine proceeds to step 926 where the air pump 35 is stopped, and the routine is ended.

At step 918, it is judged if the air-fuel ratio AF is larger than the desired predetermined ratio AF0 (AF>AF0). When AF>AF0, it is judged that the air-fuel ratio allows the fuel vapor eliminating operation to continue, the routine proceeds to step 920 where the electromagnetic valve 60 is closed, the air pump 35 is activated, and the routine is ended.

On the other hand, when AF≦AF0, it is judged that the air-fuel ratio does not allow the fuel vapor eliminating operation to continue, the routine proceeds to step 926 where the air pump 35 is stopped, and the routine is ended.

In the third and seventh embodiments, the supply of the fuel into the fuel chamber is carried out when the pressure in the air chamber is kept increased. Therefore, the increased pressure in the air chamber may force the fuel in the fuel chamber to flow back into the fuel feeding pipe when the supply of the fuel into the fuel chamber is stopped. According to the tenth embodiment, the flow of the fuel in the fuel chamber back into the fuel feeding pipe is prevented.

A fuel reserving device according to the tenth embodiment of the invention will be explained below.

Figure 20:
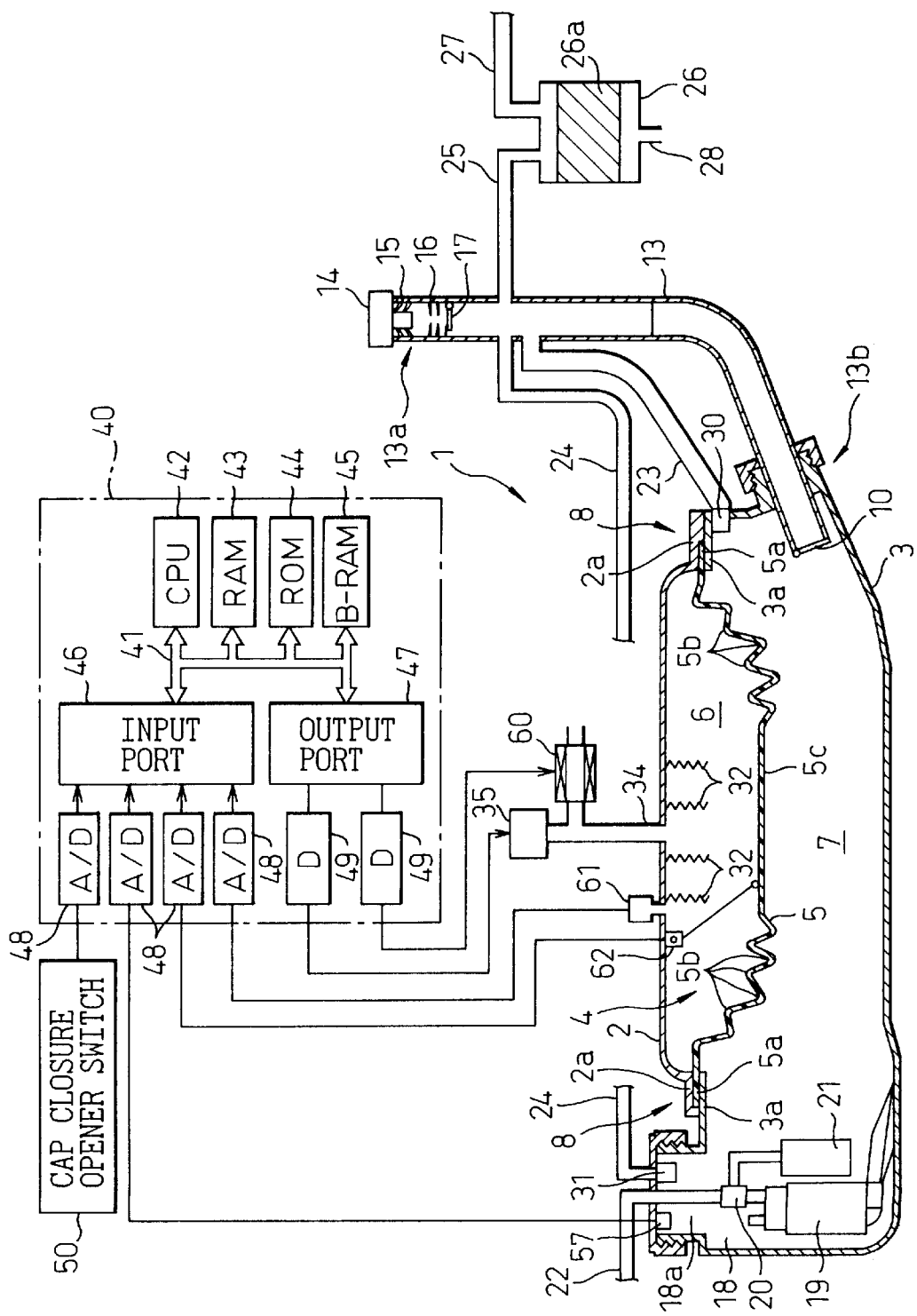
FIG. 20 is a sectional view of a fuel reserving device according to the tenth embodiment of the invention.

In the tenth embodiment, as shown in FIG. 20, a fuel level gauge 62 for detecting the amount of the fuel in the fuel chamber by detecting the position of the wall 5 is mounted on the upper portion 2 of the fuel tank 1. The gauge 62 is of a pendulum type, one end of which is positioned on the central portion 5c of the wall 5 and a voltage is generated according to the angle of the pendulum (i.e., the position of the fuel surface). The generated voltage is input into the input port 46 via a corresponding AD converter 48.

Components other than those described above are the same as those of the fuel reserving device according to the seventh embodiment. Therefore, an explanation thereof will not be given.

A fuel vapor eliminating operation according to the tenth embodiment will be explained below.

The fuel vapor eliminating operation is carried out in the same manner as that in the seventh embodiment until the opening of the cap closure is allowed. Therefore, an explanation thereof will not be given.

In the tenth embodiment, after the cap closure is opened, the supply of the fuel into the fuel chamber 7 is carried out until the fuel chamber 7 is full with fuel.

Further, in the tenth embodiment, the electromagnetic valve 60 is opened to decrease the pressure in the air chamber 6 when a predetermined time has elapsed. The predetermined time is that from detecting the fuel chamber 7 to be full with the fuel to the stopping of the supply of the fuel into the fuel chamber 7.

Therefore, according to the tenth embodiment, the pressure in the air chamber 6 is decreased when the supply of the fuel into the fuel chamber 7 is stopped. Thus, the flow of the fuel back into the fuel feeding pipe is prevented.

In the ninth embodiment, the air pump 35 or the fuel level gauge 62 corresponds to means for discharging gas from the space formed above the fuel surface or for raising the level of the fuel surface, and the level switch 57 corresponds to means for detecting the level of the fuel surface.

The fuel vapor eliminating operation according to the tenth embodiment will be explained below by referring to a flowchart in FIGS. 21 and 22.

Figure 21:
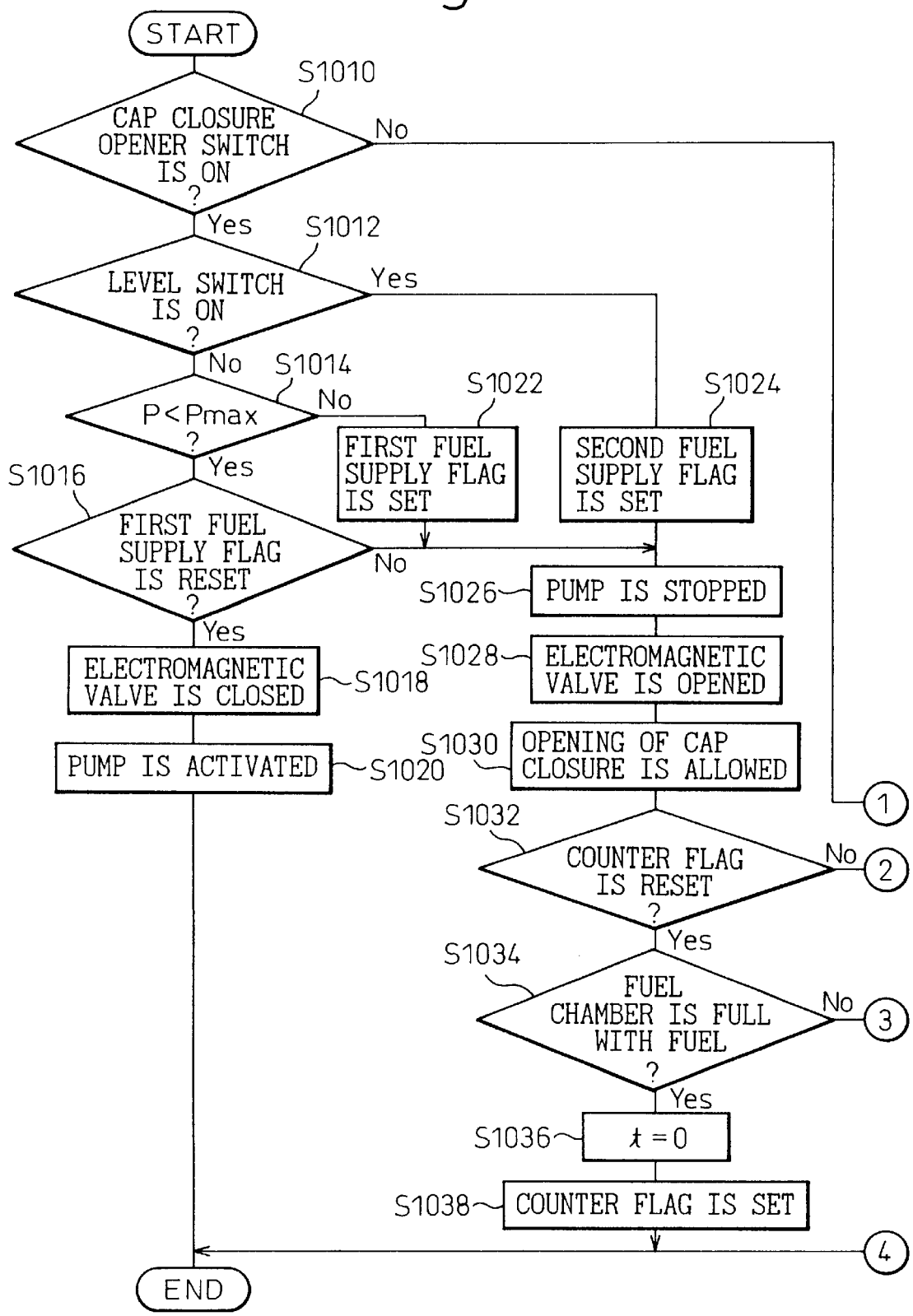
FIG. 21 is a part of a flowchart of a fuel vapor eliminating operation according to the tenth embodiment of the invention.
Figure 22:
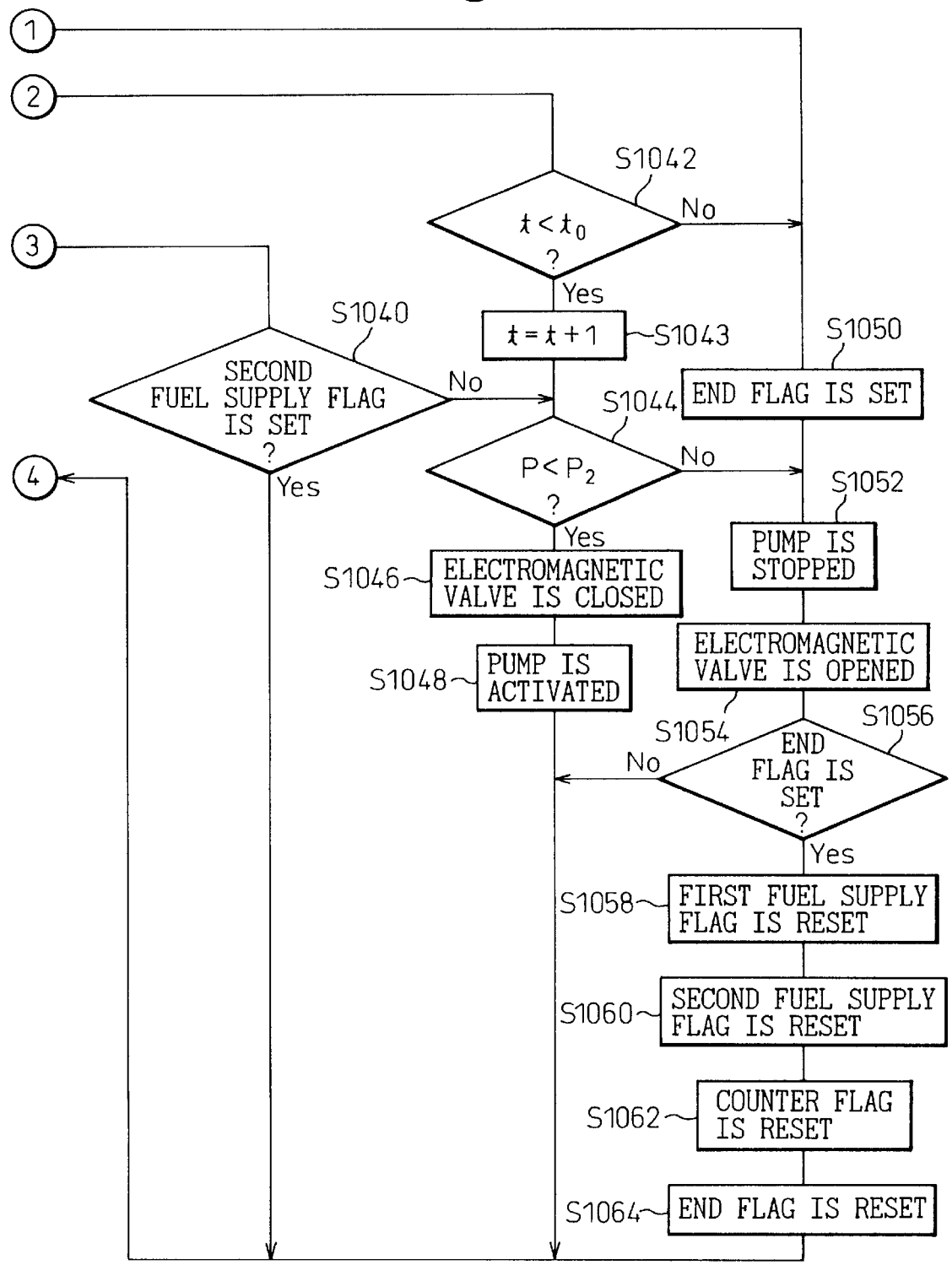
FIG. 22 is a part of a flowchart of a fuel vapor eliminating operation according to the tenth embodiment of the invention.

At step 1010 in FIG. 21, it is judged if the cap closure opener switch 50 is on. When the switch 50 is on, the routine proceeds to step 1012. On the other hand, when the switch 50 is off, it is judged that no supply of the fuel into the fuel chamber 7 is to be carried out, the routine proceeds to step 1050 in FIG. 22 where the end flag is set, the routine proceeds to step 1052 where the air pump 35 is stopped, the routine proceeds to step 1054 where the electromagnetic valve 60 is opened, and the routine proceeds to step 1056. The end flag is set when the cap closure is closed, and is reset when first fuel supply, second fuel supply and counter flags as described below are reset.

At step 1012 in FIG. 21, it is judged if the level switch 57 is on. When the switch 57 is on, it is judged that no fuel vapor eliminating operation needs to be carried out, the routine proceeds to step 1024 where the second fuel supply flag is set, the routine proceeds to step 1026 where the air pump 35 is stopped, the routine proceeds to step 1028 where the electromagnetic valve 60 is opened, the routine proceeds to step 1030 where the opening of the cap closure is allowed to carry out the supply of the fuel into the fuel chamber 7, and the routine proceeds to step 1032. The second fuel supply flag is set when the level switch 57 is off and is reset when the cap closure is closed.

On the other hand, at step 1012, when the switch 57 is off, it is judged that the fuel vapor eliminating operation should be carried out, and the routine proceeds to step 1014.

At step 1014, it is judged if the pressure P in the air chamber 6 is lower than a maximum pressure Pmax (P<Pmax). The maximum pressure is lower than that at which the wall 5 may be subject to a damage by the pressure in the air chamber 6. When P<Pmax, it is judged if the pressure in the air chamber 6 allows the fuel vapor eliminating operation, the routine proceeds to step 1016. On the other hand, when P≧Pmax, it is judged if the pressure in the air chamber 6 does not allow the fuel vapor eliminating operation, the routine proceeds to step 1022 where the first fuel supply flag is set, the routine proceeds to step 1026 where the air pump 35 is stopped, the routine proceeds to step 1028 where the electromagnetic valve 60 is opened, the routine proceeds to step 1030 where the opening of the cap closure is allowed, and the routine proceeds to step 1032. The first fuel supply flag is set when the pressure in the air chamber 6 is higher than the maximum pressure and is reset when the cap closure is closed.

At step 1016, it is judged if the first fuel supply flag is reset. When the flag is reset, it is judged that the pressure in the air chamber 6 has not become the maximum pressure yet, the fuel vapor eliminating operation is carried out, i.e., the routine proceeds to step 1018 where the electromagnetic valve 60 is closed, the routine proceeds to step 1020 where the air pump 35 is activated to increase the pressure in the air chamber 6, and the routine is ended.

On the other hand, at step 1016, when the flag is set, it is judged that the air pump 35 should not be activated even if the pressure in the air chamber 6 is lower than the maximum pressure, the routine proceeds to step 1026 where the air pump 35 is stopped, the routine proceeds to step 1028 where the electromagnetic valve 60 is opened, the routine proceeds to step 1030 where the opening of the cap closure is allowed, and the routine proceeds to step 1032.

At step 1032, it is judged if the counter flag is reset. The counter flag is set when the fuel chamber 7 is full with fuel and is reset when the cap closure is closed. When the counter flag is reset, it is judged that the fuel chamber 7 is not full with fuel yet, and the routine proceeds to step 1034. On the other hand, when the counter flag is set, it is judged that the fuel chamber 7 is full with fuel, and the routine proceeds to step 1042.

At step 1034, it is judged if the fuel chamber 7 is full with fuel. When the fuel chamber 7 is full with the fuel, the routine proceeds to step 1036 where the count is reset, the routine proceeds to step 1038 where the counter flag is set, and the routine is ended. On the other hand, when the fuel chamber 7 is not full with the fuel, the routine proceeds to step 1040 in FIG. 22.

At step 1040, it is judged if the second fuel supply flag is set. When the second fuel supply flag is set, it is judged that no fuel vapor eliminating operation needs to be carried out, and the routine is ended. On the other hand, when the second fuel supply flag is reset, it is judged that the fuel vapor eliminating operation should be carried out, and the routine proceeds to step 1044.

At step 1042, it is judged if the count t is smaller than a predetermined count t0 (t<t0). The predetermined count is that between the detection of the fuel chamber 7 being full with fuel and the stopping of the supply of the fuel into the fuel chamber 7. When t<t0, the routine proceeds to step 1043 where the count is counted up, and the routine proceeds to step 1044.

On the other hand, at step 1042, when t≧t0, it is judged that the supply of the fuel into the fuel chamber 7 is stopped, the routine proceeds to step 1050 where the end flag is set, the routine proceeds to step 1052 where the air pump 35 is stopped, the routine proceeds to step 1054 where the electromagnetic valve 60 is opened, and the routine proceeds to step 1056.

At step 1044, it is judged if the pressure P in the air chamber 6 is lower than a second predetermined pressure P2 (P<P2). The second predetermined pressure is lower than the pressure of the fuel when the fuel is supplied by the fuel filling nozzle. When P<P2, it is judged that the pressure in the air chamber 6 allows the supply of the fuel into the fuel chamber 7, the routine proceeds to step 1046 where the electromagnetic valve 60 is closed, the routine proceeds to step 1048 where the air pump 35 is activated, and the routine is ended.

On the other hand, at step 1044, when P≧P2, it is judged that the pressure in the air chamber 6 does not allow the supply of the fuel into the fuel chamber 7, the routine proceeds to step 1052 where the air pump 35 is stopped, the routine proceeds to step 1054 where the electromagnetic valve 60 is opened, and the routine proceeds to step 1056.

At step 1056, it is judged if the end flag is set. When the end flag is set, it is judged that the supply of the fuel into the fuel chamber 7 is completed, the routine proceeds to step 1058 where the first fuel supply flag is reset, the routine proceeds to step 1060 where the second fuel supply flag is reset, the routine proceeds to step 1062 where the counter flag is reset, the routine proceeds to step 1064 where the end flag is reset, and the routine is ended.

On the other hand, at step 1056, when the end flag is reset, it is judged that the supply of the fuel into the fuel chamber 7 is not completed, and the routine is ended.

In the first to tenth embodiments, the fuel pump 19 is positioned in the fuel tank. The shape of the fuel pump 19 is not simple so that the wall 5 cannot come into contact with the fuel surface around the fuel pump 19. Therefore, a space may be formed between the separating wall 5 and the fuel surface around the fuel pump 19. According to the eleventh embodiment, no space may be formed between the wall 5 and the fuel surface around the fuel pump 19.

A fuel reserving device according to the eleventh embodiment of the invention will be explained below.

Figure 23:
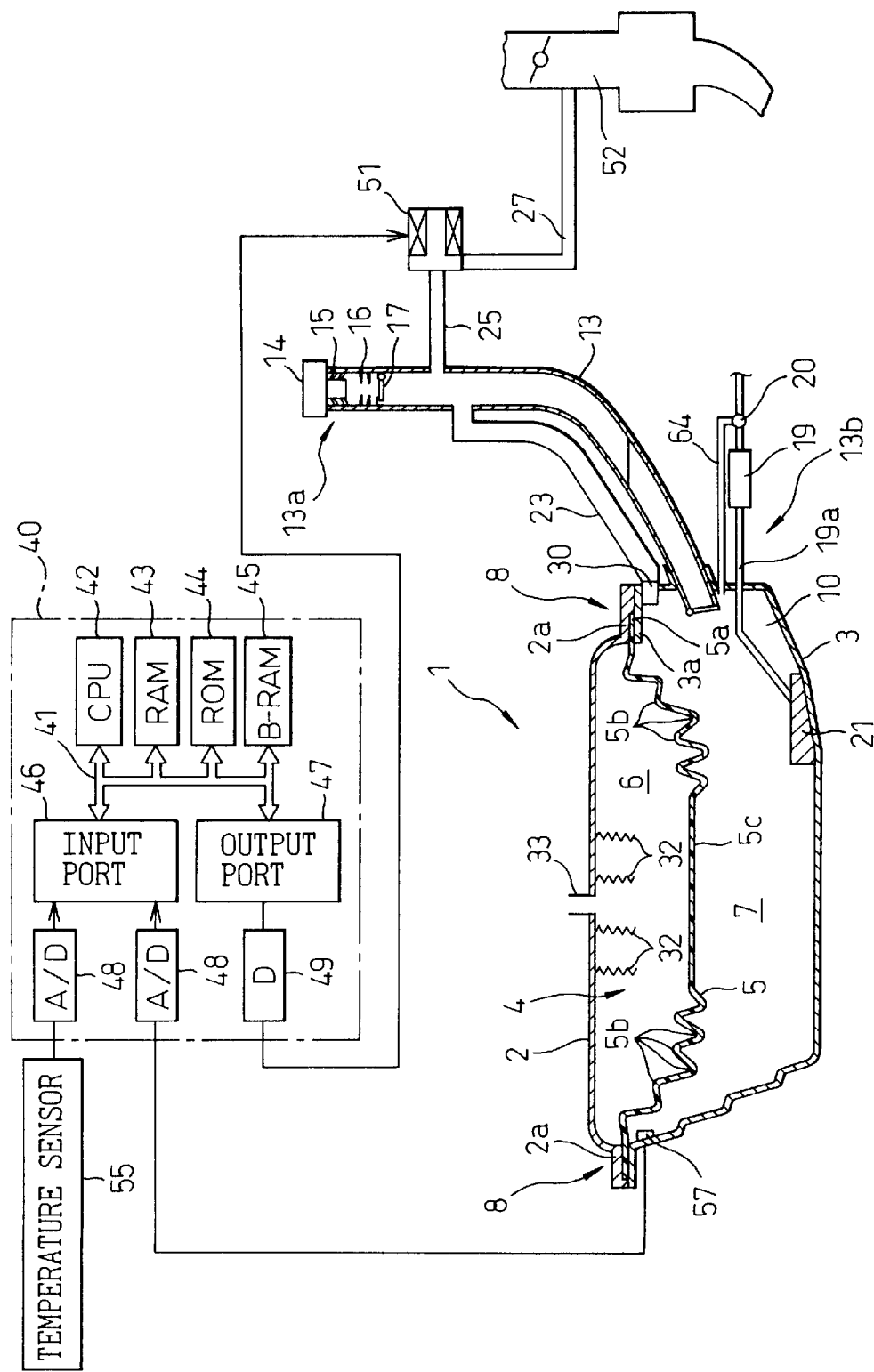
FIG. 23 is a sectional view of a fuel reserving device according to the eleventh embodiment of the invention.

In the eleventh embodiment, as shown in FIG. 23, the fuel pump 19 is positioned outside of the fuel tank 1. The fuel pump 19 is connected to the fuel filter 21 via a fuel pump pipe 19a. The pipe 19a extends through the lower portion 3 under the lower opening of the fuel feeding pipe 13. The fuel filter 21 is positioned in the fuel chamber 7.

The pressure regulator 20 is positioned downstream of the fuel pump 19. A fuel return passage 64 extends from the pressure regulator 20 to within the fuel chamber 7. The passage 64 serves to return the excess fuel into the fuel chamber 7.

In the eleventh embodiment, the fuel reserving device does not comprise a pump chamber so that the fuel vapor discharging pipe is eliminated. The level switch 57 is positioned at the lower portion 3 adjacent to the anchor portion 8.

Components other than those described above are the same as those of the fuel reserving device according to the fourth embodiment. Therefore, an explanation thereof will not be given.

Therefore, according to the eleventh embodiment, the shape inside the fuel tank 1 becomes simpler so that no space is formed between the separating wall 5 and the fuel surface.

In the eleventh embodiment, the purging of the fuel vapor into the intake passage corresponds to means for discharging gas from the space formed above the fuel surface or for raising the level of the fuel surface, and the level switch 57 corresponds to means for detecting the level of the fuel surface.

Of course, the eleventh embodiment can apply to any embodiment described above.

In the first embodiment, fuel vapor is generated from the fuel in the fuel feeding pipe 13 after the supply of the fuel into the fuel chamber 7 is completed. According to the twelfth embodiment, the generation of the fuel vapor from the fuel in the fuel feeding pipe 13 is prevented.

Figure 24:
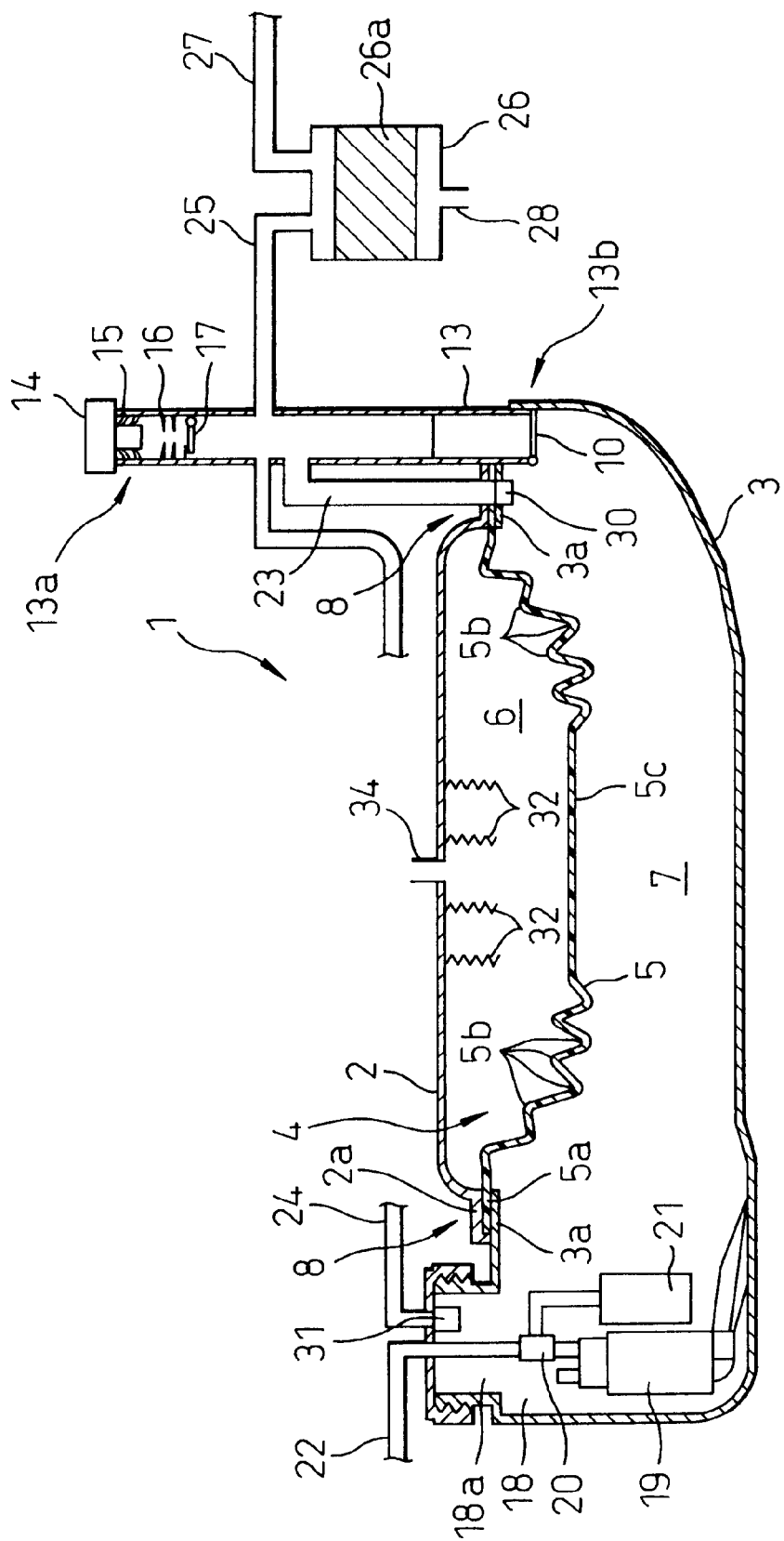
FIG. 24 is a sectional view of a fuel reserving device according to the twelfth embodiment of the invention.

In the twelfth embodiment, as shown in FIG. 24, the lower opening of the fuel feeding pipe 13 is mounted on the anchor portion 8. The fuel feed pipe 13 is positioned above the lower opening thereof.

Preferably, the lower opening of the fuel feeding pipe 13 is positioned above the highest position in the fuel chamber 7. In this case, the fuel in the fuel feeding pipe 13 is completely eliminated therefrom.

Components other than those described above are the same as those of the fuel reserving device according to the first embodiment. Therefore, an explanation thereof will not be given.

Therefore, according to the twelfth embodiment, the fuel in the fuel feeding pipe 13 flows into the fuel chamber 7 by its weight as the fuel in the fuel chamber 7 is decreased. Thus, the generation of the fuel vapor from the fuel in the fuel feeding pipe 13 is prevented.

In the twelfth embodiment, the supply of the fuel into the fuel chamber corresponds to means for discharging gas from the space formed above the fuel surface or for raising the level of the fuel surface.

Of course, the twelfth embodiment can apply to any embodiment described above.

In the twelfth embodiment, the fuel in the fuel feeding pipe 13 flows into the fuel chamber 7 as the fuel in the fuel chamber 7 is decreased. Therefore, it takes a certain time until the fuel in the fuel feeding pipe 13 completely flows into the fuel chamber 7. Thus, before all the fuel in the fuel feeding pipe 13 flows into the fuel chamber 7, fuel vapor may be generated from the fuel in the fuel feeding pipe 13. According to the thirteenth embodiment, the generation of the fuel vapor in the fuel feeding pipe 13 is further prevented.

Figure 25:
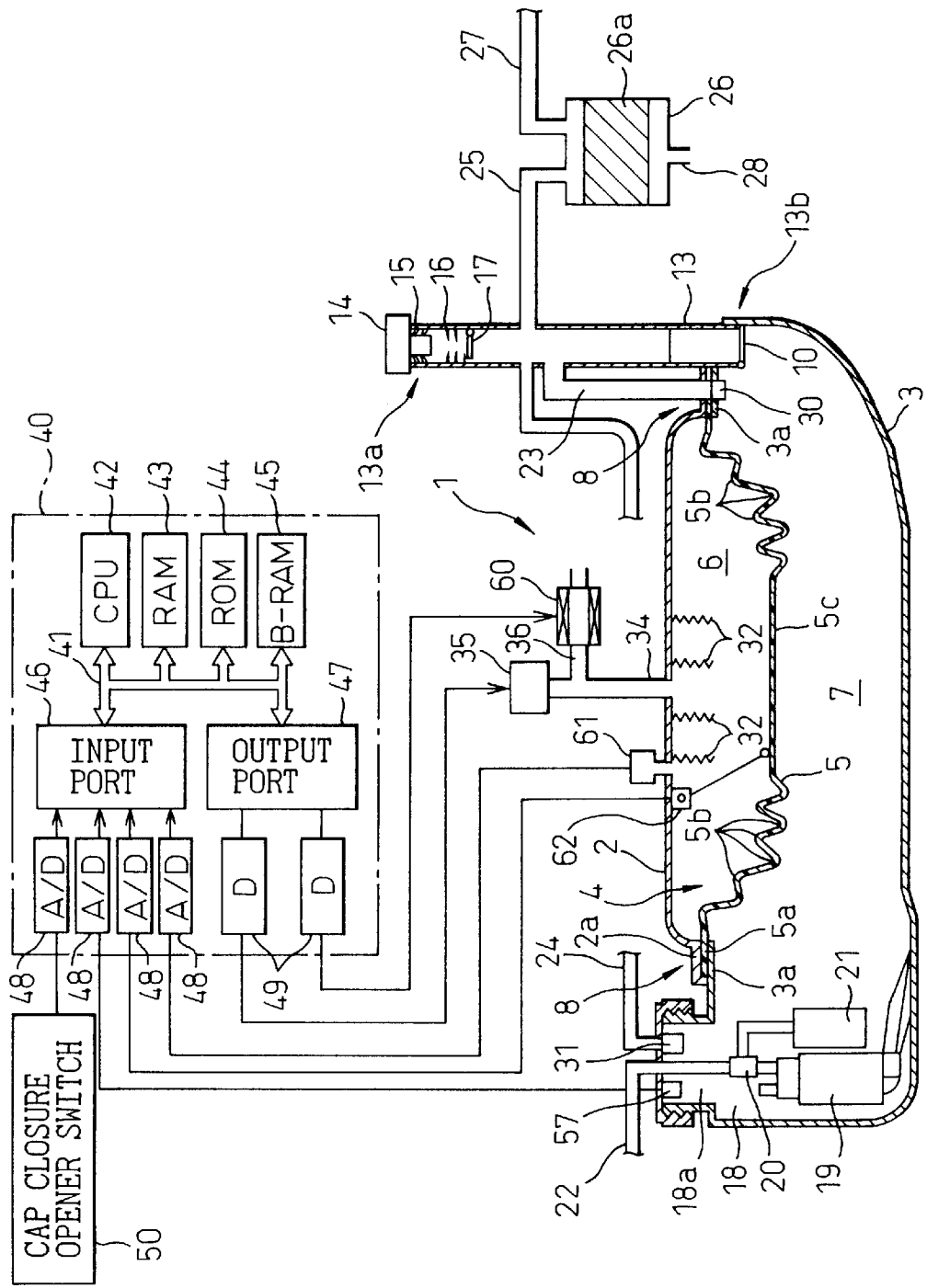
FIG. 25 is a sectional view of a fuel reserving device according to the thirteenth embodiment of the invention.

In the thirteenth embodiment, as shown in FIG. 25, the air chamber 6 is connected to the air pump 35 via a first connection pipe 34 instead of the atmosphere pipe 33. The first connection pipe 34 is connected to an electromagnetic valve 60 via the second connection pipe 36. The valve 60 is connected to the output port 47 via a corresponding drive circuit 49. The valve 60 is controlled by the electronic control unit 40.

A pressure sensor 61 for sensing the pressure in the air chamber 6 is mounted on the upper portion 2 of the tank 1. The sensor 61 is connected to the input port 46 via a corresponding AD converter 48.

A fuel level gauge 62 for detecting the amount of the fuel in the fuel chamber 7 by detecting the position of the separating wall 5 is mounted on the upper portion 2 of the tank 1. The gauge 62 is connected to the input port 46 via a corresponding AD converter 48.

Components other than those described above are the same as those of the fuel reserving device according to the twelfth embodiment. Therefore, an explanation thereof will not be given.

A fuel vapor eliminating operation according to the thirteenth embodiment will be explained below.

The fuel vapor eliminating operation is carried out in the same manner as that in the tenth embodiment until the opening of the cap closure is allowed. Therefore, an explanation thereof will not be given.

In the thirteenth embodiment, after the cap closure is opened, the supply of the fuel into the fuel chamber 7 is carried out until the fuel chamber 7 is full of fuel.

Further, in the thirteenth embodiment, the electromagnetic valve 60 is opened to decrease the pressure in the air chamber 6 when a predetermined time has elapsed. The predetermined time is that from the detection of the fuel chamber 7 being full with fuel to just after the stopping of the supply of the fuel into the fuel chamber 7.

Therefore, according to the thirteenth embodiment, the pressure in the air chamber 6 is decreased when the supply of the fuel into the fuel chamber 7 is stopped. Thus, the fuel in the fuel feeding pipe 13 flows into the fuel chamber 7 so that the generation of the fuel vapor in the fuel feeding pipe 13 is further prevented.

In the thirteenth embodiment, the air pump 35 corresponds to means for discharging gas from the space formed above the fuel surface or for raising the level of the fuel surface, and the level switch 57 or the fuel level gauge 62 corresponds to means for detecting the level of the fuel surface.

Figure 26:
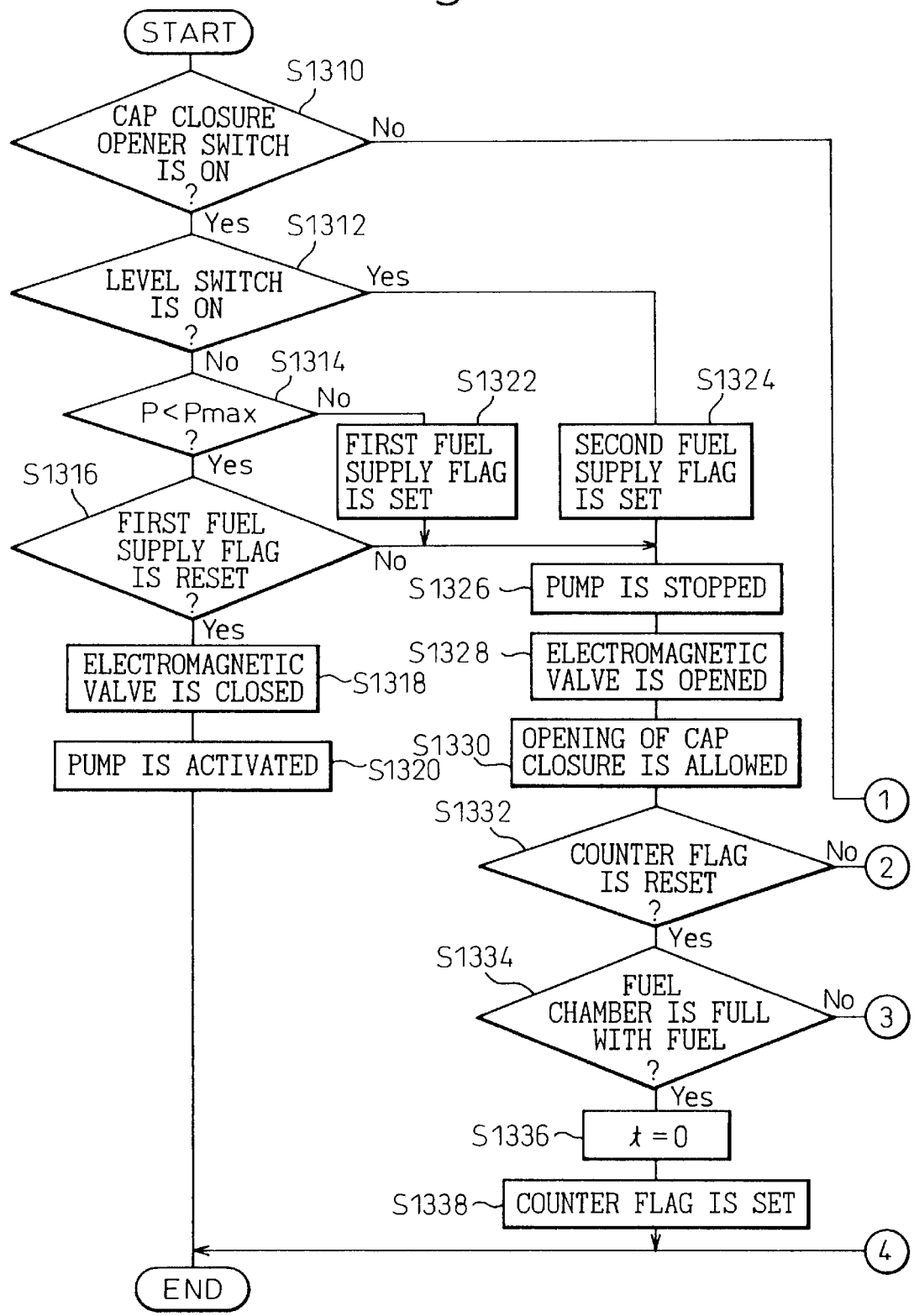
FIG. 26 is a part of a flowchart of a fuel vapor eliminating operation according to the thirteenth embodiment of the invention.
Figure 27:
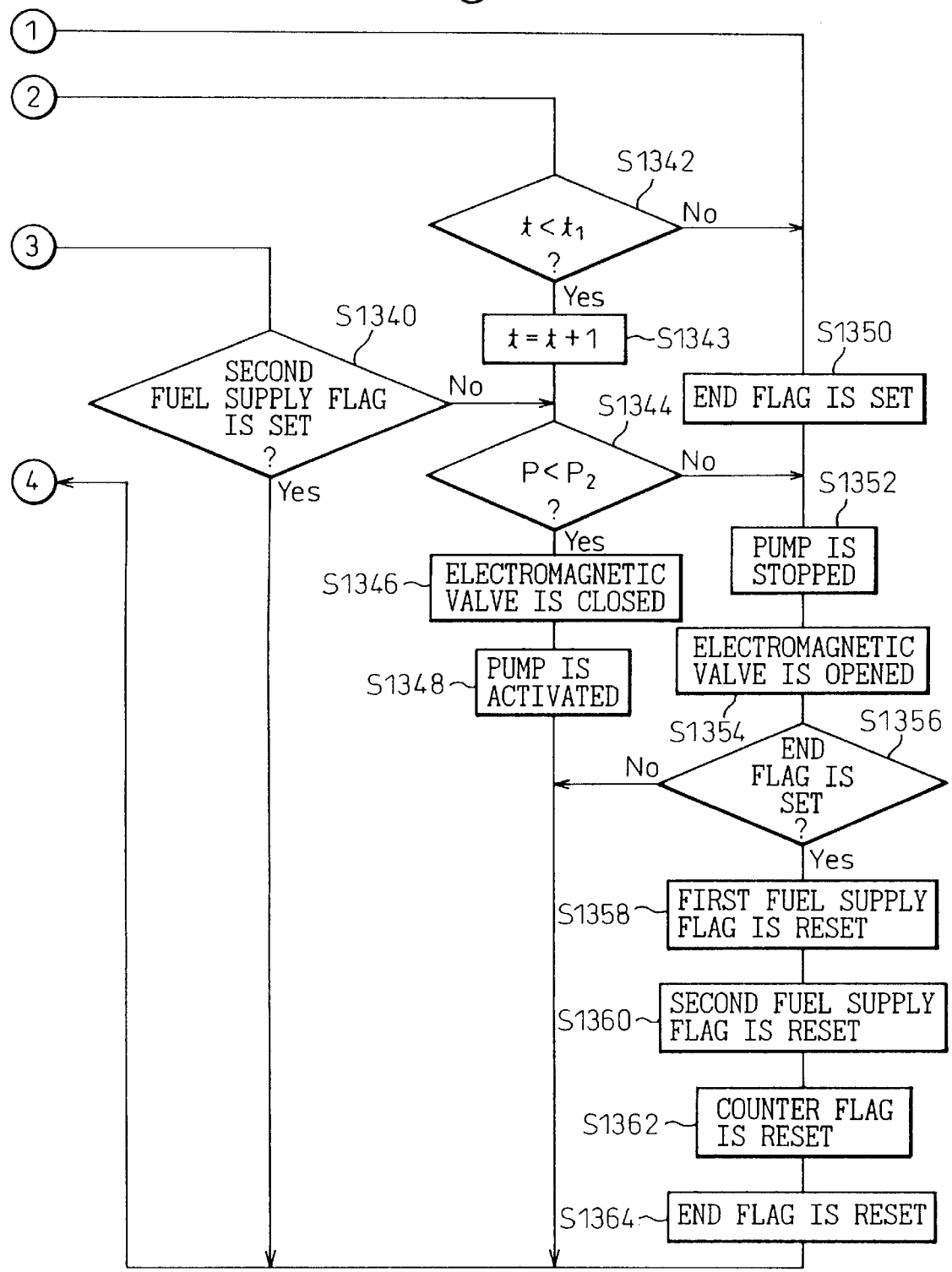
FIG. 27 is a part of a flowchart of a fuel vapor eliminating operation according to the thirteenth embodiment of the invention.

The fuel vapor eliminating operation according to the thirteenth embodiment will be explained below by referring to a flowchart in FIGS. 26 and 27. In the flowchart, steps 1310 to 1360 except for step 1342 correspond to steps 1010 to 1060 in FIGS. 21 and 22, respectively. Therefore, an explanation thereof will not be given.

At step 1342, it is judged if the count t is smaller than a predetermined count t1 (t<t1). The predetermined count is that from the detection of the fuel chamber 7 being full with fuel to just after the stopping of the supply of the fuel into the fuel chamber 7. When t<t1, the routine proceeds to step 1343 where the count is counted up, and the routine proceeds to step 1344.

On the other hand, at step 1342, when t≧t1, it is judged that the supply of the fuel into the fuel chamber 7 is stopped, the routine proceeds to step 1350 where the end flag is set, the routine proceeds to step 1352 where the air pump 35 is stopped, the routine proceeds to step 1354 where the electromagnetic valve 60 is opened, and the routine proceeds to step 1356.

In the above embodiments, the air pump is activated, or the electromagnetic valve 60 is opened, on the basis of the opening of the relief valve, or the pressure in the air chamber 6, or the level switch 57. However, the air pump may be activated, or the electromagnetic valve 60 may be opened, on the basis of the position of the wall 5.

A fuel reserving device according to the fourteenth embodiment of the invention will be explained below.

Figure 28:
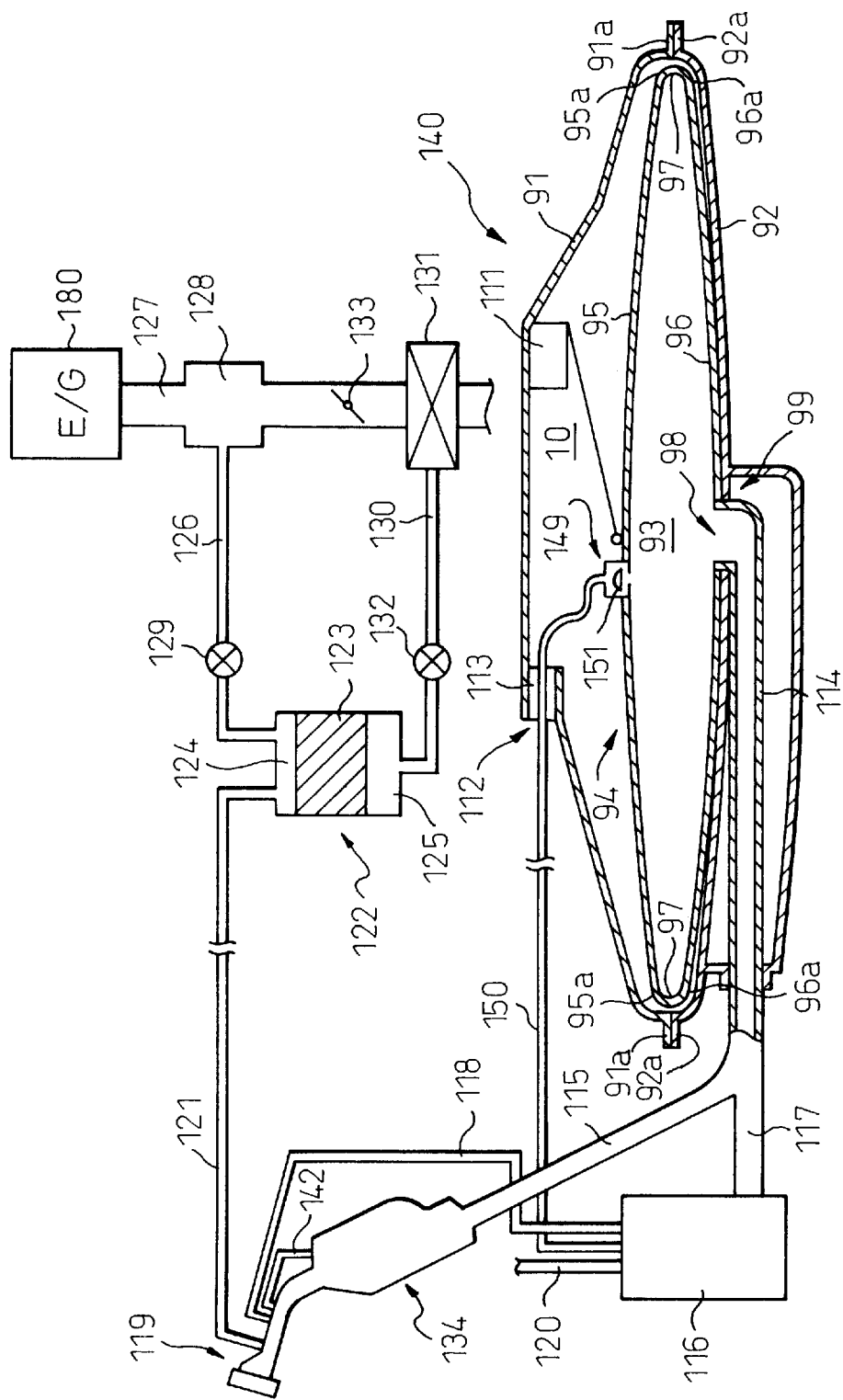
FIG. 28 is a partial sectional view of a fuel reserving device according to the fourteenth embodiment of the invention.

In the fourteenth embodiment, as shown in FIG. 28, the fuel reserving device comprises a fuel tank body 140. The body 140 comprises upper and lower portions 91 and 92 which are generally cup-shaped. These portions 91 and 92 are connected to each other at flange portions 91a, 82a thereof.

A fuel reservoir 94 which forms a fuel chamber 93 therein for reserving and storing fuel is housed within the body 140. The reservoir 94 comprises an upper rectangular wall 95 which is deformable and has a rigidity, a lower rectangular wall 96 which is deformable and has a rigidity, and a band-shaped wall or connecting wall 97 which is deformable, has a rigidity and connects the peripheral edge 95a of the upper wall 95 to the peripheral edge 96a of the lower wall 96 as shown in FIG. 29.

Figure 30:
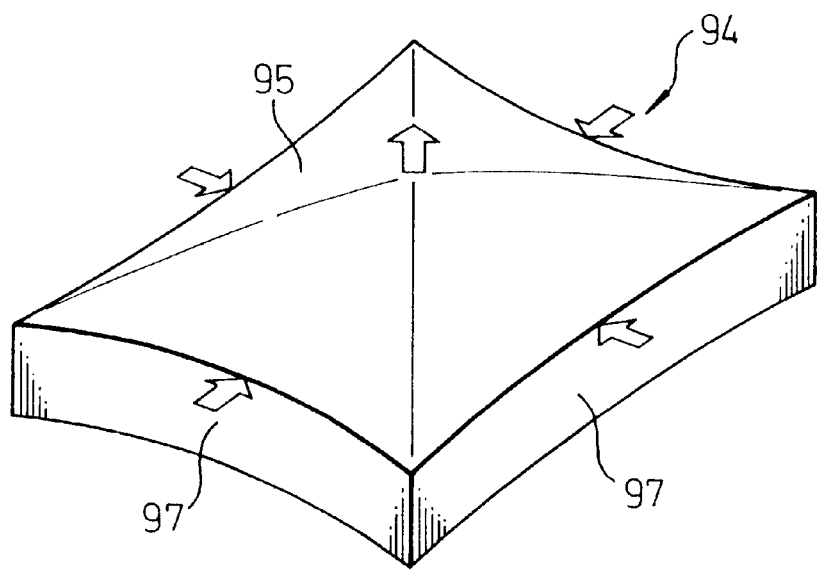
FIG. 30 is a perspective view of the fuel reservoir in the expanded state.

As shown in FIG. 30, the upper and lower walls 95 and 96 are deformed in such a manner that the walls 95 and 96 are swelled or expanded outwardly when the amount of the fuel in the reservoir 94 is increased. As a result of the deforming of the walls 95 and 96, the connecting wall 97 is bent inwardly. Therefore, the volume of the reservoir 94 is increased.

Figure 29:
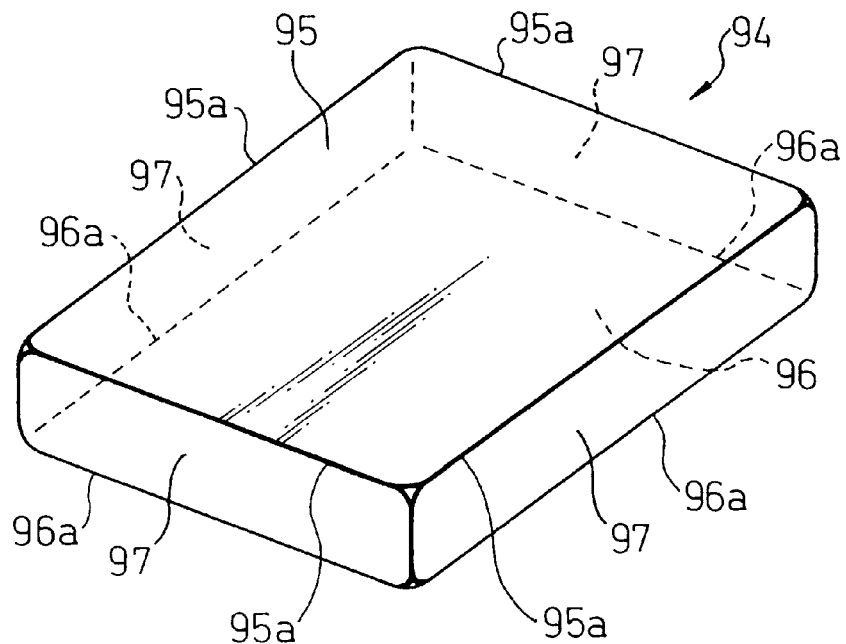
FIG. 29 is a perspective view of the fuel reservoir according to the fourteenth embodiment of the invention.

On the other hand, when the amount of the fuel in the reservoir 94 is decreased, the upper and lower walls 95 and 96 which are bent outwardly and the connecting wall 97 which is bent inwardly return to their original shapes as shown in FIG. 29. Therefore, the volume of the reservoir 94 is decreased.

Figure 31:
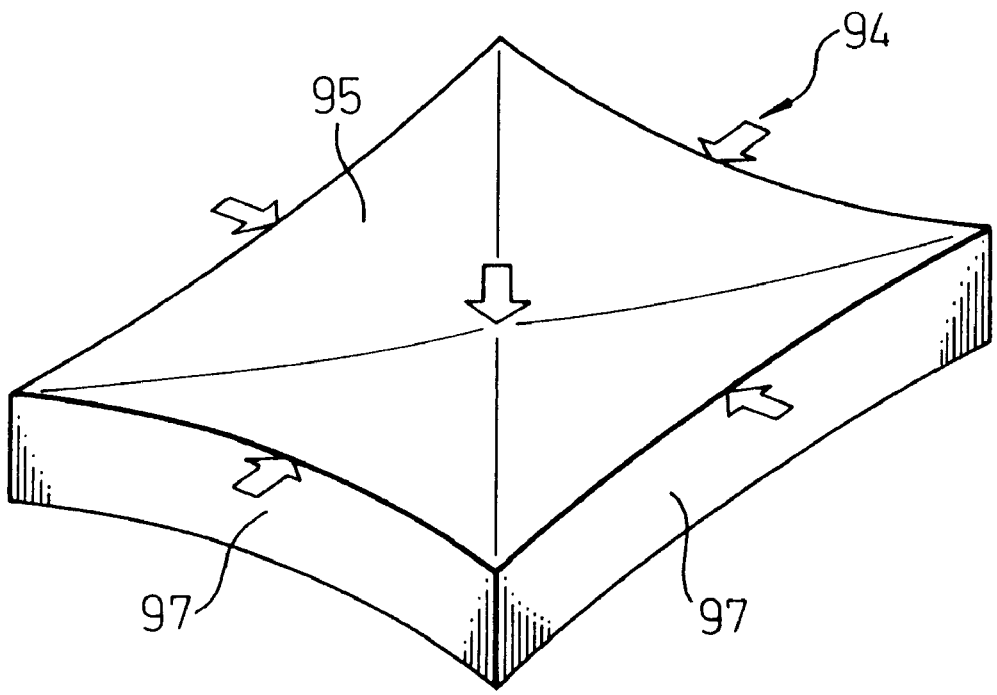
FIG. 31 is a perspective view of the fuel reservoir in the deflated state.

Further, as shown in FIG. 31, when the amount of the fuel in the reservoir 94 is decreased, the upper and lower walls 95 and 96 are deformed in such a manner that the walls 95 and 96 are swelled inwardly. As a result of the deforming of the walls 95 and 96, the connecting wall 97 is bent inwardly. Therefore, the volume of the reservoir 94 is decreased.

The rigidity of the connecting wall 97 is larger than those of the upper and lower walls 95 and 96.

A fuel passage opening 98 is formed at the central portion of the lower wall 96 of the fuel reservoir 94. A connecting pipe opining 99 is formed at the central portion of the lower portion 92 of the fuel tank body 140. The reservoir 94 is positioned in the fuel tank body 140 in such a manner that the fuel passage opening 98 is aligned with the connecting pipe opening 99.

An air chamber 110 is formed outside of the fuel reservoir 94 and inside of the fuel tank body 140. A fuel level sensor 111 for detecting the position or the amount of the movement of the upper wall 95 of the reservoir 94 to calculate the amount of the fuel in the reservoir 94 is mounted on the inner face of the upper portion 91 of the fuel tank body 140.

Further, an air passage opening 112 is formed in the upper portion 91 of the fuel tank body 140. The volume of the air chamber 110 is increased or decreased when the volume of the fuel reservoir 94 is decreased or increased. At this time, air can flow in or out of the air chamber 110 via the air passage opening 112. Therefore, the reservoir 94 can be easily deformed.

A filter 113 for preventing objects except for the air from flowing into the air chamber 110 is inserted into the air passage opening 112.

One end of a fuel pipe 114 for introducing the fuel into the fuel reservoir 94 and withdrawing the fuel from the reservoir 94 is inserted into the fuel passage opening 98 of the reservoir 94 and the connecting pipe opening 99 of the lower portion 92 of the fuel tank body 140, and is connected thereto.

The other end of the fuel pipe 114 is connected to a lower end of a fuel feeding pipe 115 for feeding fuel to the reservoir 94 and one end of a fuel introducing pipe 117 for introducing the fuel from the reservoir 94 to a fuel pump device 116. The other end of the fuel introducing pipe 117 is connected to the fuel pump device 116.

The fuel pump device 116 pumps the fuel in the reservoir 94, and feeds the fuel to injectors (not shown) of the engine. One end of a pump fuel vapor pipe 118 for discharging fuel vapor from the fuel pump device 116 is connected to the fuel pump device 116. The other end of the pump fuel vapor pipe 118 is connected to the fuel feeding pipe 115 adjacent to an upper opening of the fuel feeding pipe 115. Further, one end of a fuel conveying pipe 120 for conveying the fuel from the fuel pump device 116 to the injectors is connected to the fuel pump device 116.

One of a reservoir fuel vapor pipe 150 for discharging fuel vapor from the reservoir 94 is connected to the upper wall 95 of the reservoir 94. The other end of the reservoir fuel vapor pipe 150 is connected to the fuel pump device 116. Further, a fuel vapor pipe shut off valve or reservoir sealing valve 149 is arranged in the one end of the reservoir fuel vapor pipe 150.

The fuel vapor pipe shut off valve 149 comprises a float 151, the density of which is smaller than that of the fuel.

The opening of the reservoir fuel vapor pipe 150 which is open to the interior of the reservoir 94 corresponds to a discharge passage which is open to the space above the fuel surface, and the fuel vapor shut off valve 149 corresponds to a shut off valve for shutting off the above-mentioned discharge passage.

One end of a fuel vapor pipe 121 for discharging fuel vapor adjacent to the upper opening 119 therefrom is connected to the fuel feeding pipe 115 at the upper opening side of the above other end of the pump fuel vapor pipe 118. The other end of the fuel vapor pipe 121 is connected to a charcoal canister 122 for adsorbing fuel vapor thereon and temporarily storing the fuel vapor therein.

An activated carbon 123 for adsorbing fuel vapor thereon is positioned in the canister 122. The interior of the canister 122 is divided by the activated carbon 123. Therefore, a fuel vapor chamber 124 is formed at one side of the carbon 123, and an air chamber 125 is formed at other side of the carbon 123.

The above-mentioned other end of the fuel vapor pipe 121 is connected to the fuel vapor chamber 124 in the canister 122. Further, one end of a canister fuel vapor pipe 126 for discharging fuel vapor adsorbed on the activated carbon 123 from the canister 122 to an intake passage 127 of the engine is connected to the fuel vapor chamber 124. The other end of the canister fuel vapor pipe 126 is connected to a surge tank 128 formed in the intake passage 127.

A fuel vapor amount control valve 129 for opening or closing the canister fuel vapor pipe 126 is arranged in the canister fuel vapor pipe 126. The fuel vapor amount control valve 129 is controlled by a control unit (not shown). One end of an air pipe 130 for introducing air to the air chamber 125 of the canister 122 is connected to the air chamber 125. The other end of the air pipe 130 is connected to an air cleaner 131 arranged in the intake passage 127. A shut off valve 132 for opening or closing the air pipe 130 is arranged in the air pipe 130. The shut off valve 132 is controlled by a control unit (not shown). A throttle valve 133 for controlling the amount of the air which is fed to an engine body 180 of the engine is arranged in the intake passage 127.

In the fourteenth embodiment, the fuel vapor amount control valve 129 is opened when the fuel vapor in the charcoal canister 122 should be introduced into the intake passage 127. The fuel vapor amount control valve 129 is normally closed. Therefore, when the fuel vapor amount control valve 129 is opened, the negative pressure in the surge tank 128 is introduced into the canister 122 via the canister fuel vapor pipe 126, and the air in the air cleaner 131 is introduced into the canister 122 via the air pipe 130. Thus, the fuel vapor in the canister 122 is introduced to the intake passage 127.

Further, the fuel vapor amount control valve 129 is controlled on the basis of the driving conditions of the engine to control the amount of the fuel vapor to be introduced to the intake passage 127 in such a manner that a desired predetermined air-fuel ratio can be obtained. Therefore, the fuel vapor amount control valve 129 corresponds to means for controlling the amount of the fuel vapor to be discharged into the intake passage 127, and the shut off valve 132 corresponds to means for controlling the introduction of the air into the canister 122.

In the fourteenth embodiment, when a leakage in the fuel system which is in communication with the charcoal canister 122 should be detected, a negative pressure is introduced into the fuel system which extends from the canister 122 to the fuel tank body 140, and thereafter, the fuel vapor amount control and shut off valves 129 and 132 are closed to seal the above-mentioned fuel system. Then, when the increase in the pressure in the fuel system toward the atmospheric pressure is detected by a pressure sensor (not shown), it is judged that the fuel system has a leakage portion. Therefore, the fuel vapor amount control and shut off valves 129 and 132 corresponds to means for detecting the leakage of the fuel.

The fuel pump device according to the fourteenth embodiment of the invention will be explained below in detail.

Figure 32:
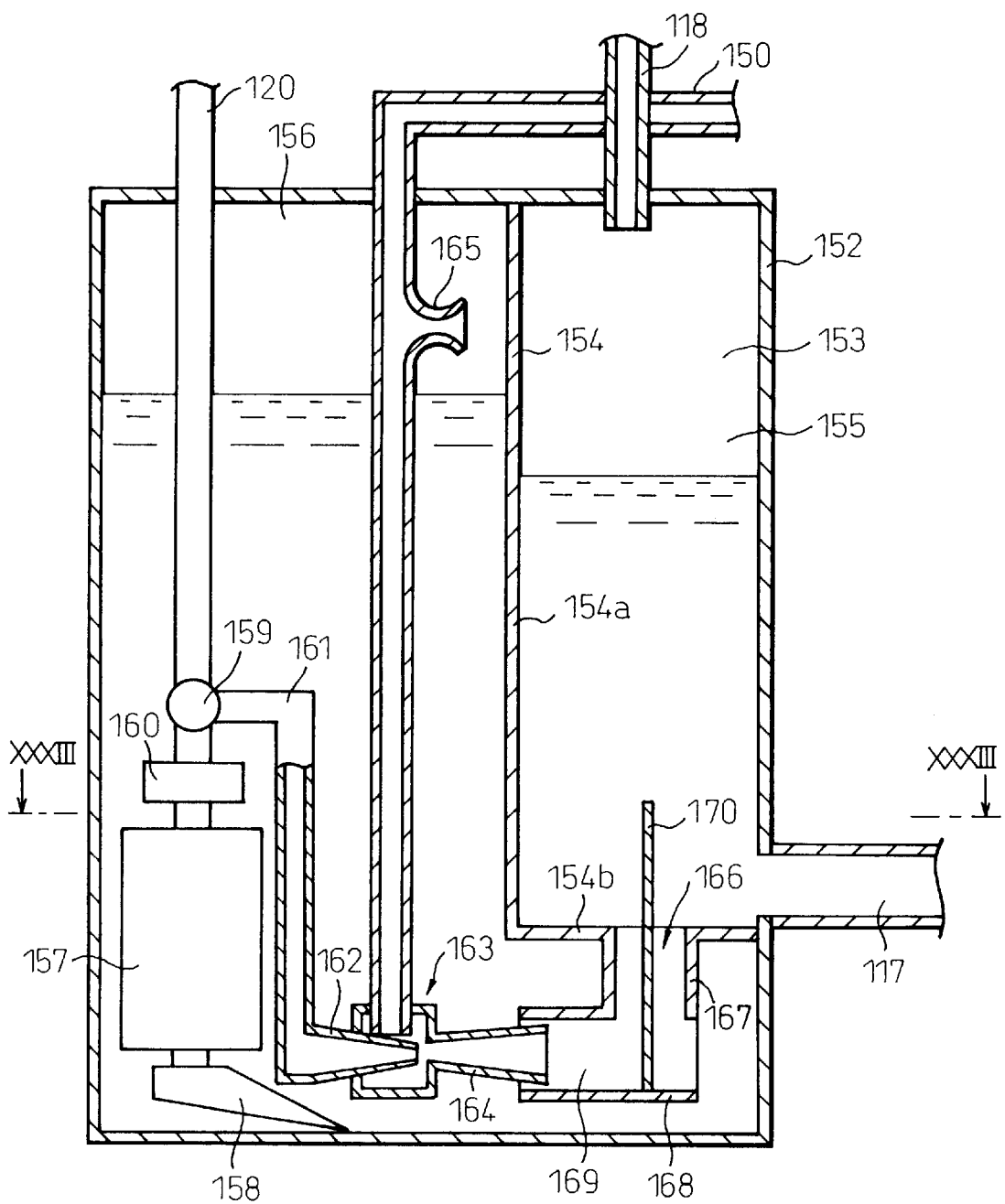
FIG. 32 is a partial sectional view of a fuel pump device according to the fourteenth embodiment of the invention.
Figure 33:
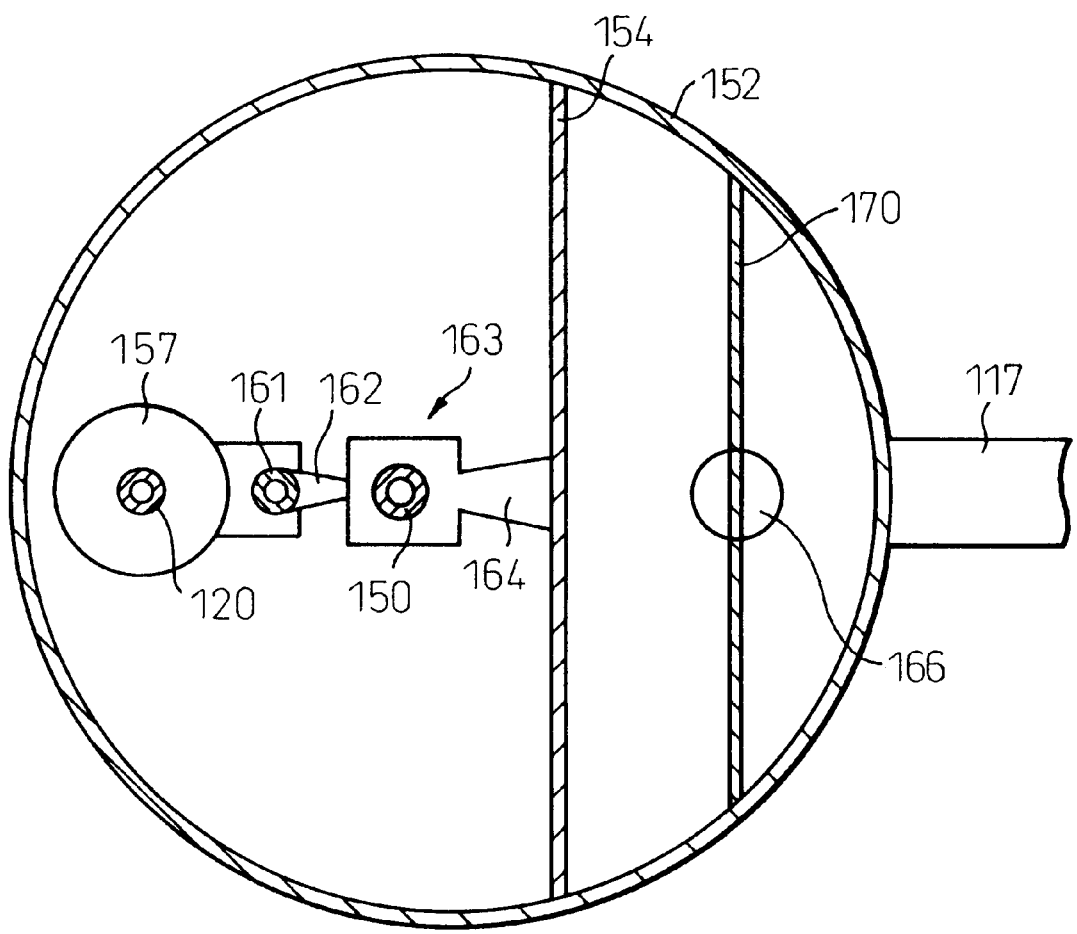
FIG. 33 is a partial sectional view of the fuel pump device along line XXXIII—XXXIII in FIG. 32.

In the fourteenth embodiment, as shown in FIG. 32, the fuel pump device 116 comprises a pump chamber 153 defined by a housing 152. The pump chamber 153 is divided into a pump chamber portion 155 and sub-tank chamber 156 by a pump chamber separating wall 154.

The pump chamber separating wall 154 comprises a vertical wall 154a which extends generally vertically and downwardly from an inner face of an upper wall of the housing 152, and a horizontal wall 154b which extends horizontally to an inner face of a side wall of the housing 152 above an inner face of a lower wall of the housing 152.

The above-mentioned one end of the pump fuel vapor pipe 118 for discharging fuel vapor from the pump chamber portion 155 is connected to the upper wall of the housing 152. The opening of the one end of the pump fuel vapor pipe 118 is open adjacent to the upper wall of the housing 152 in the pump chamber portion 155.

A fuel pump 157 for feeding fuel from the sub-tank chamber 156 to the injectors via the fuel conveying pipe 120 is positioned in the sub-tank chamber 156. A first fuel filter 158 for filtering the fuel pumped into the fuel pump 157 is connected to a lower wall of the fuel pump 157. Further, a pressure regulator 159 for regulating the pressure of the fuel pumped by the fuel pump 157 is arranged in the fuel conveying pipe 120 in the sub-tank chamber 156.

An upper end of a fuel returning pipe 161 for returning a portion of the fuel pumped by the fuel pump 157 to the sub-tank chamber 156 is connected to the pressure regulator 159. Further, a second fuel filter 160 for filtering the fuel pumped from the fuel pump 157 is arranged in the fuel conveying pipe 120 between the pressure regulator 159 and the fuel pump 157.

A lower tip portion 162 of the fuel returning pipe 161 is generally horizontally directed, and is tapered in such a manner that the diameter of the tip portion 162 becomes smaller as the tip portion 162 proceeds to an opening thereof. The lower tip portion 162 is housed in a negative pressure generating housing 163 for generating a negative pressure by returning or recirculating a portion of the fuel pumped by the fuel pump 157 to the sub-tank chamber 156. The negative pressure generating housing 163 comprises a trumpet-shaped fuel discharging pipe 164 which is tapered in such a manner that the diameter of the fuel discharging pipe 164 becomes larger as the fuel discharging pipe 164 proceeds to an opening thereof.

The fuel discharging pipe 164 is aligned with the lower tip portion 162. Further, a lower end of the reservoir fuel vapor pipe 150 is housed in the negative pressure generating housing 163.

The reservoir fuel vapor pipe 150 in the sub-tank chamber 156 comprises a sub-tank chamber negative pressure introducing pipe 165 for introducing the negative pressure into the sub-tank chamber 156. The introducing pipe 165 is open to the interior of the sub-tank chamber 156 at the upper area in the sub-tank chamber 156. Further, the diameter of the introducing pipe 165 is smaller than that of the reservoir fuel vapor pipe 150.

A vertical annular wall 167, which extends vertically and downwardly from the horizontal wall 154b of the pump chamber separating wall 154, is arranged on the horizontal wall 154b. The vertical annular wall 167 forms a fuel intake passage 166 for introducing the fuel into the sub-tank chamber 156. The location of an upper opening of the fuel intake passage 166 is lower than that of a bottom wall face of the fuel introducing pipe 117.

A horizontal annular wall 168 which extends horizontally from the vertical annular wall 167 toward the fuel discharging pipe 164 is arranged on a lower end of the vertical annular wall 167. The horizontal annular wall 168 forms a fuel passing passage 169 for passing the fuel discharged from the fuel discharging pipe 164.

A separating wall 170 having a mesh structure for separating gases from the fuel is arranged in the vertical annular wall 167 and the pump chamber portion 155. The separating wall 170 extends upwardly from a bottom face of the horizontal annular wall 168 to the interior of the fuel intake passage 166. Therefore, the separating wall 170 crosses the fuel passing passage 169.

Further, the separating wall 170 extends to the interior of the pump chamber portion 155 through the vertical annular wall 167. Lateral sides of the separating wall 170 in the vertical annular wall 167 extend to the inner face of the vertical annular wall 167. Therefore, the separating wall 170 divides the fuel intake passage 166 into two portions.

Further, the separating wall 170 extends to the interior of the pump chamber portion 155 beyond the horizontal wall 154b. The upper end of the separating wall 170 in the pump chamber portion 155 is located higher than the opening of the fuel introducing pipe 117.

Further, lateral sides of the separating wall 170 in the pump chamber portion 155 are connected to the inner face of the cylindrical wall of the housing 152. A bottom end of the separating wall 170 in the pump chamber portion 155 is connected to the horizontal wall 154b.

An operation of the fuel pump device according to the fourteenth embodiment of the invention will be explained below.

The fuel in the sub-tank chamber 156 is pumped into the fuel pump 157 via the first fuel filter 158 when the fuel pump 157 is activated to feed the fuel in the fuel reservoir 94 to the injectors. The fuel pumped into the fuel pump 157 is fed to the pressure regulator 159 via the second fuel filter 160. When the pressure of the fuel is higher than a predetermined pressure in the pressure regulator 159, a portion of the fuel is returned to the sub-tank chamber 156 via the fuel returning pipe 161. Therefore, the pressure regulator 159 and the fuel returning pipe 161 correspond to means for recirculating the fuel. Thus, the pressure of the fuel is kept at the predetermined pressure.

The remaining fuel having the predetermined pressure is fed to the injectors via the fuel conveying pipe 120.

The fuel returned to the sub-tank chamber 156 via the fuel returning pipe 161 is discharged from the lower tip portion 162 to the negative pressure generating housing 163. The venturi effect of the tapered lower tip portion 162 increases the rate of the flow of the fuel discharging from the lower tip portion 162. The fuel having the increased rate of the flow flows into the fuel passing passage 169 via the fuel discharging pipe 164.

When the fuel is discharged from the lower tip portion 162 to the fuel discharging pipe 164 to increase the rate of the flow thereof, a negative pressure is generated in the negative pressure generating housing 163. Therefore, the fuel returning pipe 161 and the negative pressure generating housing 163 correspond to means for generating negative pressure.

The negative pressure generated in the negative pressure generating housing 163 is introduced into the space above the fuel surface in the reservoir 94 via the reservoir fuel vapor pipe 150, and into the space above the fuel surface in the sub-tank chamber 156 via the reservoir fuel vapor and sub-tank negative pressure introducing pipes 150 and 165. Therefore, the reservoir fuel vapor and sub-tank negative pressure introducing pipes 150 and 165 correspond to means or passage for introducing the negative pressure.

In the fourteenth embodiment, the diameter of the reservoir fuel vapor pipe 150 is larger than that of the sub-tank negative pressure introducing pipe 165. Therefore, the negative pressure is introduced into the reservoir 94 to discharge the gases including the fuel vapor and the air from the reservoir 94 with priority. Therefore, the sub-tank negative pressure introducing pipe corresponds to means for facilitating the discharging of the gases from the reservoir 94 with priority.

When the negative pressure is introduced into the reservoir 94, the fuel vapor and the air are discharged from the reservoir 94 to the negative pressure generating housing 163, and, as a result, the level of the fuel surface in the reservoir 94 is raised to the highest position in the fuel chamber 93. Therefore, the fuel pump 157 corresponds to means for discharging gas from the space formed above the fuel surface or for raising the level of the fuel surface.

In the fourteenth embodiment, once the gases such as the fuel vapor or the air are completely eliminated from the reservoir 94, the reservoir 94 is kept at the condition in which there is no gas therein as far as the fuel pump 157 is activated. Further, when the reservoir 94 is kept at the condition in which there is no gas therein, the upper face of the fuel reservoir 94 represents the exact amount of the fuel in the reservoir 94. Therefore, according to the fourteenth embodiment, the amount of the fuel in the reservoir 94 is exactly detected.

If the negative pressure may continue to be introduced into the reservoir 94 after the fuel vapor and the air have been eliminated from the reservoir 94, the fuel may be leaked from the reservoir 94 to the reservoir fuel vapor pipe 150. Therefore, the introducing of the negative pressure into the reservoir 94 should be stopped when the fuel vapor and the air have been eliminated from the reservoir 94.

In the fourteenth embodiment, when the fuel vapor and the air have been completely eliminated from the reservoir 94, and the level of the fuel surface in the reservoir 94 reaches the fuel vapor shut off valve 149, the valve 149 shuts off the reservoir fuel vapor pipe 150. Therefore, the fuel vapor shut off valve 149 corresponds to means to stop introducing the negative pressure into the reservoir 94. Further, the valve 149 corresponds to means for preventing the leakage of the fuel from the reservoir 94.

After the fuel vapor shut off valve 149 shuts off the reservoir fuel vapor pipe 150, the negative pressure is introduced only into the space above the fuel surface in the sub-tank chamber 156.

When the negative pressure is introduced into the space above the fuel surface in the sub-tank chamber 156, the fuel vapor and the air are discharged from the above-mentioned space to the negative pressure generating housing 163. The negative pressure introduced raises the level of the fuel surface in the sub-tank chamber 156, and the fuel is introduced from the pump chamber portion 155 into the sub-tank chamber 156 via the fuel intake passage 166. Therefore, the level of the fuel surface in the sub-tank chamber 156 is kept at a predetermined height as far as there is an amount of the fuel in the pump chamber portion 155. Thus, when the fuel pump device 116 is inclined and the fuel surface in the sub-tank chamber 156 is inclined, the condition, in which there is no fuel around the first fuel filter 158 through which the fuel is pumped into the fuel pump 157, is prevented. Therefore, the fuel returning pipe 161 and the negative pressure generating housing 163 correspond to means to prevent the drying-up of the fuel.

The fuel vapor and the air discharged from the spaces above the fuel surfaces in the reservoir 94 and the sub-tank chamber 156 are entrained with the fuel in the negative pressure generating housing 163. The fuel including the fuel vapor and the air is discharged to the fuel passing passage 169 via the fuel discharging pipe 164. The fuel discharged to the fuel passing passage 169 passes through the lower opening of the fuel intake passage 166. At this time, the fuel vapor and the air included in the fuel move upwardly because of their lower densities. Then, the fuel vapor and the air are discharged from the sub-tank chamber 156 to the pump chamber portion 155 via one of the portions of the fuel intake passage 166 divided by the separating wall 170.

As stated above, in the fourteenth embodiment, the fuel intake passage 166 serves as both a fuel introducing passage for introducing the fuel into the sub-tank chamber 156 and a fuel vapor discharging passage for discharging the fuel vapor from the sub-tank chamber 156. Therefore, there is no need to provide another fuel vapor discharging passage in addition of the fuel intake passage 166. Thus, it is possible to make the fuel pump device small because the fuel intake passage 166 functions as the fuel introducing and fuel vapor discharging passage.

Further, in the fourteenth embodiment, when the fuel discharged to the fuel passing passage 169 flows under the lower opening of the fuel intake passage 166, the fuel passes through the separating wall 170. Therefore, the fuel vapor and the air are separated from the fuel by the separating wall 170 and are discharged to the pump chamber portion 155 via the fuel intake passage 166. Thus, the separating wall 170 corresponds to means for separating the gases from the fuel.

Further, in the fourteenth embodiment, the fuel passing passage 169 is directly connected to the fuel intake passage 166, and is generally perpendicular relative to the fuel intake passage 166. Therefore, the fuel vapor and the air can be easily moved up to be separated from the fuel. Thus, the fuel passing and fuel intake passages 169 and 166 correspond to means for separating or discharging the gases from the fuel.

The fuel vapor discharged to the pump chamber portion 155 is introduced into the charcoal canister 122 via the pump fuel vapor pipe 118. A lower opening of the pump fuel vapor pipe 118 is open to the interior of the pump chamber portion 155 adjacent to the upper wall of the housing 152. Therefore, the fuel vapor in the pump chamber portion 155 can be introduced into the canister 122 until the amount of the fuel in the pump chamber portion 155 becomes small.

The fuel in the sub-tank chamber 156 is heated by the fuel pump 157. Therefore, the temperature of the fuel in the sub-tank chamber 156 is higher than that of the fuel in the pump chamber portion 155. If the fuel having a relatively high temperature is mixed with the fuel having a relatively low temperature in the pump chamber portion 155, a large amount of the fuel vapor may be generated. In addition, if the fuel flows out of the sub-tank chamber 156 to the pump chamber portion 155 when the amount of the fuel in the sub-tank chamber 156 is very small, the fuel may dry up around the first fuel filter 158. Therefore, the flow of the fuel from the sub-tank chamber 156 to the pump chamber portion 155 should be prevented.

According to the fourteenth embodiment, the fuel passing passage 169 is generally perpendicular relative to the fuel intake passage 166. Therefore, the flow of the fuel from the fuel passing passage 169 into the pump chamber portion 155 is prevented. Thus, the fuel passing and fuel intake passages 169 and 166 correspond to means for preventing the flowing out of the fuel, the generating of the fuel vapor, or the drying up of the fuel.

The fuel in the reservoir 94 is introduced into the pump chamber portion 155 via the fuel introducing pipe 117 as the fuel in the sub-tank chamber 156 is fed to the injector by the fuel pump device 116. A portion of the fuel introduced to the pump chamber portion 155 via the fuel introducing pipe 117 passes through the separating wall 170. Therefore, the fuel vapor included in the fuel in the reservoir 94 is separated in the pump chamber portion 155.

In the fourteenth embodiment, the fuel introducing pipe 117 is positioned at the lower position than the bottom wall 96 of the reservoir 94. Therefore, the fuel in the reservoir 94 can be completely introduced to the pump chamber portion 155. Further, the upper opening of the fuel intake passage 166 is positioned at the lower position than the bottom face of the pipe wall of the fuel introducing pipe 117. Therefore, the fuel in the pump chamber portion 155 can be completely introduced to the sub-tank chamber 156. Thus, if the amount of the fuel in the reservoir 94 becomes small, the fuel in the reservoir 94 can be introduced into the sub-tank chamber 156 due to the difference in the height between the reservoir 94 and the fuel introducing pipe 117.

When the fuel pump device 116 is inclined, the fuel surface in the pump chamber portion 155 or the fuel intake passage 166 may reach the lowest end of the fuel intake passage 166. When the level of the fuel surface exceeds the lowest end of the fuel intake passage 166 and exceeds the lowest position of the most upper end of the fuel intake passage 166, the fuel in the sub-tank chamber 156 flows into the pump chamber portion 155. As stated above, the flow of the fuel from the sub-tank chamber 156 into the pump chamber portion 155 may lead to the generation of the fuel vapor in the pump chamber portion 155. Further, if the fuel flows out of the sub-tank chamber 156 to the pump chamber portion 155 when the amount of the fuel in the sub-tank chamber 156 is very small, the fuel may dry up around the first fuel filter 158.

According to the fourteenth embodiment, the vertical annular wall 167 extends downwardly from the horizontal wall 154b to a relatively large extent. Therefore, it prevents the level of the fuel surface exceeding the lowest end of the fuel intake passage 166 and exceeding the lowest position of the most upper end of the fuel intake passage 166. Thus, the vertical annular wall 167 corresponds to means for preventing the fuel flowing out or fuel vapor generating.

Further, the effect of preventing the fuel flowing out depends only on the length or the size of the fuel intake passage 166 (or the relationship between the positions of the most upper and lower ends of the fuel intake passage 166) and the inclined angle relative to the horizon of the fuel surface in the fuel intake passage 166. That is, the effect of preventing the flow out of the fuel can be obtained independently of the position of the fuel intake passage 166. Therefore, the possible selections of the position of the fuel intake passage 166 can be increased.

Figure 34:
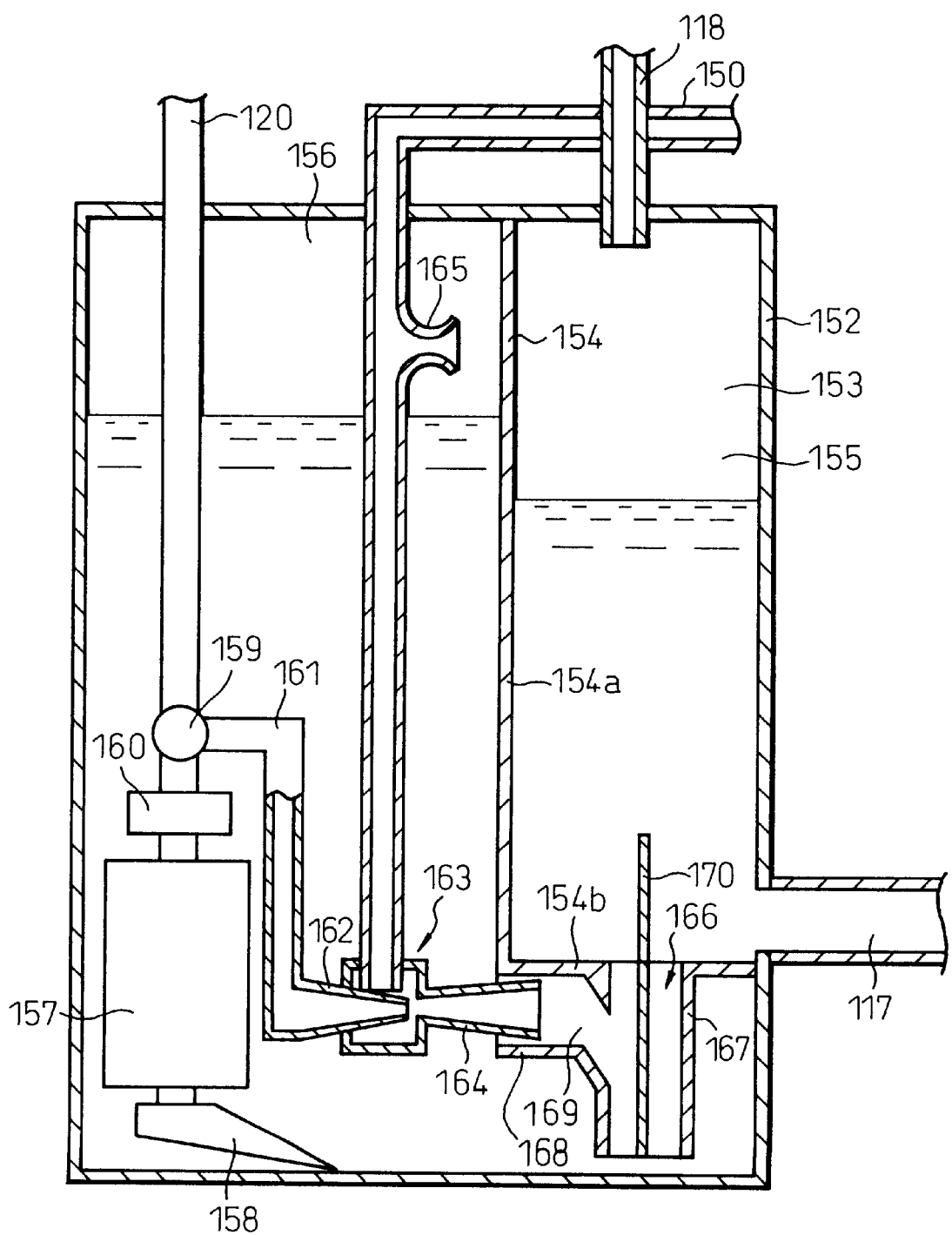
FIG. 34 is a partial sectional view of another fuel pump device different from that according to the fourteenth embodiment of the invention.

Further, in order to facilitate the separation of the gases from the fuel discharged from the fuel passing passage, it is desirable that the fuel stays under the fuel intake passage for long time. According to another embodiment as shown in FIG. 34, the fuel passing passage is directed downwardly and is connected to the fuel intake passage. Therefore, the fuel discharged from the fuel passing passage flows downwardly in the fuel intake passage. Thus, the fuel may stay under the fuel intake passage for long time.

A fuel pump device according to the fifteenth embodiment of the invention will be explained below.

In the fourteenth embodiment, the fuel is introduced into the fuel pump device 116 via the fuel introducing pipe 117 when the fuel is supplied to the reservoir 94 via the fuel feeding pipe 115. The fuel introduced into the fuel pump device 116 flows into the sub-tank chamber 156. Therefore, the level of the fuel surface in the sub-tank chamber 156 is raised.

In the fourteenth embodiment, the interior of the reservoir 94 is in direct communication with the interior of the sub-tank chamber 156 via the sub-tank chamber negative pressure introducing pipe 165. Therefore, the fuel vapor and the air may flow back to the reservoir 94 via the reservoir fuel vapor pipe 150. According to the fifteenth embodiment, the flow of the gases from the sub-tank chamber 156 back to the reservoir 94 while the supply of the fuel is prevented.

Figure 35:
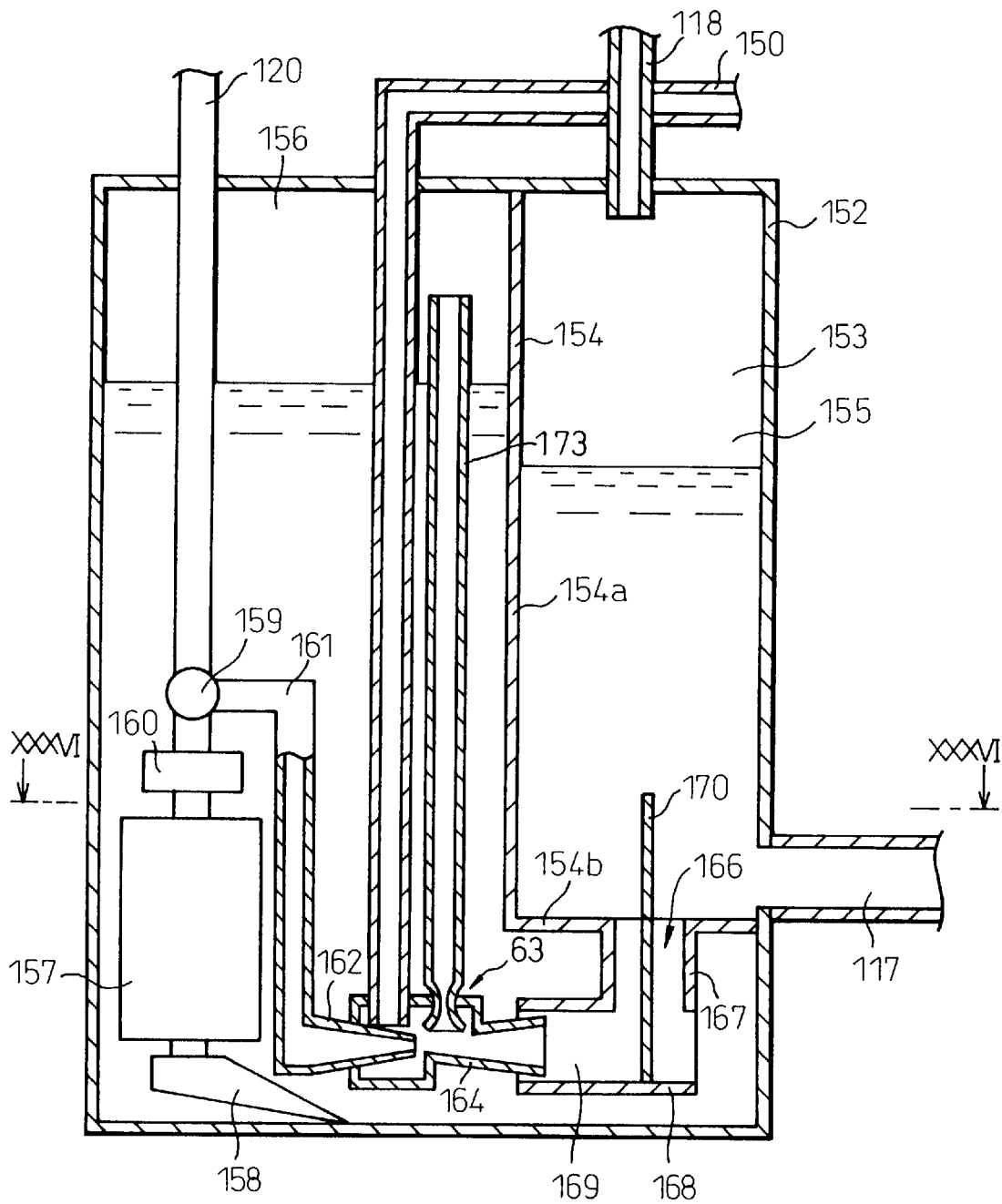
FIG. 35 is a partial sectional view of a fuel pump device according to the fifteenth embodiment of the invention.
Figure 36:
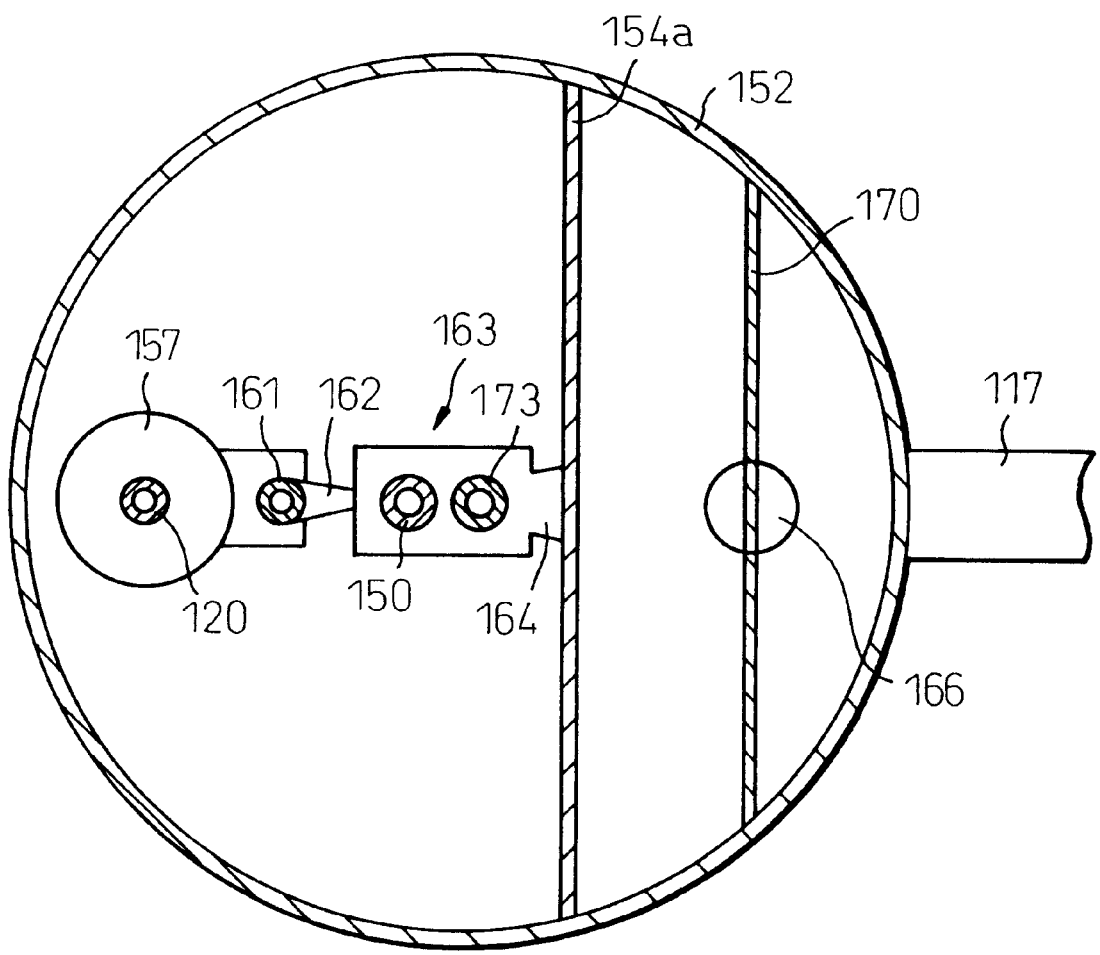
FIG. 36 is a partial sectional view of the fuel pump device along line XXXVI—XXXVI in FIG. 35.

In the fifteenth embodiment, as shown in FIGS. 35 and 36, the sub-tank chamber negative pressure introducing pipe 165 is not arranged in the reservoir fuel vapor pipe 150. A sub-tank chamber negative pressure introducing pipe 173 is arranged in the sub-tank chamber 156 independently of the reservoir fuel vapor pipe 150. An upper opening of the sub-tank chamber negative pressure introducing pipe 173 is open to the interior of the sub-tank chamber 156 at the upper area in the sub-tank chamber 156. On the other hand, a lower opening of the sub-tank chamber negative pressure introducing pipe 173 is open to the interior of the negative pressure generating housing 163. The diameter of the lower opening of the sub-tank chamber negative pressure introducing pipe 173 is smaller than that of the reservoir fuel vapor pipe 150.

Components other than those described above are the same as those of the fuel pump device according to the fourteenth embodiment. Therefore, an explanation thereof will not be given.

A operation of the fuel pump device according to the fifteenth embodiment of the invention will be explained below.

The fuel is introduced into the sub-tank chamber 156 when the fuel is introduced into the reservoir 94 via the fuel feeding pipe 115. Therefore, the level of the fuel surface in the sub-tank chamber 156 is raised. In the fifteenth embodiment, the space above the fuel surface in the sub-tank chamber 156 is not in direct communication with the interior of the reservoir 94. Therefore, the flow of the fuel vapor and the air from the sub-tank chamber 156 back to the reservoir 94 while the supply of the fuel is prevented. Thus, the amount of the fuel vapor and the air in the reservoir 94 is kept small before the fuel pump 157 is activated. Therefore, the fuel vapor and the air can be quickly eliminated from the reservoir 94 when the fuel pump 157 is activated.

Operations other than those described above are the same as those of the fuel pump device according to the fourteenth embodiment. Therefore, an explanation thereof will not be given.

In the above-mentioned embodiments, a sensor for detecting gases including fuel vapor in the space above the fuel surface in the fuel chamber can be used, instead of the level switch. Further, the fuel vapor eliminating operation may be controlled to open or close the above mentioned shut off valves on the basis of the amount of the gases in the fuel chamber or the volume of the space formed above the fuel surface, instead of the highest level of the fuel surface.

Further, the fuel vapor eliminating operation may be controlled on the basis of the judgement if the level of the fuel surface is higher than a predetermined level, or if the amount of gas in the fuel chamber is larger than a predetermined amount. Of course, in the above mentioned embodiments, it is judged that there is an amount of gas in the fuel chamber when the level sensor is off.

While the invention has been described by reference to specific embodiments chosen for purposes of illustration, it should be apparent that numerous modifications can be made thereto by those skilled in the art without departing from the basic concept and scope of the invention.

We claim:

1. A fuel reserving device for reserving fuel therein comprising:
    a wall dividing an interior of the device into a fuel chamber and an air chamber, said wall being deformable according to an amount of fuel in said fuel chamber;
    a discharge passage open to a space formed above a surface of the fuel in said fuel chamber;
    a shut off valve for opening and shutting said discharge passage;
    gas discharging means for discharging gas from said space via said discharge passage when said shut off valve is open; and
    control means for controlling said gas discharging means and said shut off valve to open said shut off valve and operate said gas discharging means to discharge said gas from said space when an amount of gas in said space is larger than a predetermined amount, under normal operating conditions when the amount of gas in said space is smaller than said predetermined amount said control means closing said shut off valve and stopping the operation of said gas discharging means to stop the discharging operation.

2. A fuel reserving device according to claim 1, wherein fuel surface level detecting means is provided for detecting the level of the surface of the fuel in said fuel chamber, and said control means judges that the amount of said gas is larger than said predetermined amount when the level of the surface of the fuel detected by said fuel surface level detecting means is lower than a predetermined level.

3. A fuel reserving device according to claim 1, wherein fuel surface level raising means is provided for raising the level of the surface of the fuel, and said gas discharging means controls said fuel surface level raising means to raise the level of the surface of the fuel to discharge said gas from said space when the amount of said gas is larger than said predetermined amount.

4. A fuel reserving device according to claim 3, wherein said fuel surface level raising means feeds fuel to said fuel chamber to raise the level of the surface of the fuel.

5. A fuel reserving device according to claim 3, wherein said fuel surface level raising means deforms said wall to raise the level of the surface of the fuel.

6. A fuel reserving device according to claim 5, wherein said fuel surface level raising means increases the pressure in said air chamber to deform said wall.

7. A fuel reserving device according to claim 6, wherein said fuel surface level raising means increases the pressure in said air chamber to a pressure lower than that of the fuel fed to said fuel chamber when the fuel is fed to said fuel chamber.

8. A fuel reserving device according to claim 6, wherein said fuel surface level raising means decreases the pressure in said air chamber when the feeding of the fuel to said fuel chamber is stopped.

9. A fuel reserving device according to claim 5, wherein said fuel surface level raising means introduces a negative pressure into said space to deform said wall.

10. A fuel reserving device according to claim 9, wherein said fuel surface level raising means comprises a fuel pump for pumping the fuel to generate a negative pressure by the pumped fuel, and introduces the negative pressure into said space via said discharging passage.

11. A fuel reserving device according to claim 10, wherein said fuel surface level raising means returns a portion of the fuel pumped by said fuel pump into said fuel chamber to generate the negative pressure.

12. A fuel reserving device according to claim 10, wherein said fuel pump is housed in a pump chamber connected to said fuel chamber, said fuel surface level returns a portion of said fuel pumped into said pump chamber to generate negative pressure and introduces the negative pressure into a space formed above a surface of the fuel in said pump chamber.

13. A fuel reserving device according to claim 9, wherein said discharge passage is connected to an air intake system of an engine, and wherein the negative pressure is introduced by said fuel surface level raising means into the space formed above the surface of the fuel by fluidly coupling said discharge passage with an air intake system of an engine.

14. A fuel reserving device according to claim 13, wherein said discharge passage is connected to said air intake system via a canister for adsorbing the fuel vapor therein, and said canister comprises a valve which opens to the atmosphere when the pressure in said canister is under a predetermined negative pressure to make said canister communicate with the atmosphere.

15. A fuel reserving device according to claim 13, wherein said fuel surface level raising means raises the level of the surface of the fuel when conditions in said engine allow it to receive the fuel vapor.

* * * * *